US009368776B2

(12) United States Patent
Horikawa et al.

(10) Patent No.: US 9,368,776 B2
(45) Date of Patent: Jun. 14, 2016

(54) POWER STORAGE DEVICE AND MANUFACTURING METHOD THEREFOR

(71) Applicant: MURATA MANUFACTURING CO., LTD., Nagaokakyo-shi, Kyoto-fu (JP)

(72) Inventors: Keiji Horikawa, Nagaokakyo (JP); Yukio Ehara, Nagaokakyo (JP); Masaharu Itaya, Nagaokakyo (JP); Yasutake Fukuda, Nagaokakyo (JP); Manabu Sawada, Nagaokakyo (JP); Hiroyuki Harada, Nagaokakyo (JP); Yuusuke Ueba, Nagaokakyo (JP); Yasuhiko Ueda, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 578 days.

(21) Appl. No.: 13/729,094

(22) Filed: Dec. 28, 2012

(65) Prior Publication Data
US 2013/0122347 A1    May 16, 2013

Related U.S. Application Data

(63) Continuation of application No. PCT/JP2011/064751, filed on Jun. 28, 2011.

(30) Foreign Application Priority Data

Jun. 28, 2010  (JP) .................. 2010-146551

(51) Int. Cl.
*H01M 2/16*  (2006.01)
*H01G 11/12*  (2013.01)
(Continued)

(52) U.S. Cl.
CPC ............. *H01M 2/1686* (2013.01); *H01G 11/12* (2013.01); *H01G 11/52* (2013.01);
(Continued)

(58) Field of Classification Search
CPC ..... H01M 2/02; H01M 2/027; H01M 2/1686; H01M 4/0404; H01M 4/0414; H01M 6/005; H01M 6/40; H01M 6/46; H01M 10/0436; H01M 10/052; H01M 10/0585; H01G 11/12; H01G 11/52; H01G 11/74
See application file for complete search history.

(56) References Cited

U.S. PATENT DOCUMENTS

2005/0079420 A1   4/2005  Cho et al.
2005/0186479 A1   8/2005  Totsuka et al.
(Continued)

FOREIGN PATENT DOCUMENTS

CN    101232104 A    7/2008
JP    02-305426 A    12/1990
(Continued)

OTHER PUBLICATIONS

JP 2005-093859 A English machine translation.*
International Search Report for PCT/JP2011/064751, date of mailing Sep. 6, 2011.
PCT/JP2011-064751 Written Opinion dated Aug. 24, 2011.

*Primary Examiner* — Scott J Chmielecki
(74) *Attorney, Agent, or Firm* — Arent Fox LLP

(57) ABSTRACT

A power storage device having: a laminated body formed by providing a separator layer between a first electrode which is one of a cathode and an anode and a second electrode which is the other electrode; an electrolyte; and a package which houses the laminated body and the electrolyte. At least two first electrode composite sheets are included which are each obtained by integrating a first collector electrode, a first electrode active material layer provided on one principal surface of the first collector electrode, and a separator layer covering at least part of the one principal surface, and the other principal surface of the first collector electrode of one first electrode composite sheet out of the at least two first electrode composite sheets is opposed to, and bonded to, the other principal surface of the first collector electrode of the other first electrode composite sheet.

6 Claims, 32 Drawing Sheets

(51) Int. Cl.

| | |
|---|---|
| *H01G 11/52* | (2013.01) |
| *H01G 11/74* | (2013.01) |
| *H01M 2/02* | (2006.01) |
| *H01M 6/00* | (2006.01) |
| *H01M 10/04* | (2006.01) |
| *H01M 6/40* | (2006.01) |
| *H01M 6/46* | (2006.01) |
| *H01M 4/04* | (2006.01) |
| *H01M 10/052* | (2010.01) |
| *H01M 10/0585* | (2010.01) |

(52) U.S. Cl.
CPC ............ *H01G 11/74* (2013.01); *H01M 2/02* (2013.01); *H01M 4/0414* (2013.01); *H01M 6/005* (2013.01); *H01M 6/40* (2013.01); *H01M 6/46* (2013.01); *H01M 10/0436* (2013.01); *H01M 2/027* (2013.01); *H01M 4/0404* (2013.01); *H01M 10/052* (2013.01); *H01M 10/0585* (2013.01); *Y02E 60/13* (2013.01); *Y10T 29/49108* (2015.01); *Y10T 29/49114* (2015.01)

(56) References Cited

U.S. PATENT DOCUMENTS

| | | | |
|---|---|---|---|
| 2005/0233209 A1* | 10/2005 | Sudano | H01M 2/263 429/160 |
| 2006/0141340 A1* | 6/2006 | Takeuchi et al. | 429/52 |
| 2009/0311591 A1* | 12/2009 | Snyder et al. | 429/156 |
| 2010/0261049 A1* | 10/2010 | Kwak et al. | 429/160 |
| 2011/0143185 A1* | 6/2011 | Nishikawa | 429/145 |

FOREIGN PATENT DOCUMENTS

| | | |
|---|---|---|
| JP | 6-231796 | 8/1994 |
| JP | 10-334877 A | 12/1998 |
| JP | 2003-197198 A | 7/2003 |
| JP | 2003-243038 A | 8/2003 |
| JP | 2003-532277 A | 10/2003 |
| JP | 2004-164898 A | 6/2004 |
| JP | 2005-063978 A | 3/2005 |
| JP | 2005-093859 A | 4/2005 |
| JP | 2005093859 A * | 4/2005 |
| JP | 2005-243303 A | 9/2005 |
| JP | 2006-196235 A | 7/2006 |
| JP | 2007-273738 A | 10/2007 |
| WO | WO-99/40645 A1 | 8/1999 |

\* cited by examiner

FIG. 5
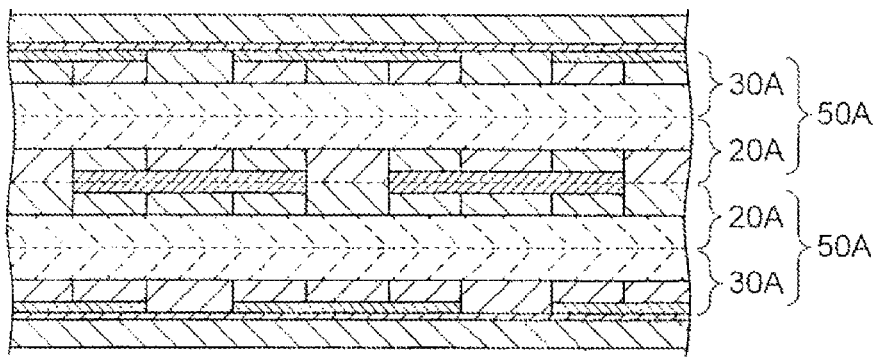
(15)
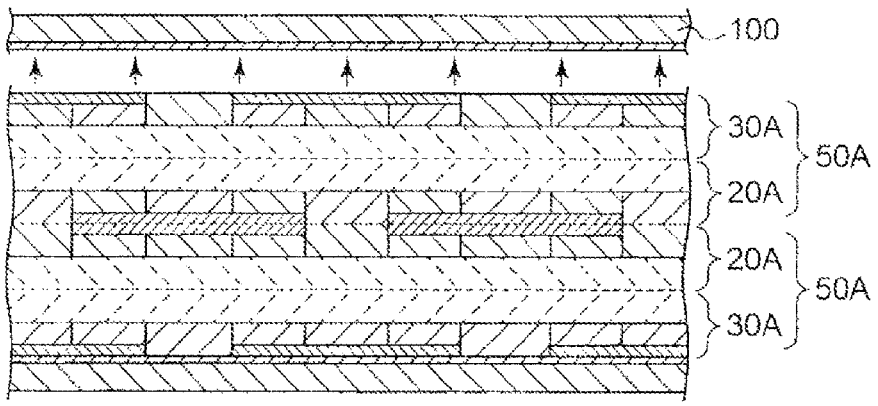
(16)

FIG. 12
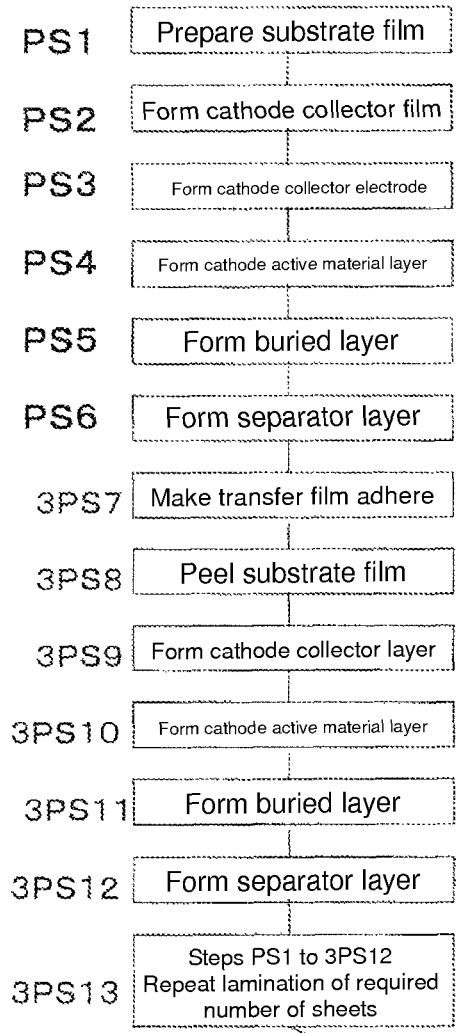
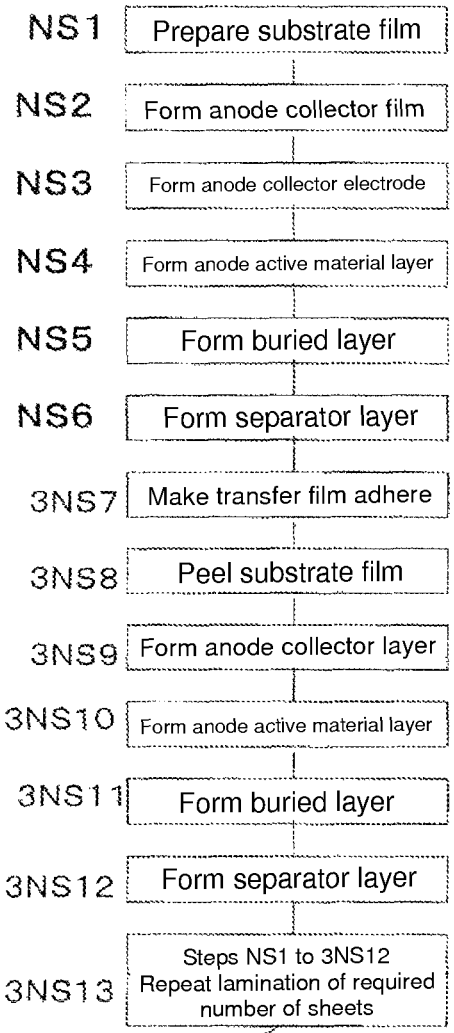
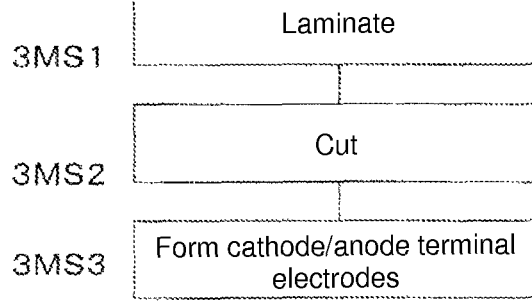

FIG. 19
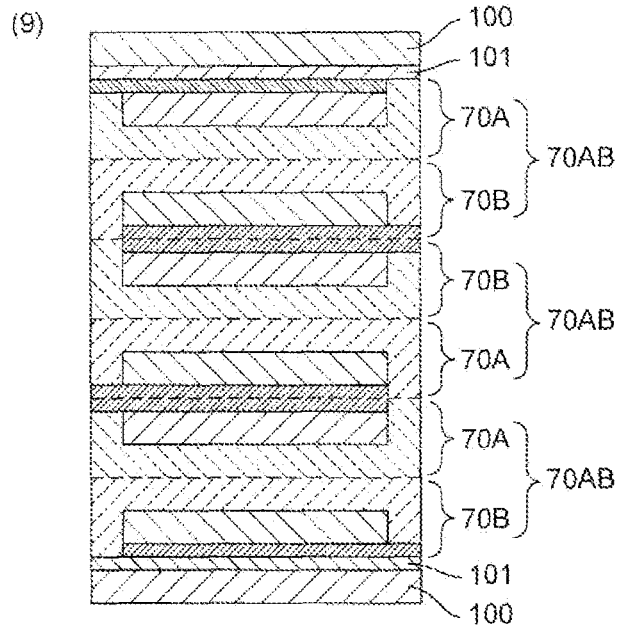
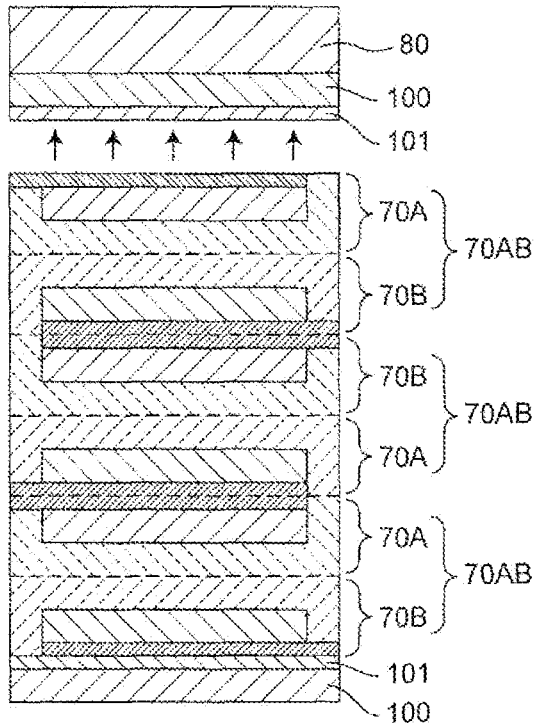

FIG. 21
(7)
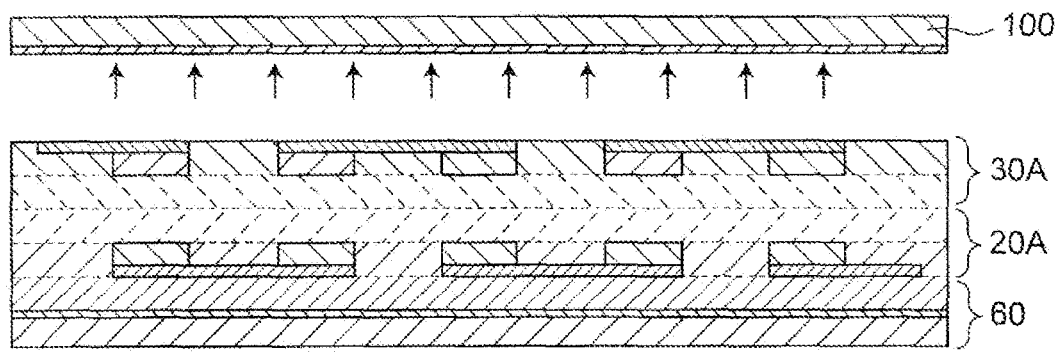
(8)
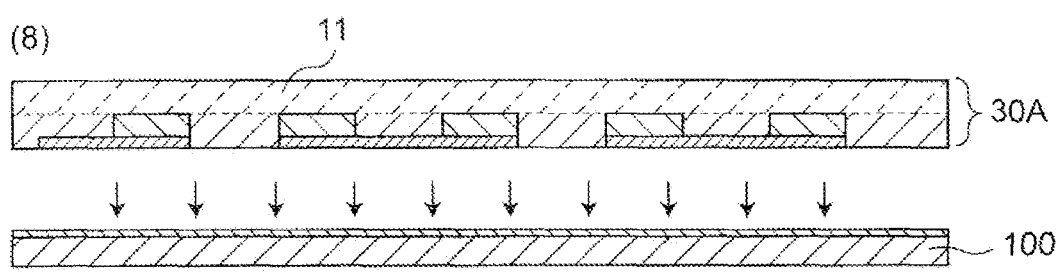
(9)
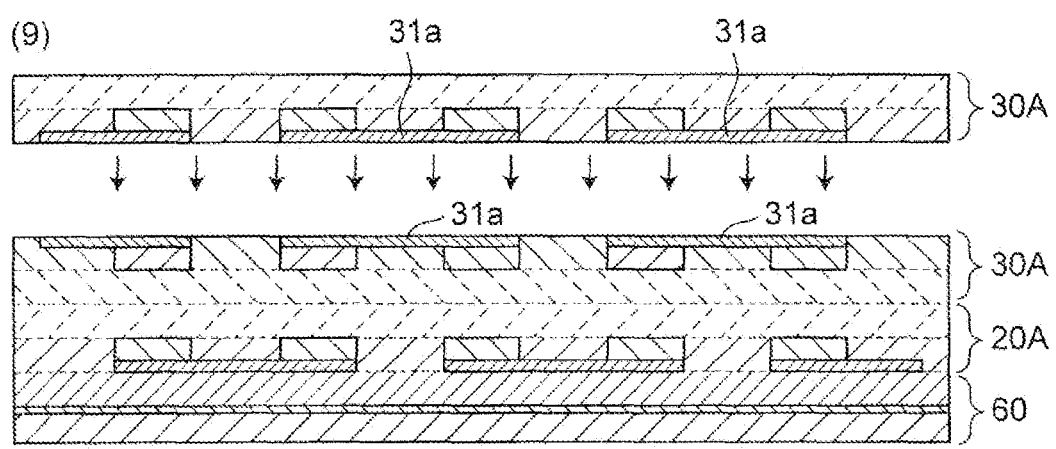

FIG. 22
(10)
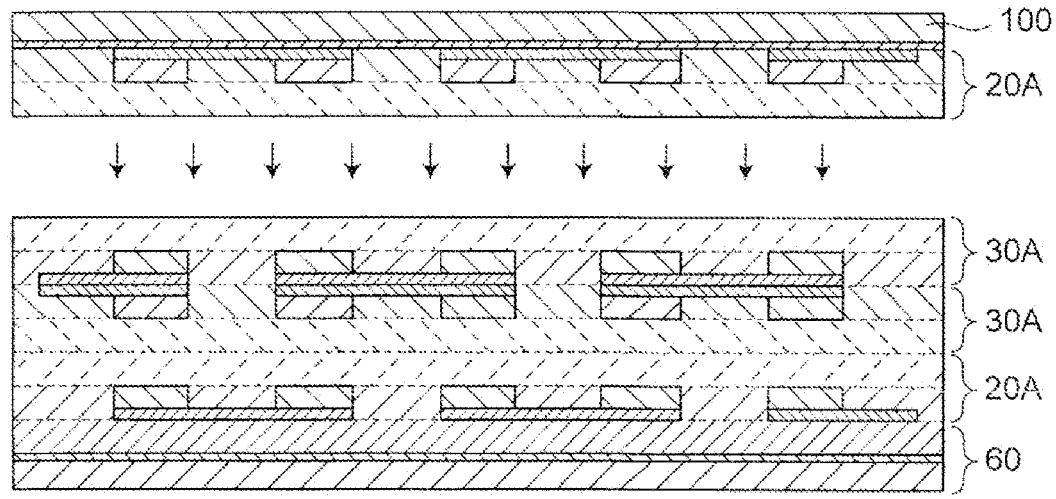
(11)
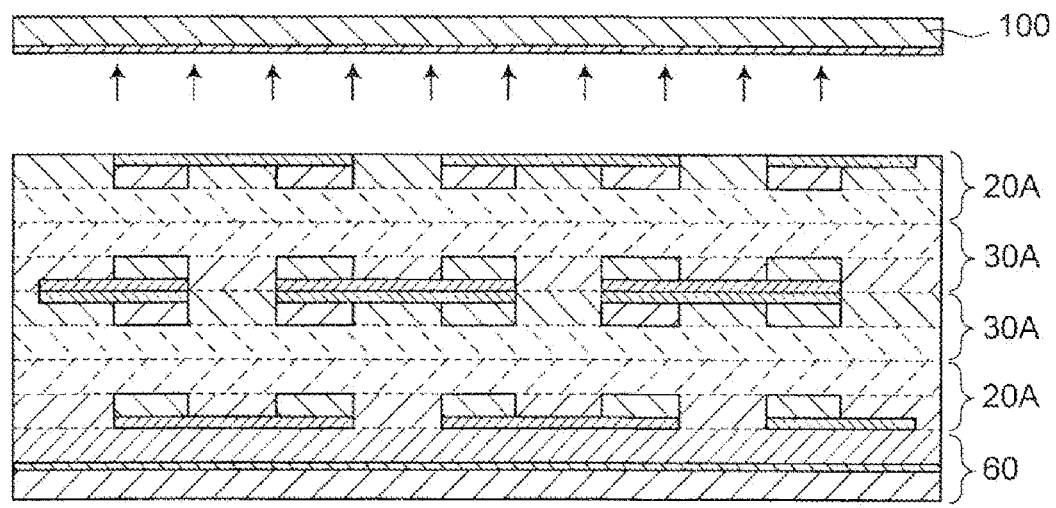

FIG. 23
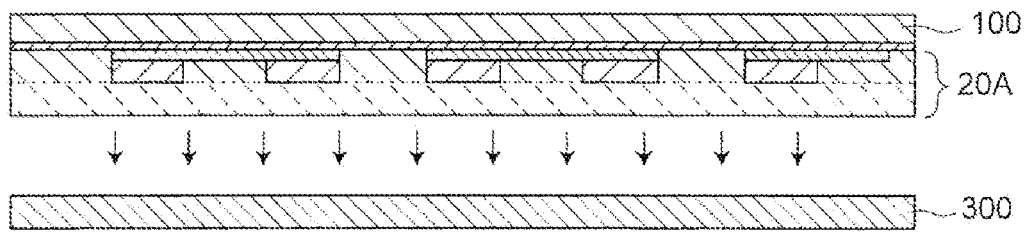
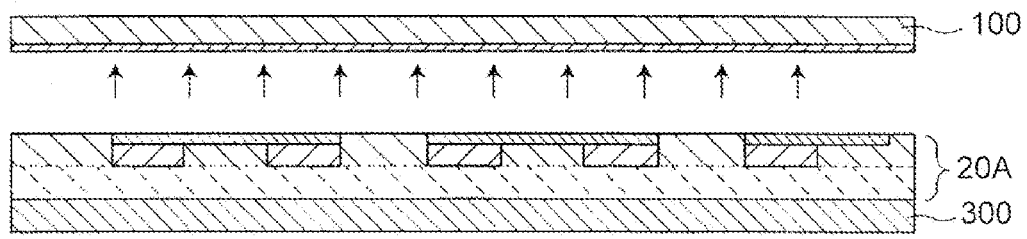
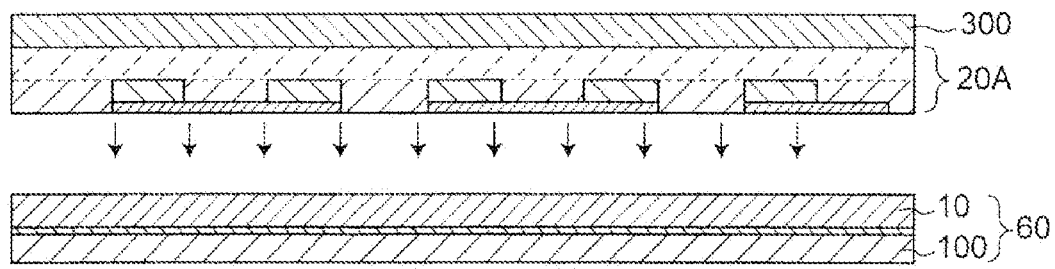
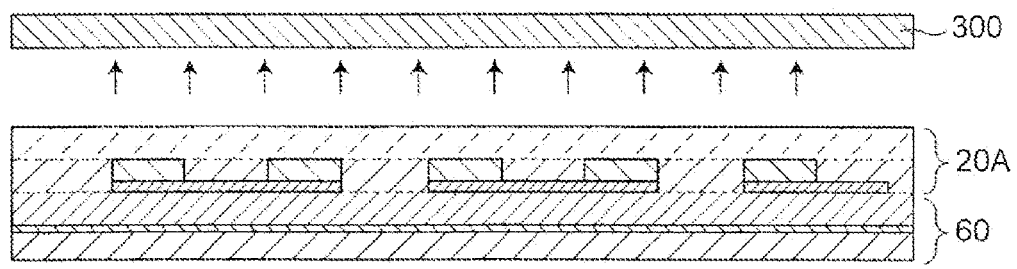

POWER STORAGE DEVICE AND MANUFACTURING METHOD THEREFOR

CROSS REFERENCE TO RELATED APPLICATIONS

The present application is a continuation of International application No. PCT/JP2011/064751, filed Jun. 28, 2011, which claims priority to Japanese Patent Application No. 2010-146551, filed Jun. 28, 2010, the entire contents of each of which are incorporated herein by reference.

FIELD OF THE INVENTION

The present invention relates to a power storage device and a manufacturing method therefor.

BACKGROUND OF THE INVENTION

In recent years, a power storage device such as an electrochemical cell has been broadly used as a small-sized lightweight battery capable of achieving a relatively large capacity.

For example, as shown in Patent Document 1, this electrochemical cell has a structure formed of three laminations which are an anode layer, a separator/electrolyte layer and a cathode layer, and each electrode layer has an electrode substrate and an active material (electrode) formed on the substrate. In this Patent Document 1, a solid section of the separator is bonded to an electrode plate, to constitute a composite structure (Section [0048] of Patent Document 1), and after an electrolyte is diffused in the separator, the other electrode is pressed onto the separator, to constitute the electrochemical cell (Section [0053] of Patent Document 1).
[Patent Document 1] Unexamined Japanese Patent Publication No. H10-334877

SUMMARY OF THE INVENTION

Although a power storage device with a higher volume-capacity ratio has recently been required, the power storage device such as the electrochemical cell disclosed in Patent Document 1 has not been able to sufficiently satisfy such a requirement.

Further, there has been a problem in that multi-layering is difficult since the adjacent electrodes are not fixed to each other by bonding and thus not integrated.

Thereat, it is an object of the present invention to provide a power storage device being easily multi-layered and having a high volume-capacity ratio, and a manufacturing method therefor.

In order to achieve the above object, a power storage device according to the present invention is a power storage device, having:

a laminated body formed by providing a separator layer between a first electrode which is one of a cathode and an anode and a second electrode which is the other electrode; an electrolyte; and a package which houses the laminated body and the electrolyte, the device being characterized in that at least two first electrode composite sheets are included which are each obtained by integrating a first collector electrode, a first electrode active material layer provided on one principal surface of the first collector electrode, and a separator layer covering at least part of the one principal surface, and the other principal surface of the first collector electrode of one first electrode composite sheet out of the at least two first electrode composite sheets is opposed to, and bonded to, the other principal surface of the first collector electrode of the other first electrode composite sheet.

The power storage device according to the present invention as thus configured includes the first electrode composite sheet obtained by integrating the first collector electrode, the first electrode active material layer provided on its one principal surface, and the separator layer, thereby facilitating multi-layering.

Further, the power storage device according to the present invention can facilitate arrangement of the first electrode active material layer on each side of the bonded first collector electrode, so as to increase a volume-capacity ratio of the laminated body.

Further, in the power storage device according to the present invention, it is preferable to include a second electrode composite sheet obtained by integrating a second collector electrode, a second electrode active material layer provided on one principal surface of the second collector electrode, and a separator layer covering at least part of the one principal surface of the second collector electrode.

Further, in the power storage device according to the present invention, it is preferable that at least two second electrode composite sheets be included which are each obtained by integrating a second collector electrode, a second electrode active material layer provided on one principal surface of the second collector electrode, and a separator layer covering at least part of the one principal surface of the second collector electrode, and the other principal surface of the second collector electrode of one second electrode composite sheet out of the at least two second electrode composite sheets be opposed to, and bonded to, the other principal surface of the second collector electrode of the other second electrode composite sheet.

As thus described, the second electrode where the second electrode active material layer is formed on each side of the bonded second collector electrode is combined with the first electrode configured in a similar manner, thereby to allow an increase in volume-capacity ratio of the laminated body.

Further, in the power storage device according to the present invention, it is preferable that the separator layer of the first electrode composite sheet and the separator layer of the second electrode composite sheet be bonded to each other.

When the separator layers are bonded to each other as thus described, it is possible to prevent positional displacement between the first electrode and the second electrode which occurs during the manufacturing process or the use of the product.

Further, when the separator layers are bonded to each other to form a double-layered structure, even in the case of occurrence of a defect in one separator layer, insulating properties between the cathode and the anode can be ensured in the other separator layer.

Moreover, in the power storage device according to the present invention, it is preferable that the separator layer contain an inorganic filler.

When the separator layer is made to contain the inorganic filler as thus described, it is possible to reduce a difference in thermal expansion among the separator layer, the active material layer and the collector electrode, so as to suppress warpage and peeling.

Further, a manufacturing method for a power storage device according to the present invention is a manufacturing method for a power storage device having a laminated body formed by providing a separator layer between a first electrode which is one of a cathode and an anode and a second electrode which is the other electrode, an electrolyte, and a package which houses the laminated body and the electrolyte, the method including:

a first electrode composite sheet producing step of producing at least two first electrode composite sheets each obtained by integrating a first collector electrode, a first electrode active material layer provided on one principal surface of the first collector electrode, and a separator layer covering at least part of the one principal surface; and a first electrode composite sheet bonding step of bonding the at least two first electrode composite sheets to each other such that the other principal surface of the first collector electrode of one first electrode composite sheet out of those sheets is opposed to, and bonded to, the other principal surface of the first collector electrode of the other first electrode composite sheet.

As thus described, the manufacturing method for a power storage device according to the present invention can facilitate production of the first electrode obtained by providing the first electrode active material layer on each side of the bonded first collector electrode, so as to produce a laminated body with a high volume-capacity ratio.

Further, in the manufacturing method for a power storage device according to the present invention, it is preferable that the first electrode composite sheet producing step include
a first collector electrode forming step of forming the first collector electrode on a substrate, a step of forming the first electrode active material layer on the one principal surface as the surface of the first collector electrode formed on the substrate, and a step of forming a separator layer covering at least part of the one principal surface, and include a substrate peeling step of peeling the bonded first electrode composite sheet from the substrate before the first electrode composite sheet producing step.

Producing the first electrode composite sheet by use of the substrate in such a manner can reduce the thickness of the first collector electrode, so as to produce a laminated body with a higher volume-capacity ratio.

In the manufacturing method for a power storage device according to the present invention, it is preferable to include:

a second electrode composite sheet producing step of producing second electrode composite sheets each obtained by integrating a second collector electrode, a second electrode active material layer provided on one principal surface of the second collector electrode, and a separator layer covering at least part of the one principal surface of the second collector electrode; and a separator layers bonding step of bonding the separator layer of the first electrode composite sheet and the separator layer of the second electrode composite sheet to each other.

Further, in the manufacturing method for a power storage device according to the present invention, it is preferable to include:

a second electrode composite sheet producing step of producing at least two second electrode composite sheets each obtained by integrating a second collector electrode, a second electrode active material layer provided on one principal surface of the second collector electrode, and a separator layer covering at least part of the one principal surface of the second collector electrode;

a second electrode composite sheet bonding step of bonding the two second electrode composite sheets to each other such that the other principal surface of the second collector electrode of one second electrode composite sheet out of those sheets is opposed to, and bonded to, the other principal surface of the second collector electrode of the other second electrode composite sheet; and a separator layers bonding step of bonding the separator layer of the first electrode composite sheet and the separator layer of the second electrode composite sheet to each other.

This can facilitate production of the second electrode obtained by providing the second electrode active material layer on each side of the further bonded second collector electrode, in addition to the first electrode obtained by providing the first electrode active material layer on each side of the bonded first collector electrode.

Further, due to inclusion of the separator layers bonding step of bonding the separator layer of the first electrode composite sheet and the separator layer of the second electrode composite sheet to each other, it is possible to prevent positional displacement between the first electrode and the second electrode during the manufacturing process, so as to facilitate production of the laminated body.

Further, the manufacturing method for a power storage device according to the present invention may include the separator layer bonding step before the first electrode composite sheet bonding step and/or the second electrode composite sheet bonding step.

Further, in the manufacturing method for a power storage device according to the present invention, it is preferable that the second electrode composite sheet producing step include:

a second collector electrode forming step of forming the second collector electrode on a substrate, a step of forming the second electrode active material layer on the one principal surface as the surface of the second collector electrode formed on the substrate, and a step of forming a separator layer covering at least part of the one principal surface of the second collector electrode, and include a substrate peeling step of peeling the second electrode composite sheet from the substrate.

Producing the second electrode composite sheet by use of the substrate in such a manner can reduce the thickness of the second collector electrode, so as to produce a laminated body with a higher volume-capacity ratio.

Further, in the manufacturing method for a power storage device according to the present invention, it is preferable that the separator layer be made to contain an inorganic filler.

In such a manner, it is possible to reduce a difference in thermal expansion among the separator layer, the first electrode or second electrode active material layer and the first collector electrode or second collector electrode, so as to suppress warpage and peeling of a sheet at the time of producing the laminated body.

Further, for example at the time of pressure-bonding of the separator layer, the separator layer resists breakage due to pressure-bonding, thereby allowing prevention of a short circuit caused by penetration of the first or second electrode active material layer through the separator layer. Moreover, it is possible to suppress deterioration in porosity of the separator layer attributable to breakage due to pressure-bonding.

It is to be noted that, although the electrolyte is not particularly restricted in the present invention, for example, an electrolyte containing a supporting salt, an ionic liquid, a gel electrolyte, or a polymer solid electrolyte can be used.

As thus described, according to the present invention, it is possible to provide a power storage device being easily multi-layered and having a high volume-capacity ratio, and a manufacturing method for the power storage device.

BRIEF EXPLANATION OF THE DRAWINGS

FIG. 5 shows a process step of laminating the cathode/anode integrated sheets in the manufacturing method for a power storage device of Embodiment 1, in which (15) is a sectional view where two cathode/anode integrated sheets have been laminated, and (16) is a sectional view where the substrate film 100 of one out of those sheets has been peeled;

FIG. 12 is a process step flow diagram of a manufacturing method for a power storage device of Embodiment 3 according to the present invention;

Figure 10:
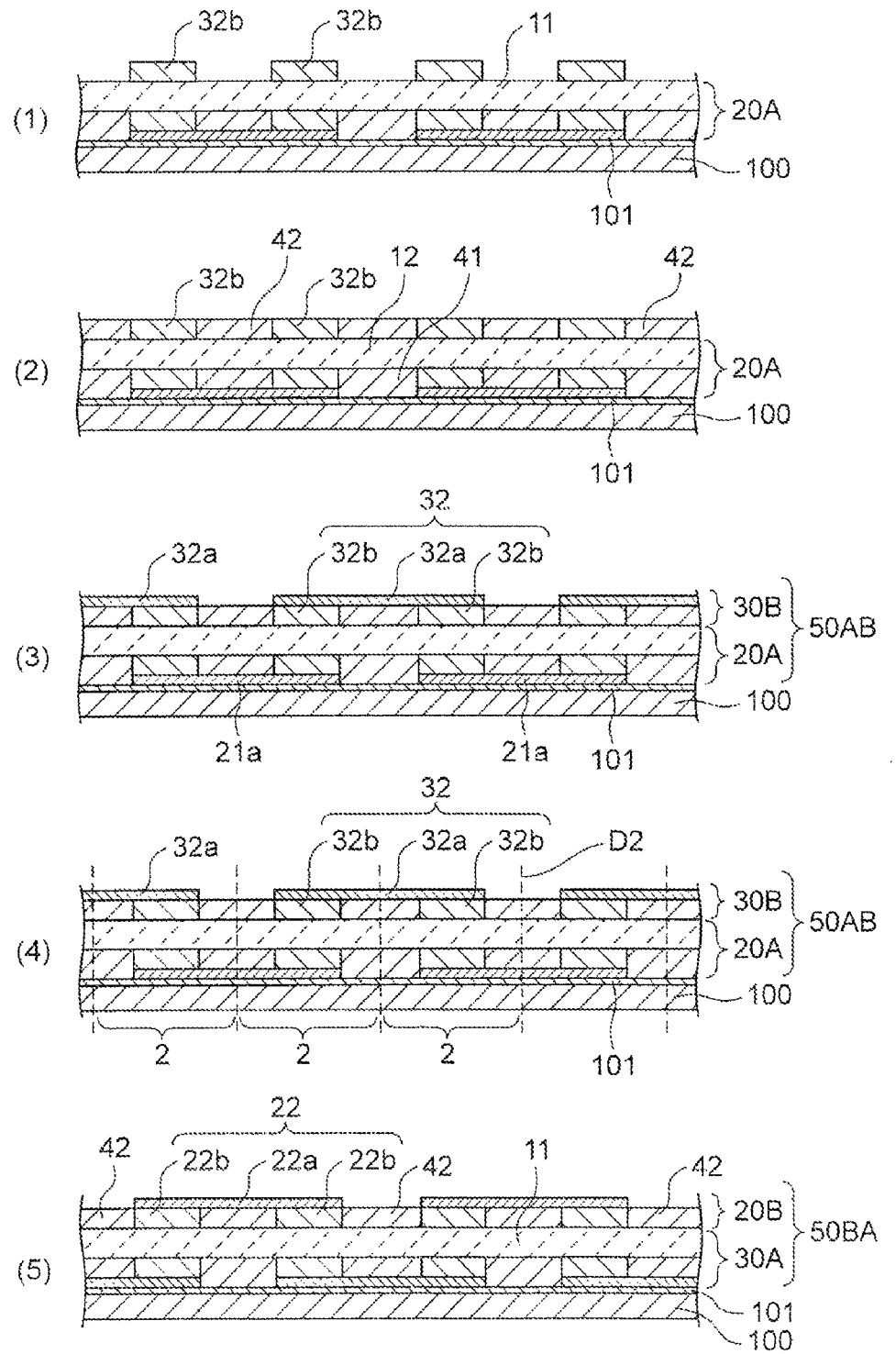
FIG. 10 shows a process step of producing cathode/anode integrated sheets 50AB, BA in the manufacturing method for a power storage device of Embodiment 2, in which (1) is a sectional view where an anode active material layer 32b is formed on the separator layer 11 of the cathode composite sheet 20A, (2) is a sectional view where a buried layer 42 has been formed on the surface formed with the anode active material layer 32b, to planarize the surface, (3) is a sectional view of the cathode/anode integrated sheet 50AB where an anode collector electrode 32a has been formed on the planarized surface, (4) is a sectional view showing a cut line D2 for the cathode/anode integrated sheet 50AB, and (5) is a sectional view of the cathode/anode integrated sheet 50BA.
Figure 17:
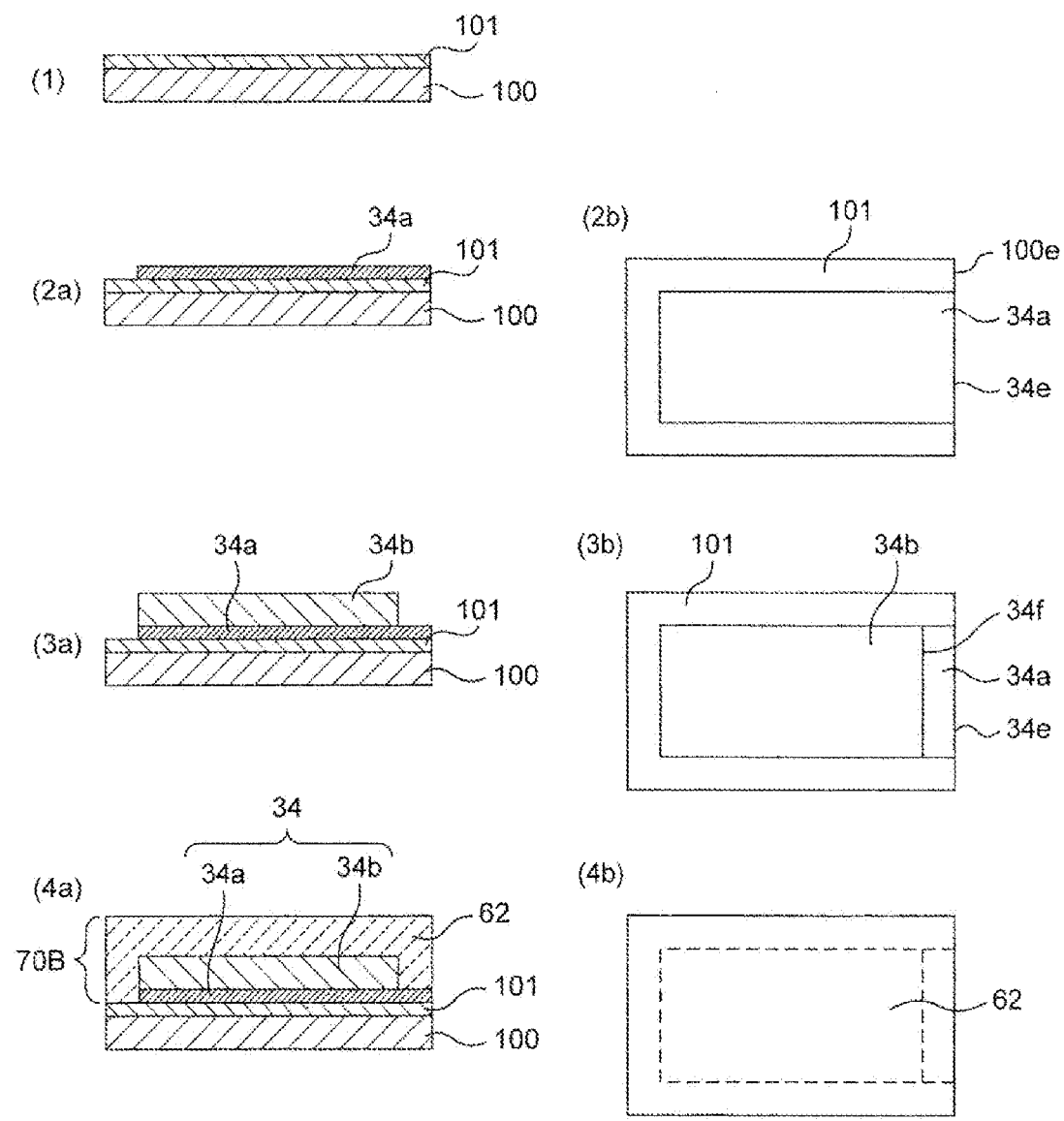
Figure 18:
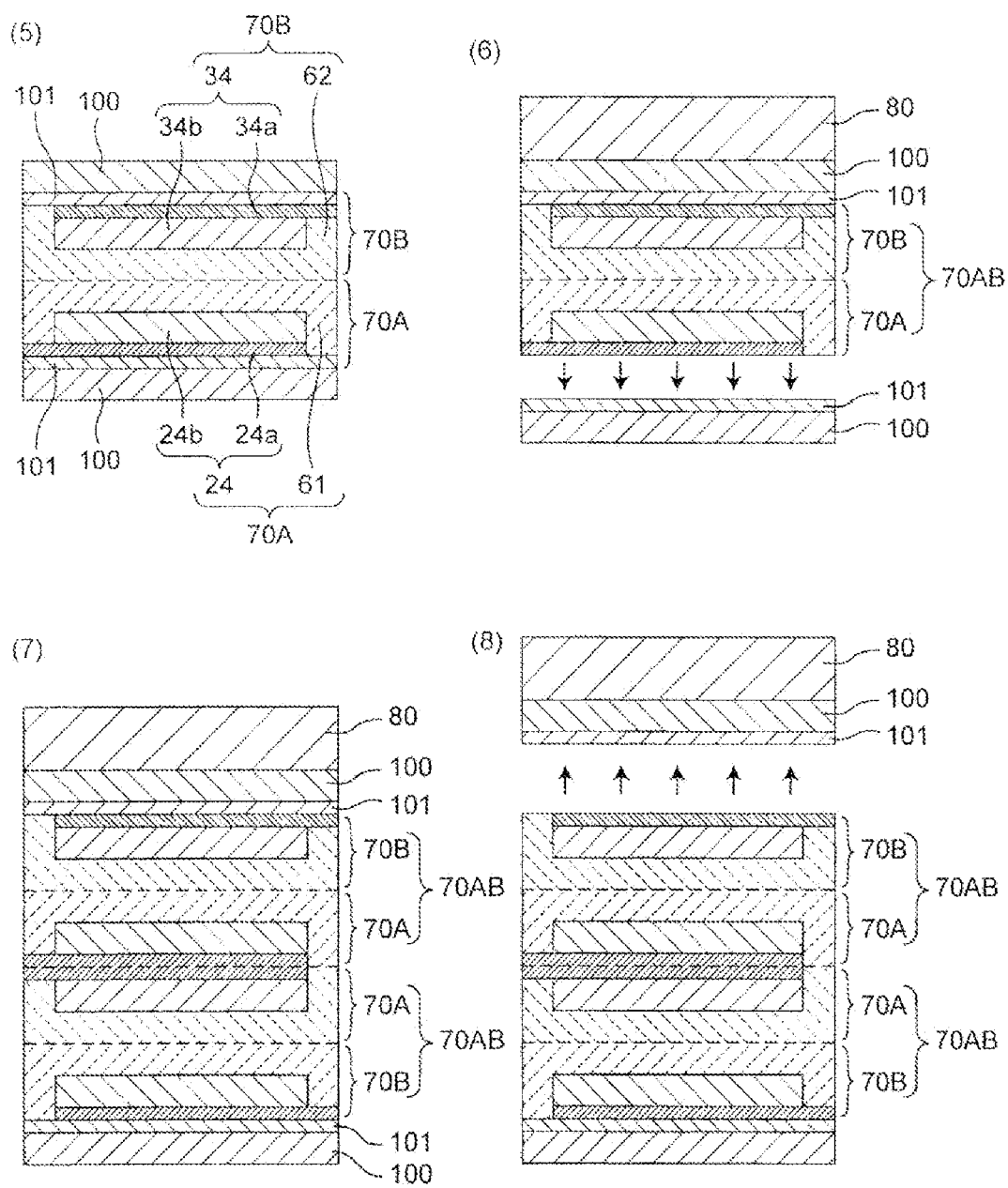
Figure 20:
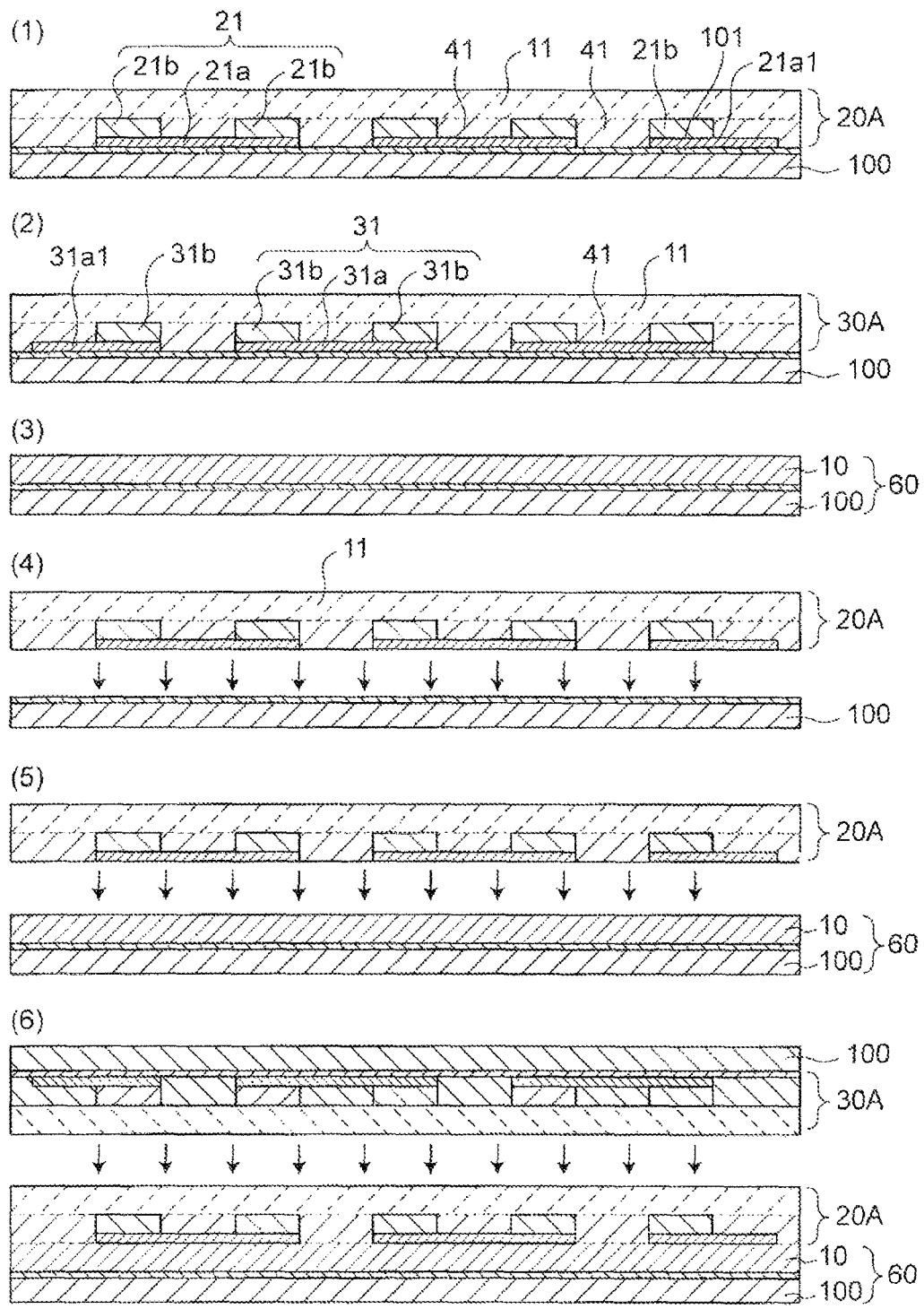
Figure 24:
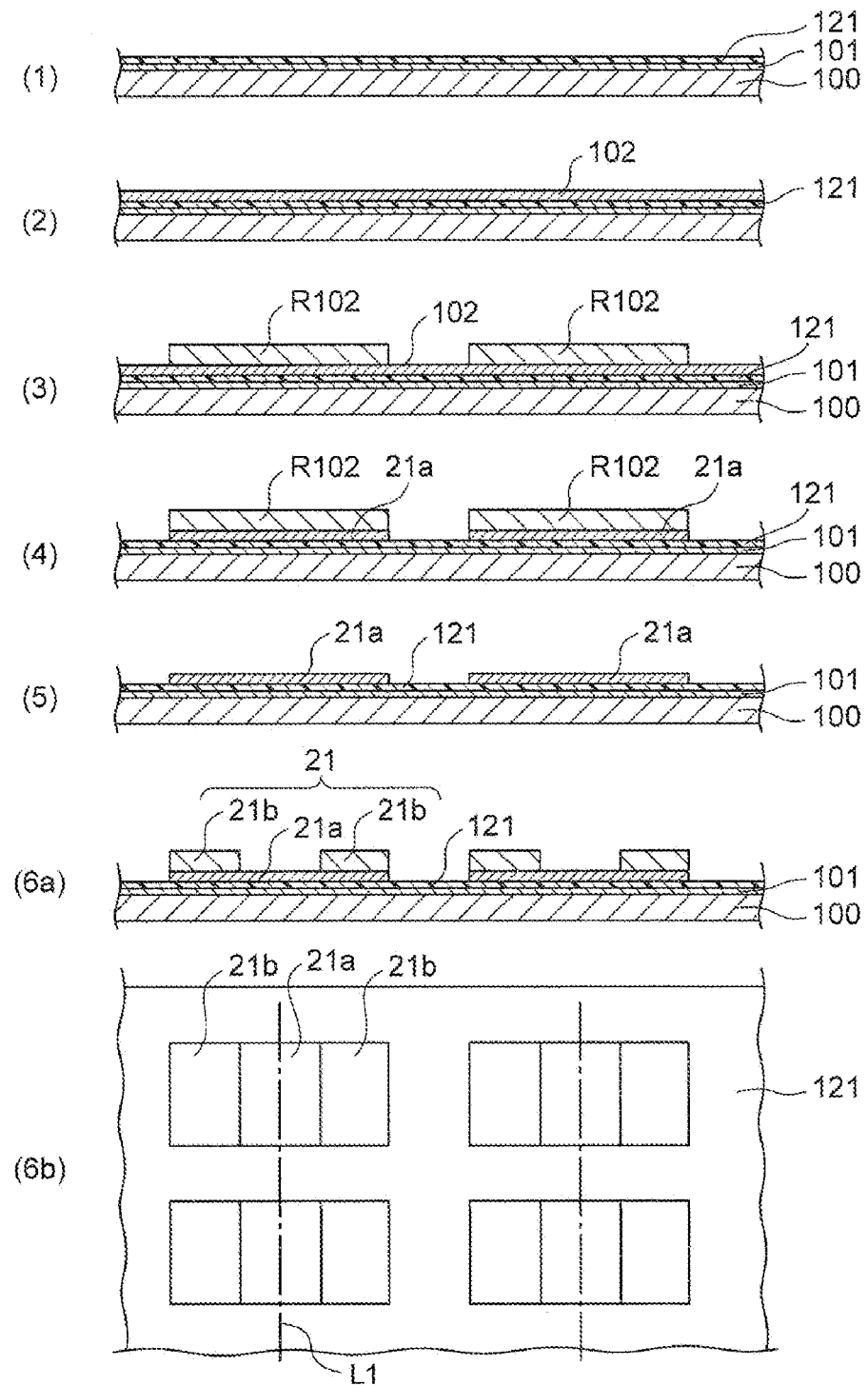
Figure 25:
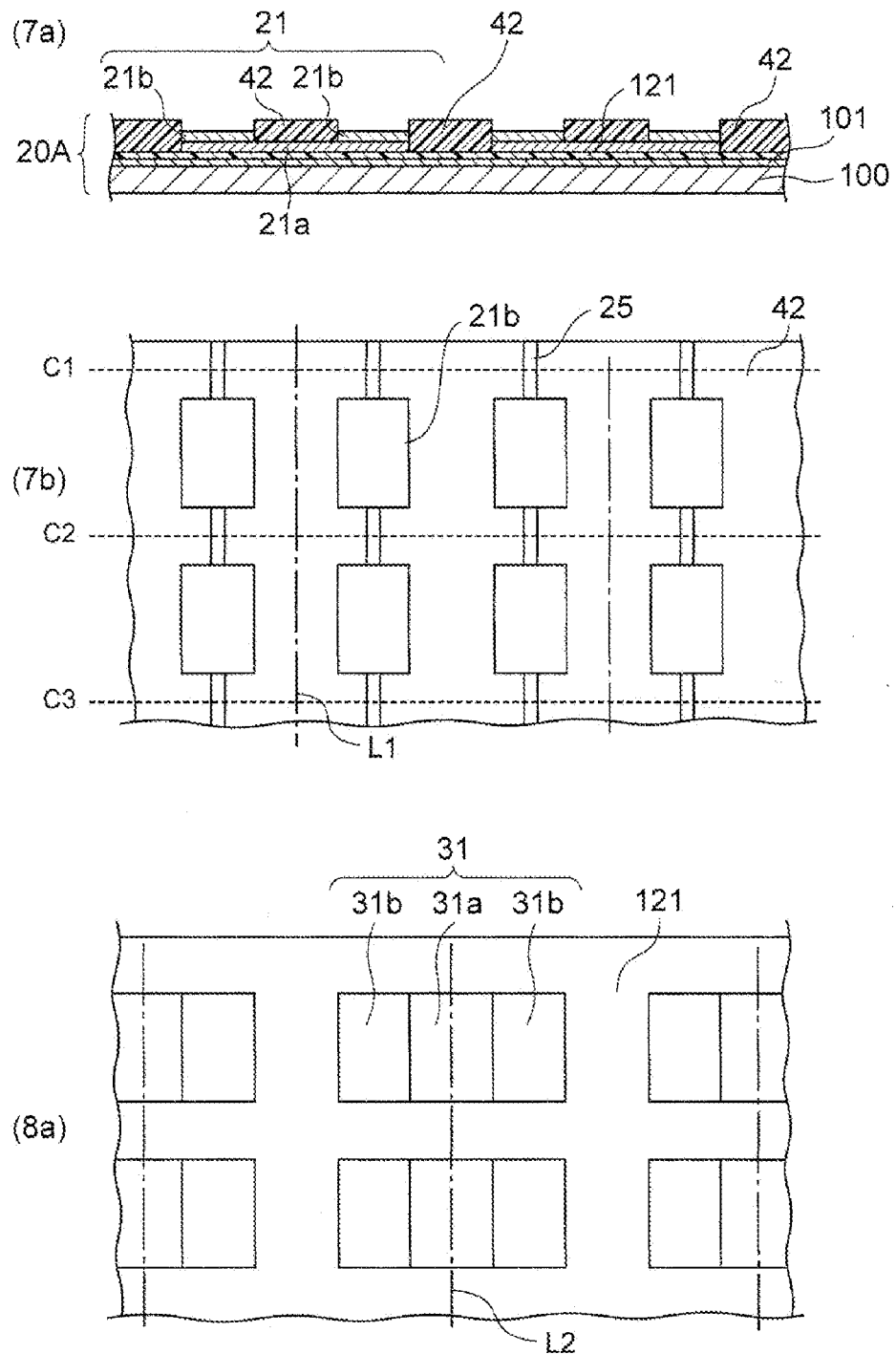
Figure 26:
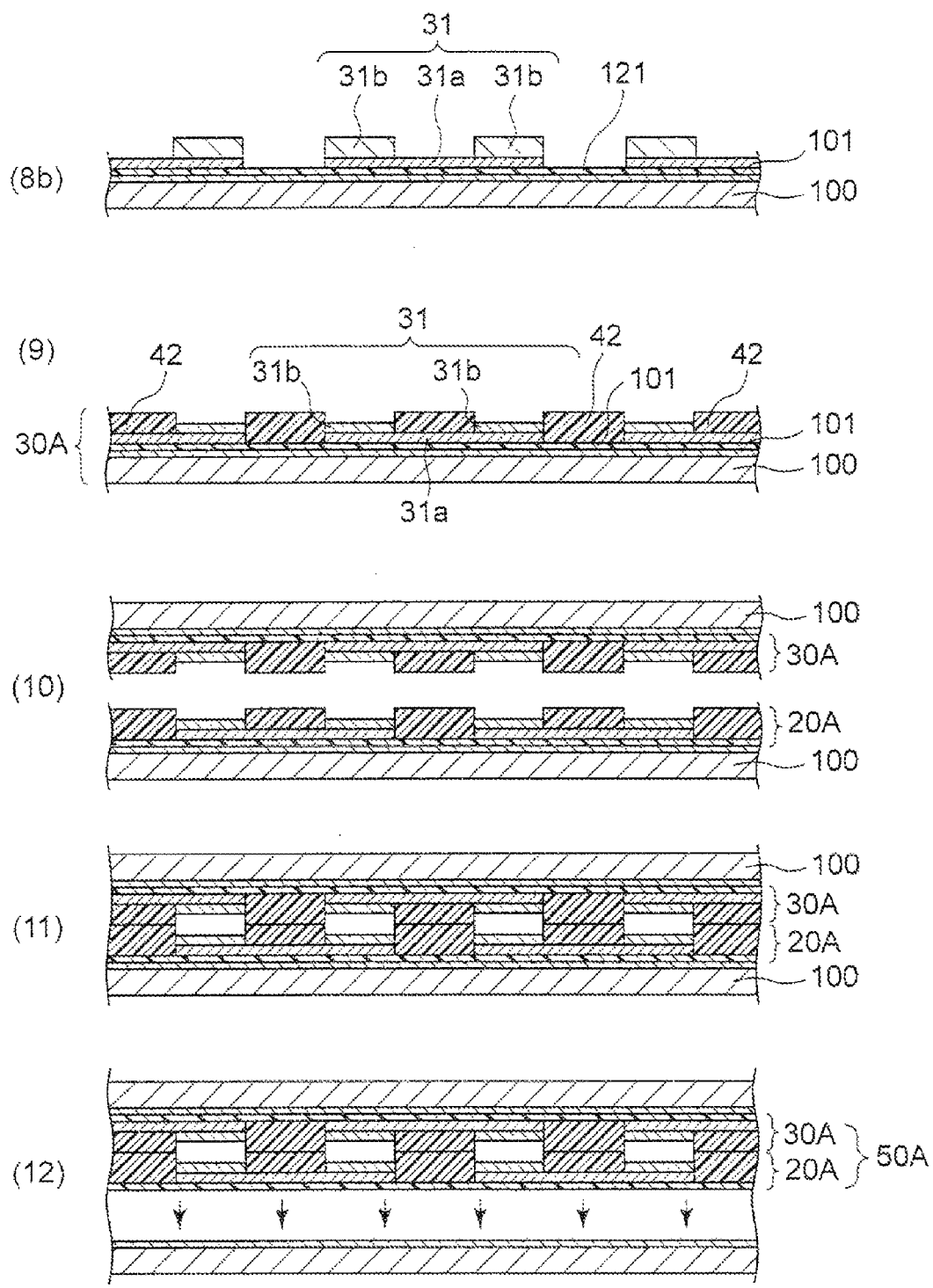
Figure 27:
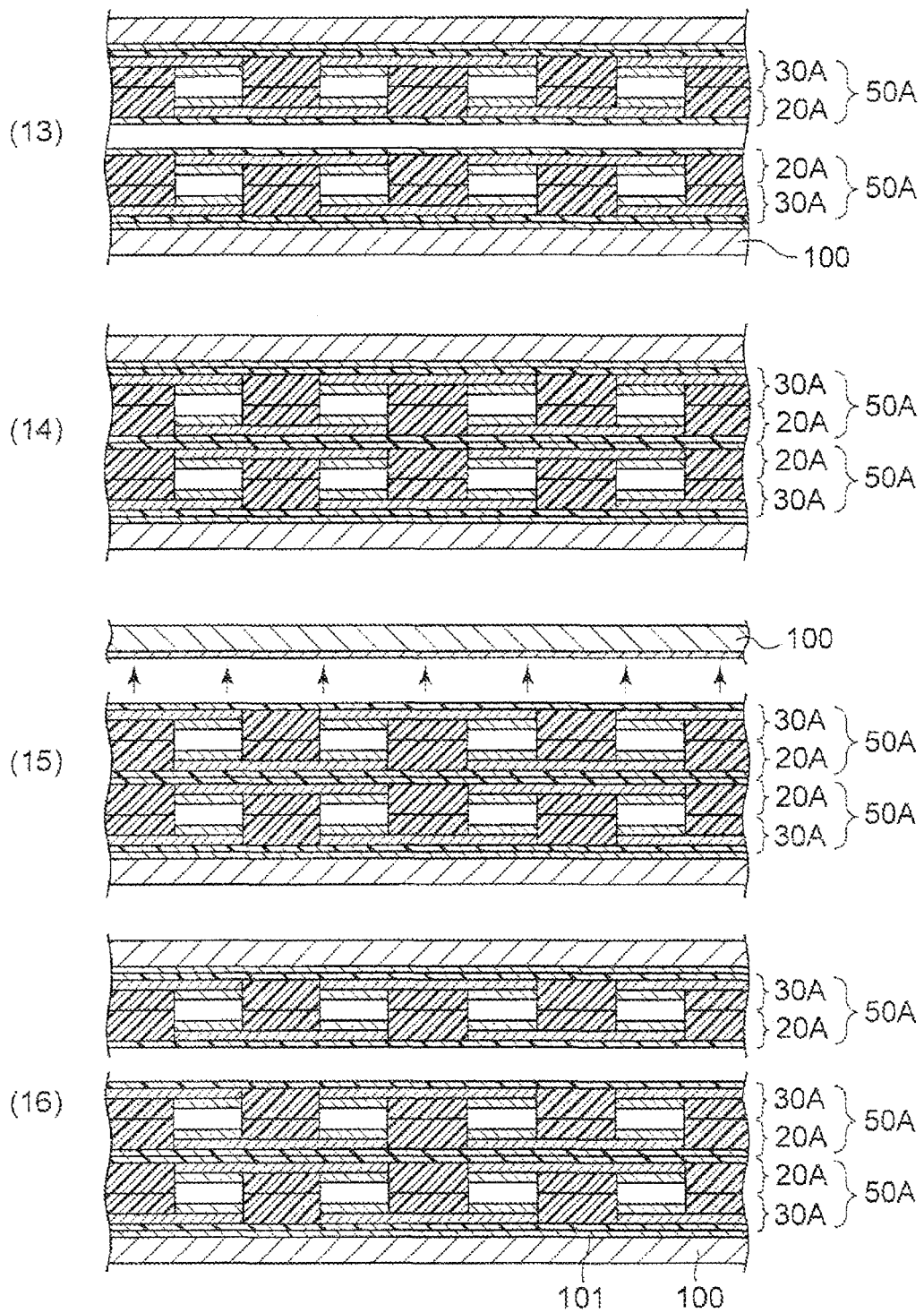
Figure 28:
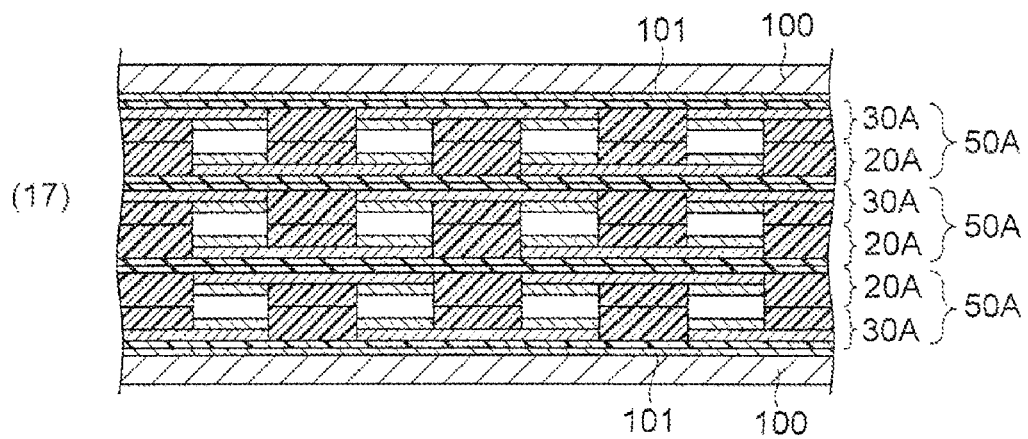
Figure 29:
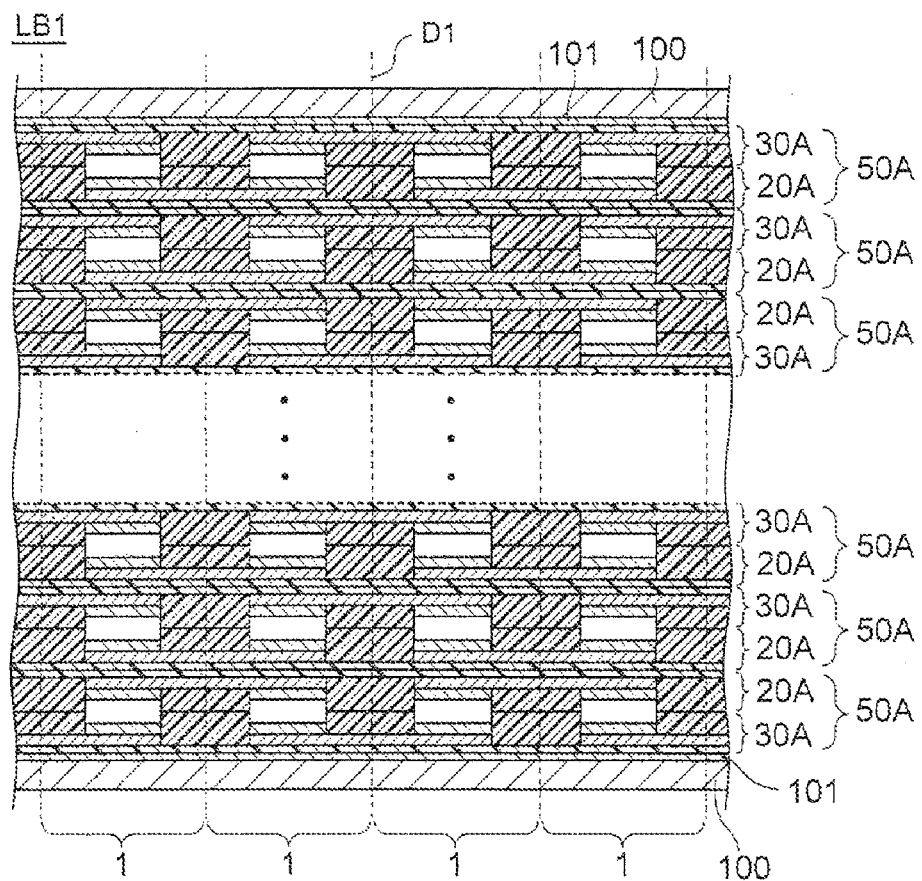
Figure 30:
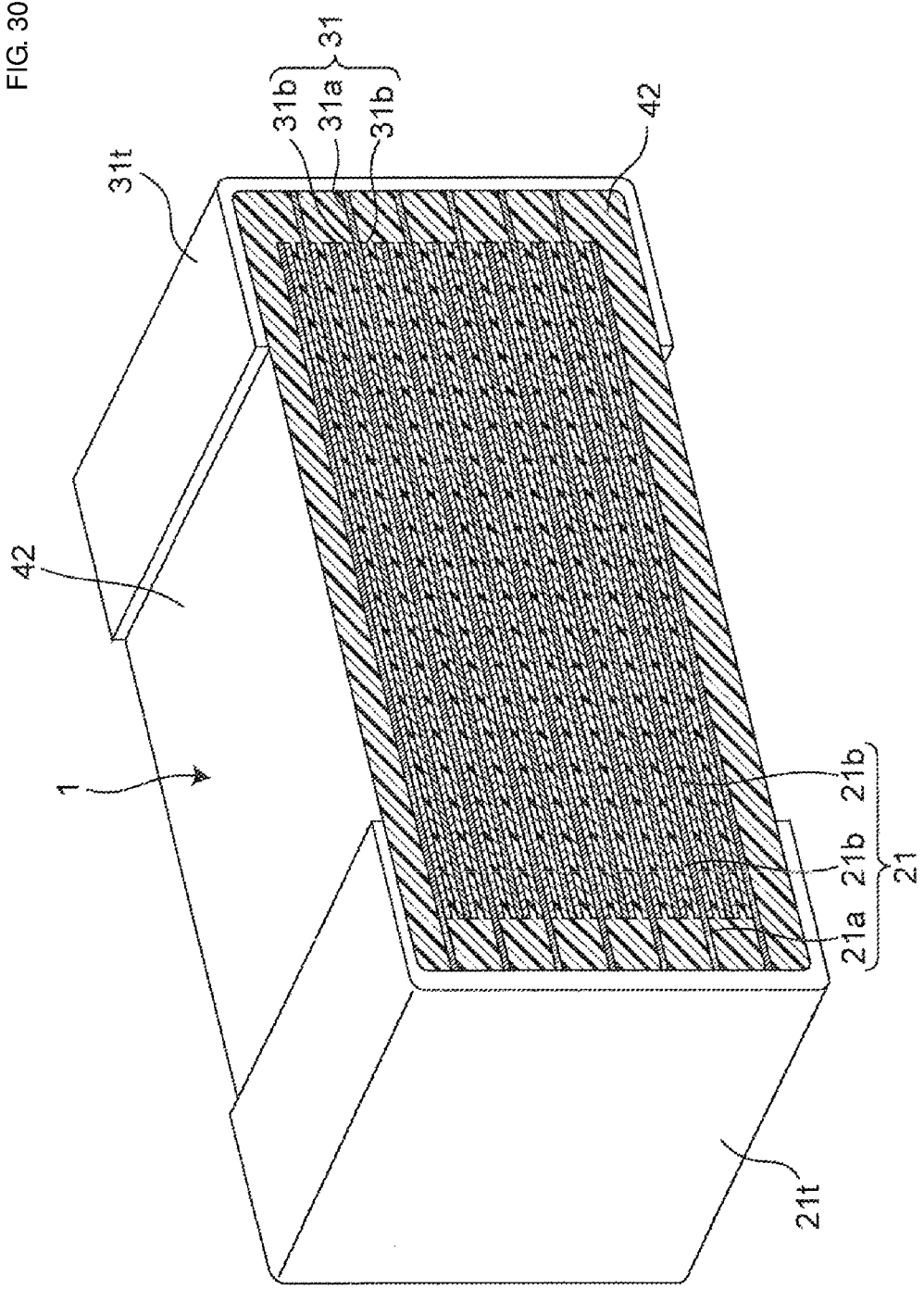
Figure 31:
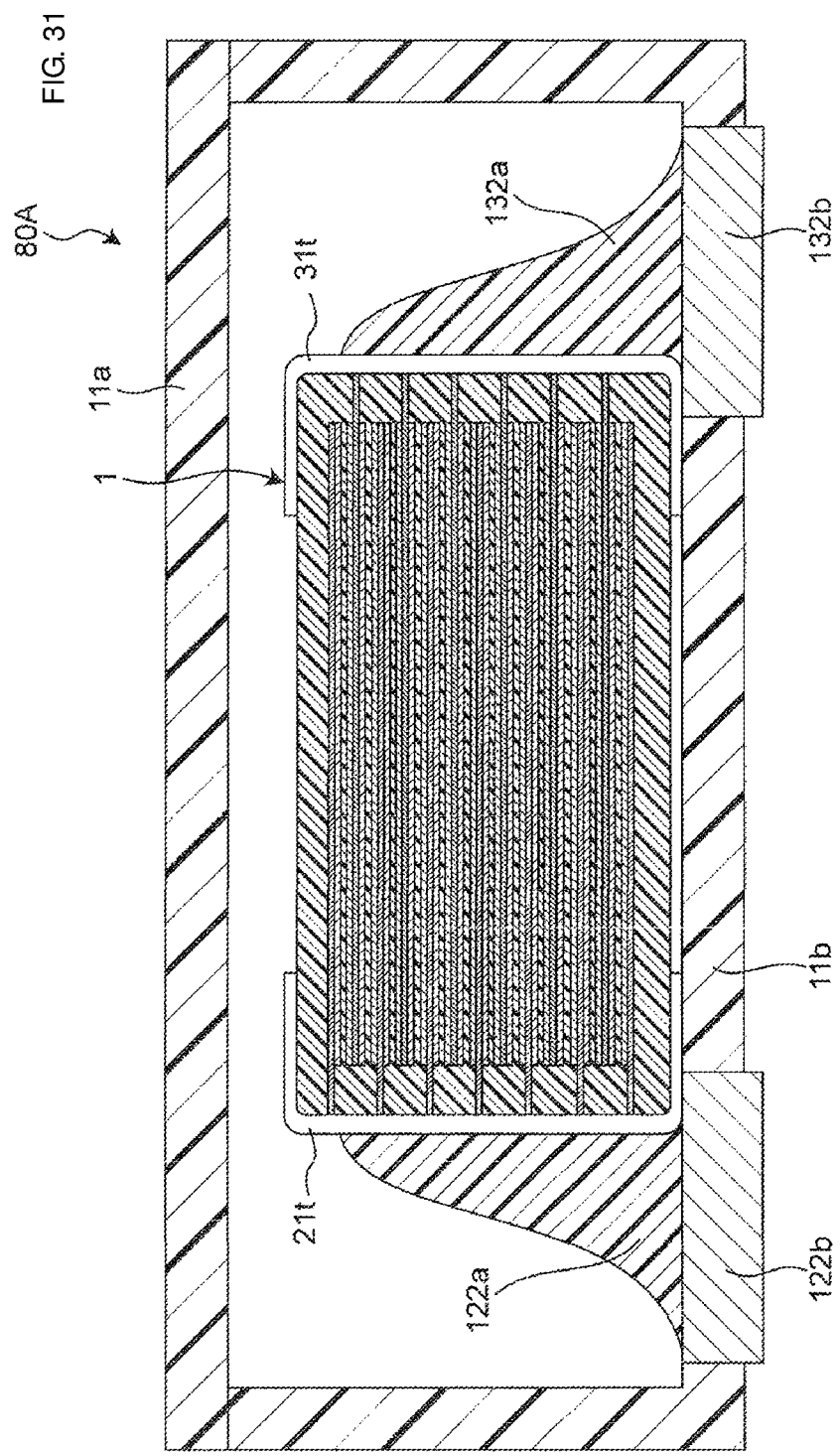
Figure 32:
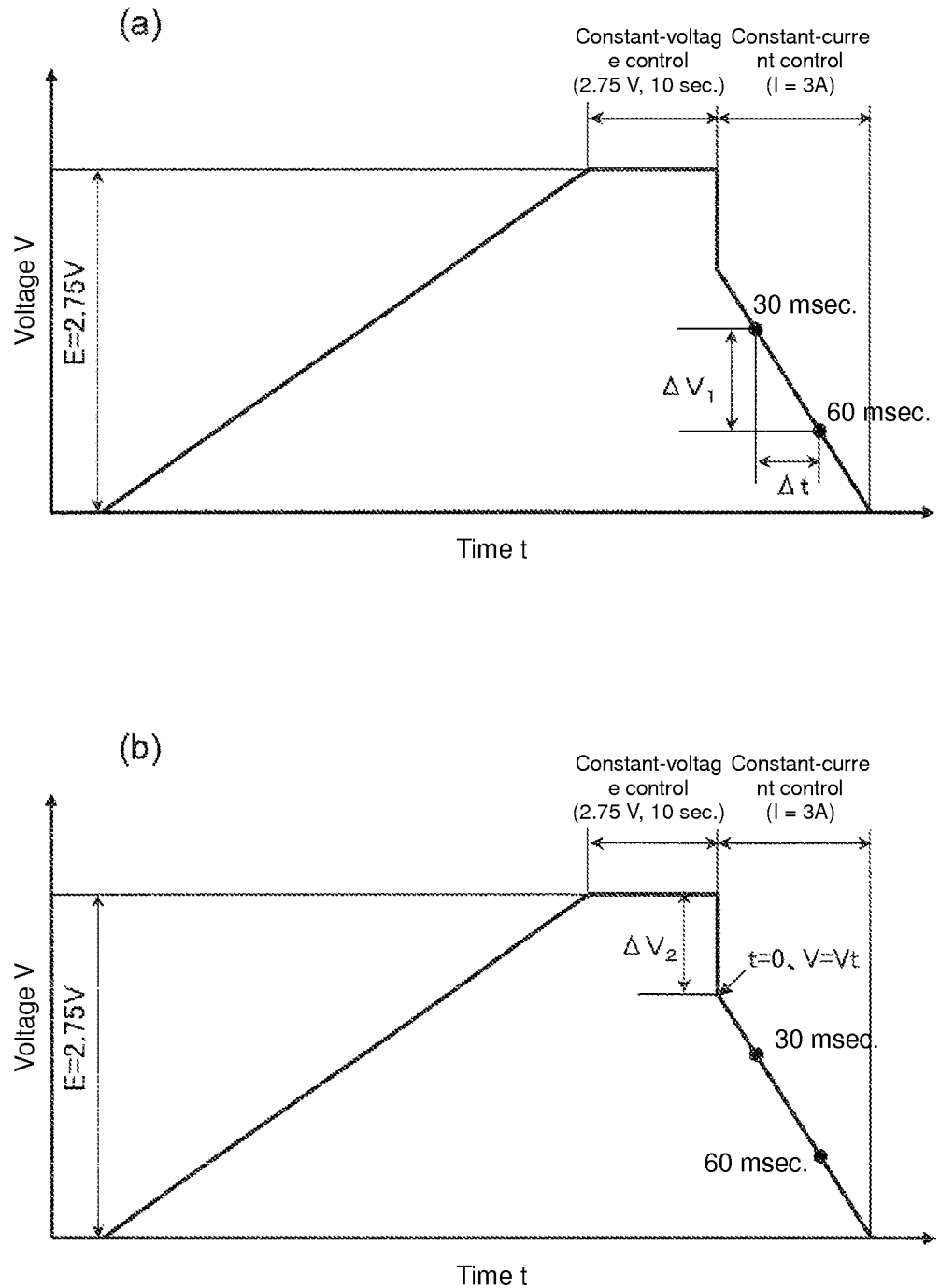
Figure 33:
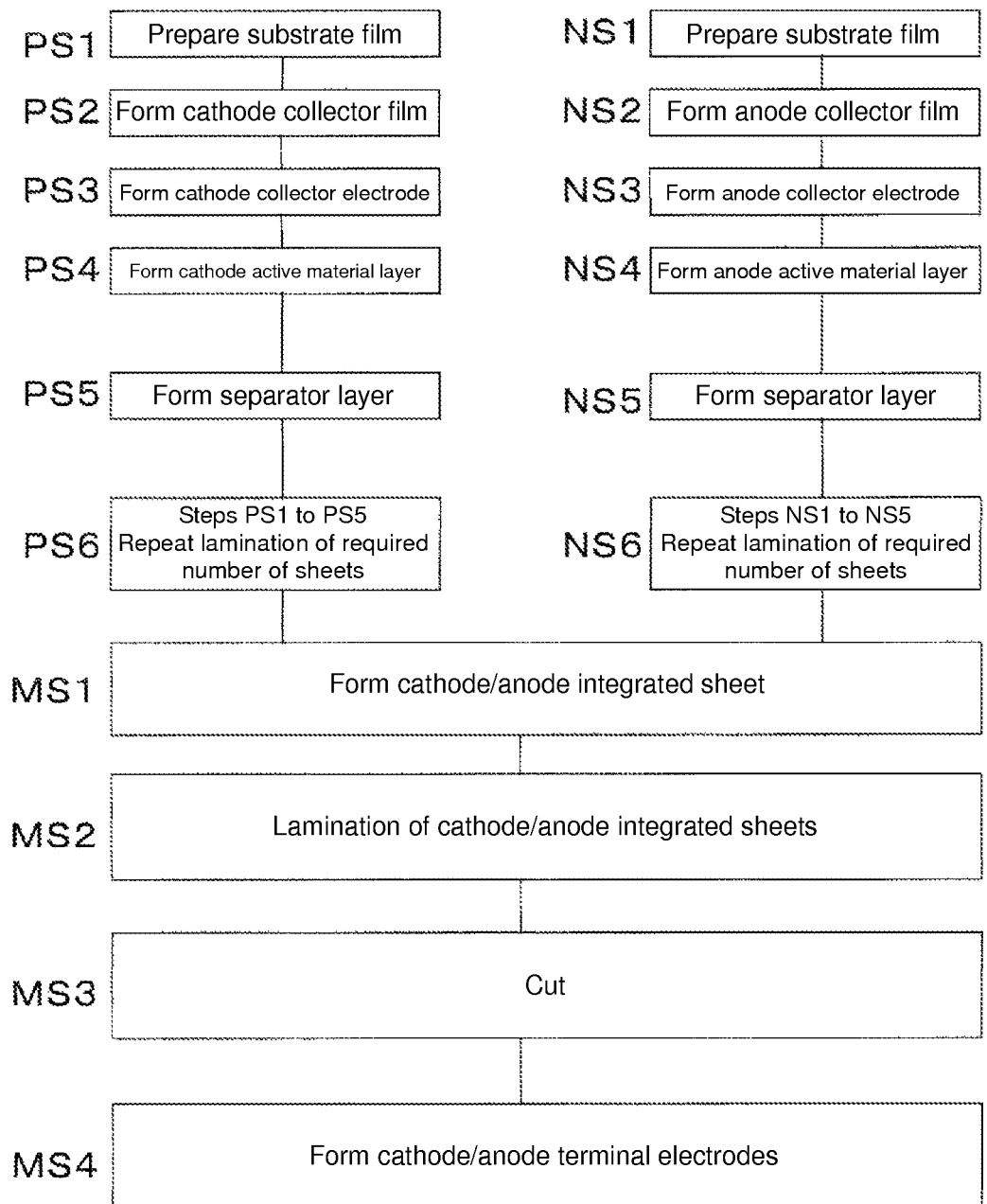

61 covering the cathode collector electrode 24*a* and the cathode active material layer 24*b* has been formed, and (4*b*) is a plan view of (4*a*);

FIG. 17 shows a process step of producing an anode composite sheet 70B in the manufacturing method for a power storage device of Embodiment 4, in which (1) is a sectional view of the substrate film 100 provided with the mold releasing layer 101, (2*a*) is a sectional view where an anode collector electrode 34*a* has been formed, (2*b*) is a plan view of (2*a*), (3*a*) is a sectional view where an anode active material layer 34*b* has been formed on the anode collector electrode 34*a*, (3*b*) is a plan view of (3*a*), (4*a*) is a sectional view where a separator layer 62 covering the anode collector electrode 34*a* and the anode active material layer 34*b* has been formed, and (4*b*) is a plan view of (4*a*);

FIG. 18 shows a process step of laminating the cathode composite sheet 70A and the anode composite sheet 70B in the manufacturing method for a power storage device of Embodiment 4, in which (5) is a sectional view of a cathode/anode integrated sheet 70AB with the separator layer 61 of the cathode composite sheet 70A and the separator layer 62 of the anode composite sheet 70B bonded to each other, (6) is a sectional view where the substrate film 100 of the cathode composite sheet 70A has been peeled after bonding of the separator layer 61 and the separator layer 62 to each other, (7) is the cathode/anode integrated sheet 70AB with the substrate film 100 of the cathode composite sheet 70A having been peeled therefrom has further been bonded with the cathode/anode integrated sheet 70AB with the substrate film 100 of the cathode composite sheet 70A having been peeled therefrom, and (8) is a sectional view where one substrate film 100 of one substrate film has been peeled after bonding of the two cathode/anode integrated sheets 70AB;

FIG. 19 shows a process step of further repeatedly laminating the cathode/anode integrated sheets 70AB in the manufacturing method for a power storage device of Embodiment 4, in which (9) is a sectional view where the cathode/anode integrated sheet 70AB has further been laminated after bonding of the two cathode/anode integrated sheets 70AB and peeling of the one substrate film 100, and (10) is a sectional view where one substrate film 100 has been peeled from the laminated body;

FIG. 20 shows a process step in a manufacturing method for a power storage device of Embodiment 5 according to the present invention, in which (1) is a sectional view of the cathode composite sheet 20A produced in a similar manner to Steps PS1 to PS7 of Embodiment 1, (2) is a sectional view of the anode composite sheet 30A produced in a similar manner to Steps NS1 to NS7 of Embodiment 1, (3) is a sectional view of a sheet 60 for separator which is formed with a separator layer 10 on the substrate film 100, (4) is a sectional view at the time of peeling the substrate film 100 of the cathode composite sheet 20A, (5) is a sectional view at the time of bonding the surface of the cathode composite sheet 20A with the substrate film 100 having been peeled therefrom to the sheet 60 for separator, and (6) is a sectional view at the time of bonding the anode composite sheet 30A onto the cathode composite sheet 20A bonded to the sheet 60 for separator;

FIG. 21 shows a process step in the manufacturing method for a power storage device of Embodiment 5, in which (7) is a sectional view at the time of peeling the substrate film 100 of the anode composite sheet 30A after bonding the anode composite sheet 30A onto the cathode composite sheet 20A, (8) is a sectional view at the time of further peeling the substrate film 100 of the anode composite sheet 30A, and (9) is a sectional view at the time of bonding the surface of the anode composite sheet 30A with the substrate film 100 having been peeled therefrom to the surface of the anode composite sheet 30A with the substrate film 100 having been peeled therefrom;

FIG. 22 shows a process step in the manufacturing method for a power storage device of Embodiment 5, in which (10) is a sectional view at the time of bonding the cathode composite sheet 20A onto the anode composite sheet 30A, and (11) is a sectional view where the cathode composite sheet 20A has been bonded onto the anode composite sheet 30A and the substrate film 100 has been peeled;

FIG. 23 shows a process step in the manufacturing method for a power storage device of a modified example according to Embodiment 5, in which (1) is a sectional view at the time of bonding the transfer film 300 to the separator layer 11 side of the cathode composite sheet 20A in the state of the cathode composite sheet 20A being bonded to the substrate film 100, (2) is a sectional view at the time of peeling the substrate film 100 from the cathode composite sheet 20A, (3) is a sectional view at the time of bonding the separator layer 10 side of the sheet 60 for separator to the surface with the substrate film 100 having been peeled therefrom, and (4) is a sectional view at the time of further peeling the transfer film 300;

FIG. 24 shows a process step of forming the cathode 21 on the substrate film 100 in the manufacturing method for a power storage device of Embodiment 6, in which (1) is a sectional view of the substrate film 100 provided with the mold releasing layer 101 and an adhesive layer 121, (2) is a sectional view where the cathode collector film 102 has been formed on the adhesive layer 121, (3) is a sectional view where the resist pattern R102 has been formed on the cathode collector film 102, (4) is a sectional view where the cathode collector film 102 has been etched, (5) is a sectional view where the resist pattern R102 has been removed, (6*a*) is a sectional view where the cathode active material layer 21*b* has been formed on a cathode collector electrode 21*a*, and (6*b*) is a plan view of (6*a*);

FIG. 25 shows a process step of forming a separator layer 42 on the cathode 21 to produce the cathode composite sheet 20A, and a process step of forming an anode collector electrode 31*a* and an anode active material layer 31*b* in the manufacturing method for a power storage device of Embodiment 6, in which (7*a*) is a sectional view where the separator layer 42 has been formed on the cathode collector electrode 21*a* and the adhesive layer 121, (7*b*) is a plan view of (7*a*), and (8*a*) is a plan view where the anode 31 has been formed on the substrate film;

FIG. 26 shows a process step of forming the cathode/anode integrated sheet 50A in the manufacturing method for a power storage device of Embodiment 6, in which (8*b*) is a sectional view of FIG. 10(8*a*), (9) is a sectional view of the anode composite sheet 30A, (10) is a sectional view where the cathode composite sheet 20A and the anode composite sheet 30A have been arranged as opposed to each other, (11) is a sectional view of the cathode/anode integrated sheet 50A where the separator layers 42 of the cathode composite sheet 20A and the anode composite sheet 30A have been bonded to each other, and (12) is a sectional view where the substrate film 100 on the cathode side of the cathode/anode integrated sheet 50A has been peeled;

FIG. 27 shows a process step of laminating the cathode/anode integrated sheet in the manufacturing method for a power storage device of Embodiment 6, in which (13) is a sectional view where two cathode/anode integrated sheets 50A have been arranged as opposed to each other, (14) is a sectional view where the two cathode/anode integrated sheets 50A have been laminated, (15) is a sectional view where the substrate film 100 of one out of those sheets has been peeled, and (16) is a sectional view where still another cathode/anode integrated sheet 50A has been arranged on the laminated cathode/anode integrated sheets 50A;

FIG. 28 (17) is a sectional view where still another cathode/anode integrated sheet 50A has been laminated on the laminated cathode/anode integrated sheets 50A in the manufacturing method for a power storage device of Embodiment 6;

FIG. 29 is a sectional view of the laminated sheet LB1 for electrochemical element of Embodiment 6, where the cathode/anode integrated sheets 50A have been laminated;

FIG. 30 is a partially sectional perspective view of an electrochemical element according to Embodiment 6, where the cathode terminal electrode 21t and the anode terminal electrode 31t have been formed on the lamination block 1 for electrochemical element;

FIG. 31 is a sectional view of an electric double layer capacitor 80A shown as an example of the power storage device according to Embodiment 6 which includes the lamination block 1 for electrochemical element;

FIG. 32 (a) is a schematic view showing a measurement method for a capacity (CAP), and FIG. 32 (b) is a schematic view showing a measurement method for an electric resistance (ESR); and FIG. 33 is a process step flow diagram of the manufacturing method for a power storage device according to Embodiment 6 of the present invention.

DETAILED DESCRIPTION OF THE PREFERRED EMBODIMENTS

Hereinafter, embodiments according to the present invention will be described with reference to the drawings.

Embodiment 1

Figure 1:
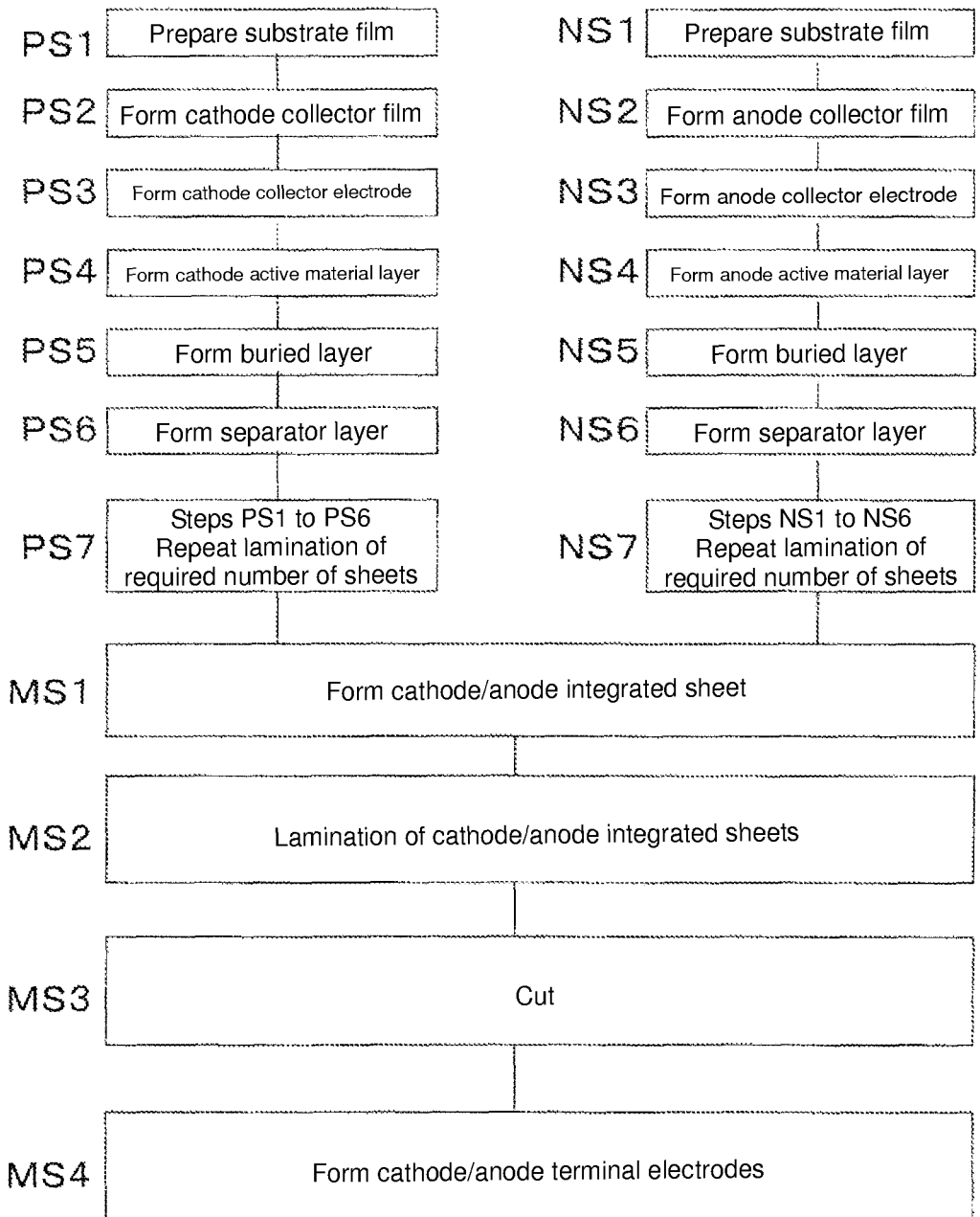
FIG. 1 is a process step flow diagram of a manufacturing method for a power storage device of Embodiment 1 according to the present invention.

FIG. 1 is a process step flow diagram of a manufacturing method for a power storage device of Embodiment 1 according to the present invention. Hereinafter, each process step will be described in accordance with the process step flow of FIG. 1.

It is to be noted that in the present description, the power storage device includes a lithium-ion secondary battery, a lithium-ion capacitor and the like besides an electric double layer capacitor shown in a later-mentioned example.

1. Production of Cathode Separator/Electrode Composite Sheet 20A

<Step PS1>

Figure 2:
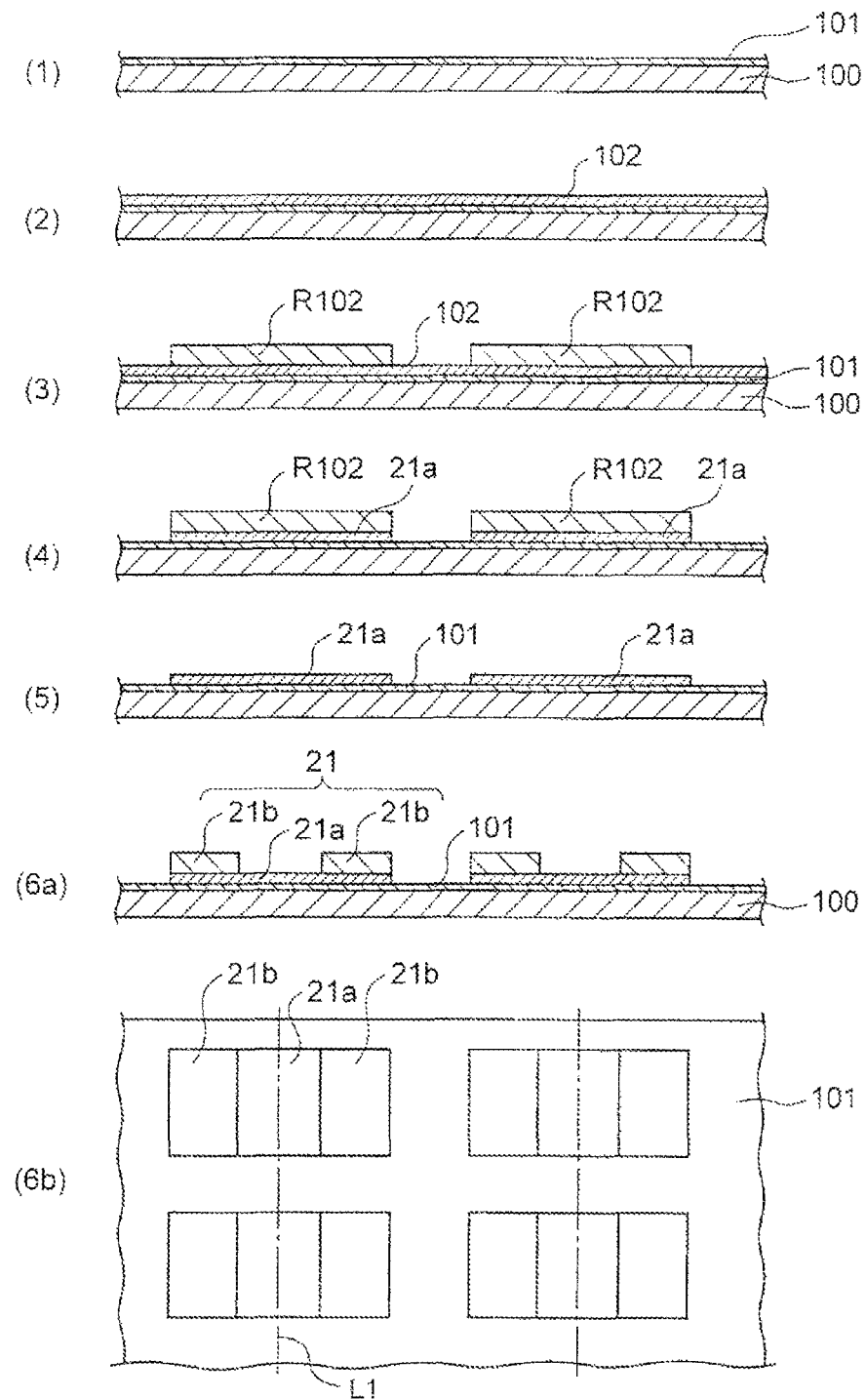
FIG. 2 shows a process step of forming a cathode 21 on a substrate film 100 in the manufacturing method for a power storage device of Embodiment 1, in which (1) is a sectional view of the substrate film 100 provided with a mold releasing layer 101, (2) is a sectional view where a cathode collector film 102 has been formed on the mold releasing layer 101, (3) is a sectional view where a resist pattern R102 has been formed on the cathode collector film 102, (4) is a sectional view where the cathode collector film 102 has been etched, (5) is a sectional view where the resist pattern R102 has been removed, (6a) is a sectional view where a cathode active material layer 21b has been formed on a cathode collector electrode 21a, and (6b) is a plan view of (6a)

First, as shown in FIG. 2(1), for example, a substrate film 100 is prepared which is made of polyethylene terephthalate and formed with a silicon-based mold releasing layer 101 on its surface.

A substrate film having mold releasing properties by itself can be used without being subjected to a treatment to add molding properties.

As for the substrate film not having mold releasing properties, it is preferable to be subjected to the treatment to add mold releasing properties such as formation of the mold releasing layer 101 so that the mold releasing properties can be more enhanced.

As the substrate film 100, there can be used a plastic film such as polypropylene, polyester, polycarbonate, polyamide, polyamide-imide, polyethylene, a fluorine resin or cellulose acetate, or some others such as cellophane or paper.

Examples of the treatment to add molding properties may include a method of coating the top of the substrate film with a silicon resin, wax, a surfactant, a metal oxide, a fluorine resin, or the like.

As the mold releasing layer 101, other than the above, there can be appropriately used those mainly composed of one or more than one of resins such as cellulose nitrate, rigid polyvinyl chloride, polyamide, polyester, an acrylate resin, a melamine resin, a urea resin, an epoxy resin and an urethane resin, and examples of the treatment to add molding properties to those may include formation by coating the top of the substrate film by, for example, a photogravure technique.

Further, an inorganic oxide filler such as silica is preferably contained in the mold releasing layer because it leads to further improvement in mold releasing properties.

<Step PS2>

Next, as shown in FIG. 2(2), a cathode collector film 102 is formed on the substrate film 100 by, for example, vapor deposition.

In such a manner, forming the cathode collector film 102 on the substrate film 100 with a smooth surface renders high continuity, to facilitate formation of the cathode collector film 102 with low resistance, though having a small thickness, and this results in effective promotion of reduction in size and profile of the power storage device.

Further, as the formation method for the cathode collector film 102, other than vapor deposition, known techniques such as sputtering or application can be employed. In vapor deposition and sputtering, the resistance is low due to favorable film continuity, to facilitate formation of a collector film with a small film thickness, so as to facilitate reduction in size and profile of the power storage device.

<Step PS3>

As shown in FIG. 2(3), on the cathode collector film 102, a plurality of resist patterns R102 are printed at a predetermined interval and then dried. This resist pattern R102 is, for example, arranged in a matrix form, and formed in a similar rectangular shape to that of the cathode collector electrode 21a.

Next, as shown in FIG. 2(4), the cathode collector film 102 is etched with the resist pattern R102 used as an etching mask, and as shown in FIG. 2(5), the resist pattern R102 is peeled. As thus described, the cathode collector electrode 21a in a rectangular shape is formed.

As the masking method, other than the method of printing a resist by screen printing, there may be used a method of printing a resist by photogravure printing, photolithography using an application-type resist, photolithography using a dry film resist, or some other methods. When emphasis is to be placed on low cost, screen printing and photogravure printing are preferred, and when emphasis is to be placed on accuracy, photolithography is preferred.

Further, as the formation method for the collector electrode, other than the method of etching the collector film, there may be employed a method of directly vapor-depositing the collector film on the substrate film formed with the mold releasing layer by use of a metal mask, a method of directly vapor-depositing the collector film by use of an oil mask to perform a plasma asking treatment, or some other methods.

Further, when the cathode collector electrode 21a is formed with an oxide film on its surface, it is preferable to include a process step of removing the oxide film of the cathode collector electrode 21a after formation of the cathode collector electrode 21a. As for removal of the oxide film of the cathode collector electrode 21a, for example, when the cathode collector electrode 21a is formed of Al, an oxide film on the Al-surface can be removed by passage through mixed acid of hydrofluoric acid and sulfuric acid.

<Step PS4>

As shown in FIGS. 2(6a) and (6b), cathode active material layers 21b are formed at two places on the cathode collector electrode 21a.

The cathode active material layers 21b can be formed, for example, by screen-printing active material slurry on the cathode collector electrode 21a, and are formed, for example, symmetrically with respect to a center line L1 orthogonal to a longitudinal direction of the cathode collector electrode 21a at predetermined intervals from the center line L1.

In the cathode active material layers 21b, it is preferable to respectively form the side surfaces, excluding the inner side surfaces which are opposed to each other with the center line L1 placed therebetween, so as to agree with the outer edge of the cathode collector electrode 21a.

<Step PS5>

Figure 3:
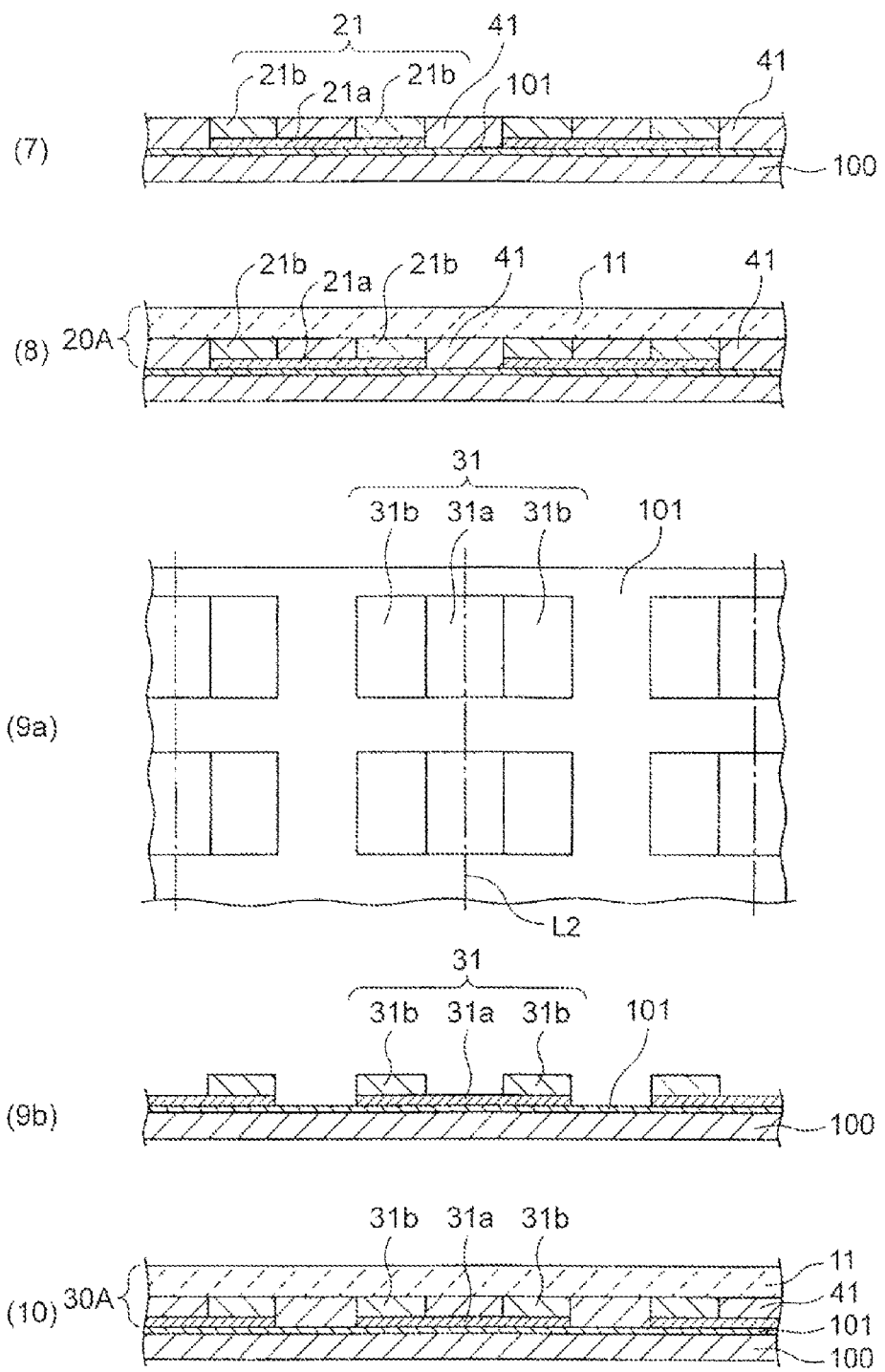
FIG. 3 shows a process step of forming a separator layer 11 on the cathode 21 to produce a cathode separator/electrode composite sheet 20A and a process step of producing an anode separator/electrode composite sheet 30A in the manufacturing method for a power storage device of Embodiment 1, in which (7) is a sectional view where a buried layer 41 has been formed on the surface formed with the cathode collector electrode 21a and the cathode active material layer 21b, to planarize the surface, (8) is a sectional view where the separator layer 11 has been formed on the planarized surface, (9a) is a plan view where an anode 31 has been formed on a substrate film, (9b) is a sectional view of (9a), and (10) is a sectional view of the anode separator/electrode composite sheet 30A.

Next, as shown in FIG. 3(7), a buried layer 41, which fills a gap formed due to formation of the cathode collector electrode 21a and the cathode active material layer 21b to planarize the surface, is formed in a portion not formed with the cathode active material layer 21b.

This buried layer 41 preferably contains a similar component to that of a separator layer formed in a later process step.

Although the example was shown in present Embodiment 1 where the buried layer 41 is formed for planarization after formation of the cathode active material layer 21b, the present invention is not restricted to this, and the cathode active material layer 21b may be formed so as to fill a gap between the buried layer 41 after formation of the buried layer 41.

<Step PS6>

Then, as shown in FIG. 3(8), a separator layer 11 is formed on the surfaces of the planarized buried layer 41 and cathode active material layers 21b.

Since the surface to be formed with the separator layer 11 has been planarized by the buried layer 41 as thus described, it is possible to accurately and easily form a separator layer with a flat surface and without a defect such as a hole.

A cathode separator/electrode composite sheet 20A is produced through the above process steps of Steps PS1 to PS6.

<Step PS7>

In Step PS7, Steps PS1 to PS6 are repeated, to produce a required number of cathode separator/electrode composite sheets 20A.

2. Production of Anode Separator/Electrode Composite Sheet 30A

As shown in FIG. 1, an anode separator/electrode composite sheet 30A is produced in Steps NS1 to NS7 which are similar to Steps PS1 to PS7 at the time of producing the cathode separator/electrode composite sheet 20A.

In the anode separator/electrode composite sheet 30A, as shown in FIGS. 3(9a) and (9b), an anode collector electrode 31a is arranged such that a center line L2 orthogonal to its longitudinal direction is located at the center of the center line L1 of the cathode collector electrode 21a in the cathode separator/electrode composite sheet 20A, and anode active material layers 31b are formed symmetrically with respect to the center line L2 and in such positions as to be superimposed on the cathode active material layers 21b.

Further, in Steps NS2 to NS4, the anode collector film, the anode collector electrode 31a and the anode active material layer 31b are formed in place of the cathode collector film 102, the cathode collector electrode 21a and the cathode active material layer 21b in Steps PS2 to PS4, but at the time of producing an electric double layer capacitor as an electrochemical element, it is possible to use respectively similar ones for the cathode collector film 102 and the anode collector film, for the cathode collector electrode 21a and the anode collector electrode 31a, and for the cathode active material layer 21b and the anode active material layer 31b.

It is to be noted that shapes and areas of the cathode collector electrode 21a and the anode collector electrode 31a may be the same or may be different. Further, shapes and areas of the cathode active material layer 21b and the anode active material layer 31b may be the same or may be different. The area of either the cathode 21 or the anode 31 can be made larger in consideration of positional displacement of the cathode 21 or the anode 31, to hold an opposed area of the cathode 21 and the anode 31 unchanged even when the position of the cathode 21 or the anode 31 is displaced, so as to suppress changes in resistance and capacity of the electric double layer capacitor.

It should be noted that in the present description, at the time of simplification, the cathode separator/electrode composite sheet 20A is referred to as a cathode composite sheet 20A, and the anode separator/electrode composite sheet 30A is referred to as an anode composite sheet 30A.

Further, in the present description, at the time of describing a matter in common between the cathode and the anode without making a distinction therebetween, the cathode composite sheet 20A and the anode composite sheet 30A are referred to as a composite sheet, the cathode collector electrode 21a and the anode collector electrode 31a are simply referred to as a collector electrode, and the cathode active material layer 21b and the anode active material layer 31b are simply referred to as an active material layer.

The example has been described as above in present Embodiment 1 where the collector electrode is formed and thereafter coated with the active material layer, but in the present invention, the composite sheet may be formed in such a manner that the separator layer 11 is first formed on the substrate film 100 and the active material layer is then formed thereon, whereafter the collector electrode is formed.

However, as shown in present Embodiment 1, when the top of the collector is to be coated with the active material layer, a binder in the active material layer is deposited in the vicinity of the interface between the active material layer and the collector electrode, so as to allow an increase in bonding force between the active material layer and the collector electrode.

Further, as shown in present Embodiment 1, when the top of the collector electrode having high continuity and reduced in thickness is to be coated with the active material layer, it is possible to further reduce the size and profile.

Moreover, when the collector electrode is to be formed on the active material layer, etching of the collector electrode and removal of the oxide film of the collector electrode are difficult, but in present Embodiment 1, since the active material layer is to be formed on the collector electrode, the active material layer can be formed after etching of the collector electrode and removal of the oxide film of the collector electrode, to facilitate etching and removal of the oxide film.

3. Production and Lamination of Cathode/Anode Integrated Sheet

<Step MS1>

Figure 4:
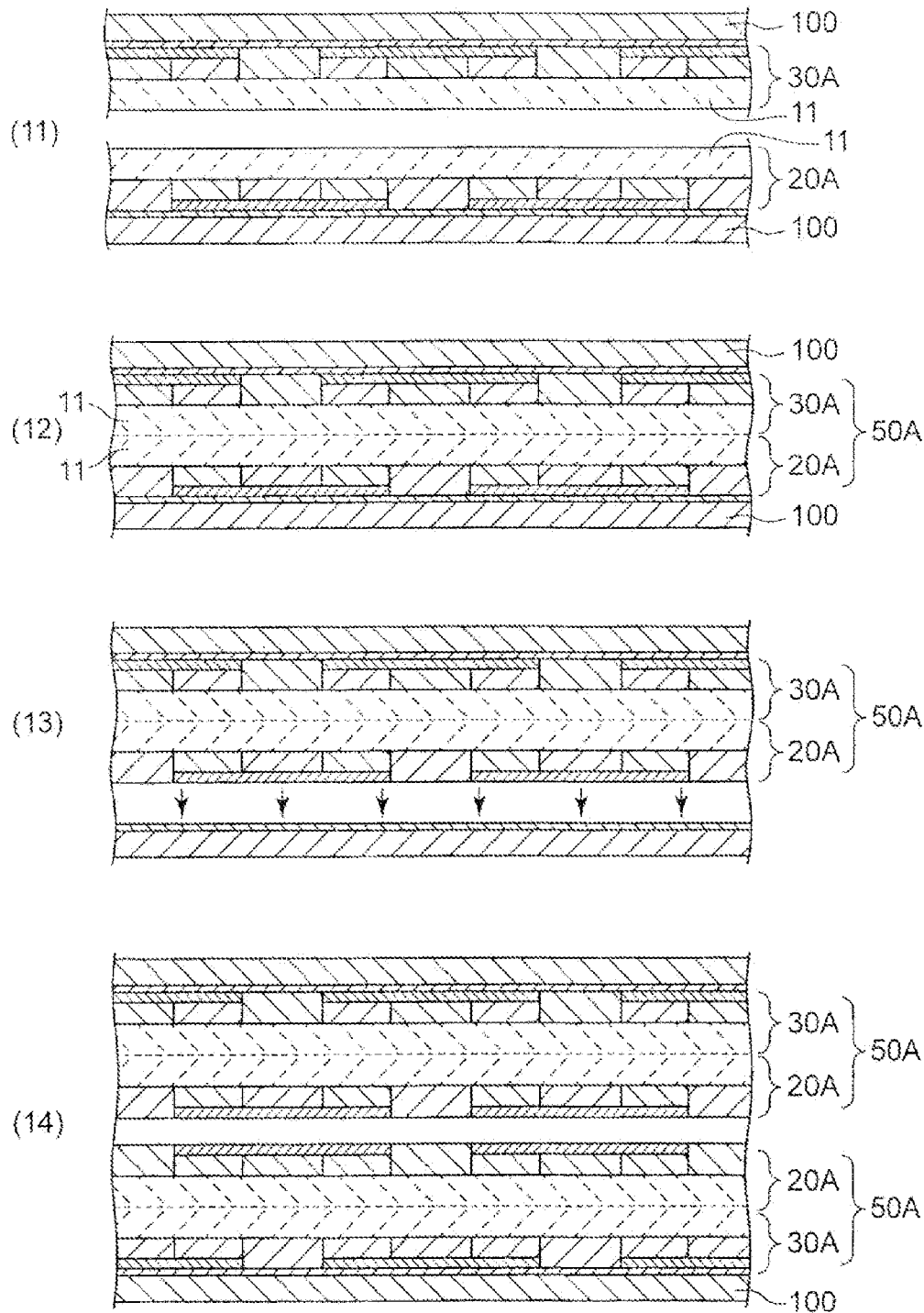
FIG. 4 shows a process step of producing a cathode/anode integrated sheet in the manufacturing method for a power storage device of Embodiment 1, in which (11) is a sectional view where the cathode composite sheet 20A and the anode composite sheet 30A have been arranged as opposed to each other, (12) is a sectional view of a cathode/anode integrated sheet 50A where the separator layers 11 of the cathode composite sheet 20A and the anode composite sheet 30A have been bonded to each other, (13) is a sectional view where the substrate film 100 on the cathode side of the cathode/anode integrated sheet 50A has been peeled, and (14) is a sectional view where two cathode/anode integrated sheets 50A have been arranged as opposed to each other.

First, as shown in FIG. 4(11), the cathode composite sheet 20A and the anode composite sheet 30A are arranged such that the surfaces thereof which are formed with the separator layers 11 are opposed to each other, and the cathode composite sheet 20A and the anode composite sheet 30A are uniformly pressurized from both sides thereof for example by means of a pressure plate, not shown, for heating so that the separator layers 11 are bonded to each other, as shown in FIG. 4(12). As thus described, a cathode/anode integrated sheet 50A is produced.

At this time, for example, a temperature of the pressure plate is set to 150° C., pressure in pressurization to 0.05 MPa, and pressurization time to one minute.

In the cathode/anode integrated sheet 50A produced by bonding the separator layers 11 to each other in such a manner, the cathode composite sheet 20A and the anode composite sheet 30A on both sides of the pasted surface have almost equal expansion/contraction characteristics with respect to heat, thereby to suppress warpage after bonding so as to facilitate handling in the following manufacturing process.

Further, in present Embodiment 1, warpage of the cathode composite sheet 20A, the anode composite sheet 30A and the cathode/anode integrated sheet 50A can be suppressed as follows.

That is, since a resin which is often used at the time of forming the separator layer 11 generally has a large thermal expansion coefficient, expansion/contraction due to heating/cooling are large at the time of producing the composite sheet and at the time of producing a laminated body of the cathode/anode integrated sheets 50A and the like. For this reason, when materials constituting the collector electrode and the active material layer which have small thermal expansion coefficients are bonded with the separator layer 11 made up of the resin, there tends to occur a problem in that warpage occurs in the composite sheet or the laminated body of the cathode/anode integrated sheet 50A and the like, and further, the separator layer 11 made of the resin is peeled from the active material layer.

In order to suppress this, the separator layer 11 is made to contain an inorganic filler having a relatively small thermal expansion coefficient, thereby allowing reduction in thermal expansion difference between the separator layer 11 and the active material layer as well as the collector electrode, so as to suppress warpage and peeling of the sheet at the time of producing the composite sheet and the laminated body.

Further, when the separator layer 11 is made to contain the inorganic filler, at the time of pressure-bonding of the separator layer 11, it becomes resistant to breakage due to pressure-bonding, thereby allowing prevention of a short circuit caused by penetration of the active material layer through the separator 11. Further, it is possible to reduce a rate by volume of the resin with respect to the separator, so as to suppress an increase in thickness of the separator layer 11 caused by expansion of the resin due to an electrolyte.

Moreover, since the separator layers have double-layered structure in the cathode/anode integrated sheet 50A, even when an unintended defect occurs in one separator layer 11, insulating properties between the cathode and the anode can be ensured in the other separator layer. Furthermore, even when both separator layers have defects, the respective defective sites hardly overlap in the same position, and hence a short circuit between the cathode and the anode can be prevented.

Further, since the cathode composite sheet 20A and the anode composite sheet 30A are bonded to each other and regarded as the cathode/anode integrated sheet 50A, even when the cathode composite sheet 20A and the anode composite sheet 30A are reduced in thickness, it is easier to handle the sheet while holding the regular arrangement and predetermined positions of the cathode composite sheet 20A and the anode composite sheet 30A without breakage, so as to allow further reduction in size and profile of the device.

After bonding the separator layers 11 to each other, either the substrate film 100 on the anode composite sheet 30A side or that on the cathode composite sheet 20A is peeled.

For example, at the time of peeling the substrate film 100 on the cathode side, as shown in FIG. 4(13), the anode side of the cathode/anode integrated sheet 50A is brought into contact with a suction board, not shown, for suction and the cathode/anode integrated sheet 50A is lifted, to peel the substrate film 100 on the cathode side.

When the substrate film 100 on the cathode side is to be peeled, stronger bonding force needs to be ensured between the cathode composite sheet 20A and the anode composite sheet 30A than bonding force between the substrate film 100 and the cathode composite sheet 20A, and the difference in bonding force therebetween can be relatively easily realized when the mold releasing layer is present between the substrate film 100 and the cathode composite sheet 20A.

On the other hand, when the mold releasing layer is not present between the substrate film 100 and the cathode composite sheet 20A, the above difference in bonding force can be realized by bonding the cathode composite sheet 20A and the anode composite sheet 30A to each other at high temperature and high pressure. However, in bonding at high temperature and high pressure, caution needs to be taken to prevent breakage of voids in the active material layer and the separator layer and prevent deformation of the shapes of the cathode composite sheet 20A and the anode composite sheet 30A.

Further, in the case of formation of the collector electrode on the substrate film by vapor deposition or in some other case, bonding force with the substrate film becomes stronger due to thermal damage to the substrate film and sinkage of vapor deposition particles by kinetic energy, and peeling may become difficult without the mold releasing layer. Accordingly, in the present invention, it is preferable to previously form a mold releasing layer being thick enough to allow prevention of damage to the substrate film.

At the time of peeling the substrate film 100 on the anode side, the cathode side of the cathode/anode integrated sheet 50A is brought into contact for suction, and the cathode/anode integrated sheet 50A is lifted, to peel the substrate film 100 on the anode side.

In such a manner, a required number of cathode/anode integrated sheets 50A, with either the cathode composite sheet 20A side or the anode composite sheet 30A side bonded with the substrate film 100, are produced.

4. Lamination of Cathode/Anode Integrated Sheets
<Step MS2>

For example, as shown in FIG. 4(14), in the first lamination, below the cathode/anode integrated sheet 50A with the anode side having been sucked by the suction board, the cathode/anode integrated sheet 50A with the substrate film 100 bonded to the anode composite sheet 30A side is arranged such that the substrate film 100 is located on the downside, and thereafter, as shown in FIG. 5(15), those two cathode/anode integrated sheets 50A are brought into contact with each other, and then bonded by uniform pressurization of the whole surface by means of a pressure plate, not shown.

At this time, for example, a temperature of the pressure plate is set to 150° C., pressure in pressurization to 0.05 MPa, and pressurization time to one minute.

Figure 8:
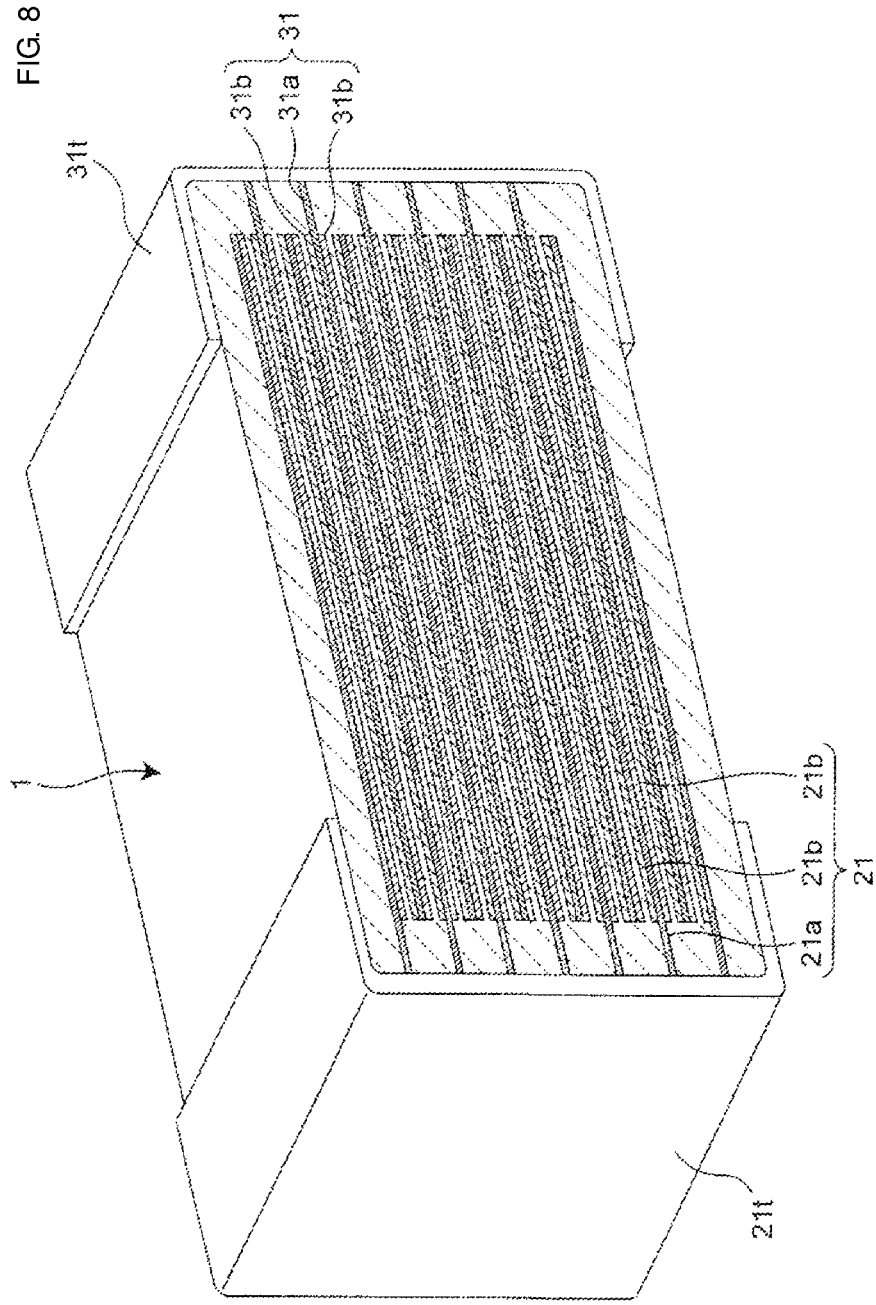
FIG. 8 is a partially sectional perspective view of an electrochemical element of Embodiment 1, where a cathode terminal electrode 21t and an anode terminal electrode 31t have been formed on a lamination block 1 for electrochemical element.

It is to be noted that in the case of producing the lamination block 1 for electrochemical element where the separator layers are arranged in the upper and lower outermost layers as shown in FIG. 8, for example, a sheet for separator which is obtained by forming only a separator layer with a predetermined thickness (e.g. 6 μm) on a substrate film is used, and in the first lamination, the cathode/anode integrated sheet 50A is laminated on the separator layer of the sheet for separator.

Next, as shown in FIG. 5(16), the substrate film 100 on the anode side of the cathode/anode integrated sheet 50A, which is sucked by the suction board, is peeled.

Figure 6:
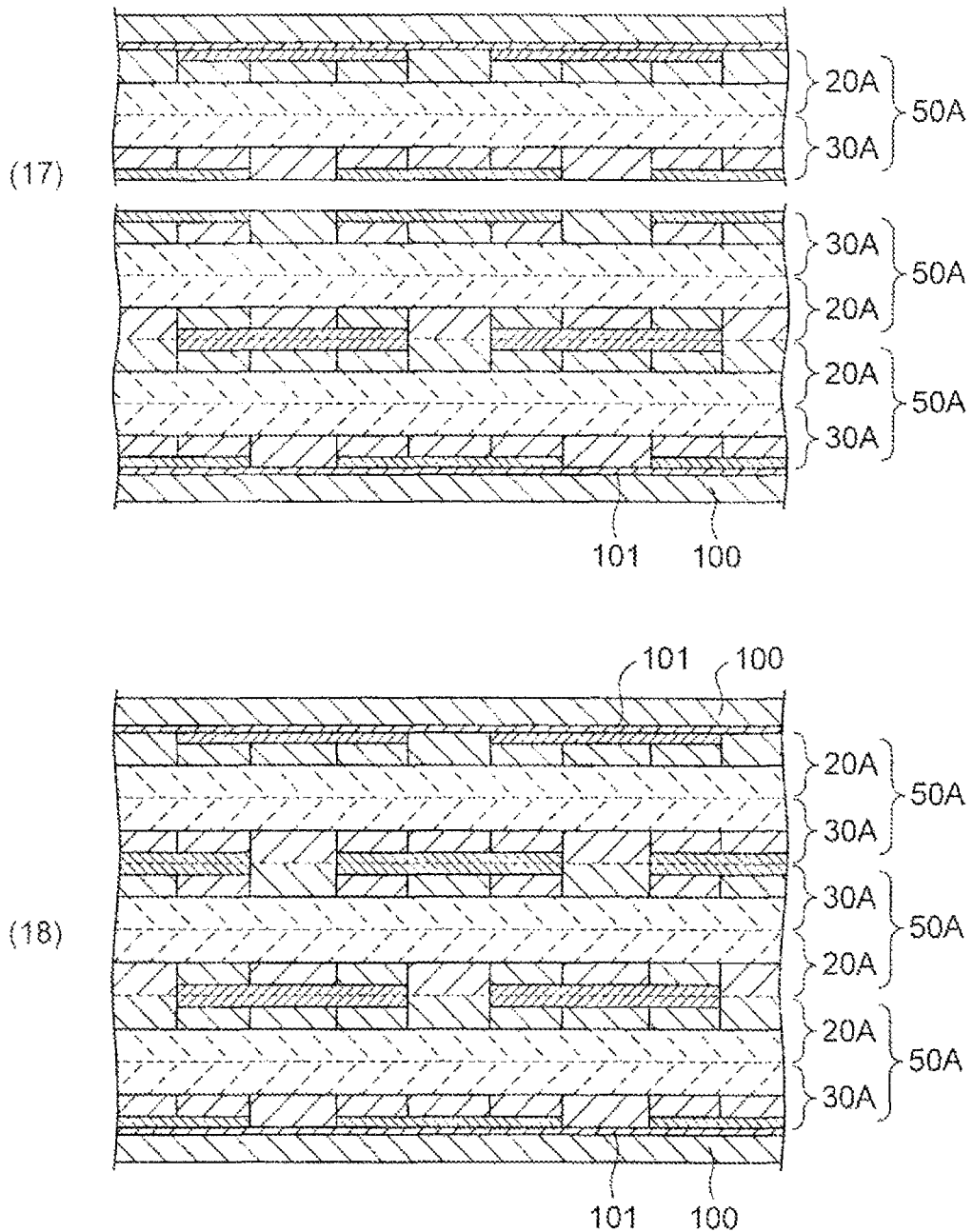
FIG. 6 shows a process step of repeating lamination of the cathode/anode integrated sheets 50A in the manufacturing method for a power storage device of Embodiment 1, in which (17) is a sectional view where the laminated cathode/anode integrated sheets 50A have been arranged with still another cathode/anode integrated sheet 50A, and (18) is a sectional view where the laminated cathode/anode integrated sheets 50A have been bonded with still another cathode/anode integrated sheet 50A.

Then, on the cathode/anode integrated sheet 50A with the substrate film 100 on its anode side having been peeled therefrom, another cathode/anode integrated sheet 50A with the substrate film 100 on its anode side having been peeled therefrom is arranged such that the anode sides are opposed to each other as shown in FIG. 6(17), and the anode sides are bonded to each other as shown in FIG. 6(18).

Next, the substrate film 100 on the cathode side of laminated another cathode/anode integrated sheet 50A is peeled, and thereon, the cathode/anode integrated sheet 50A with the substrate film 100 on the anode side having been peeled therefrom is arranged such that the cathode sides are opposed to each other, and the cathode sides are bonded to each other.

Figure 7:
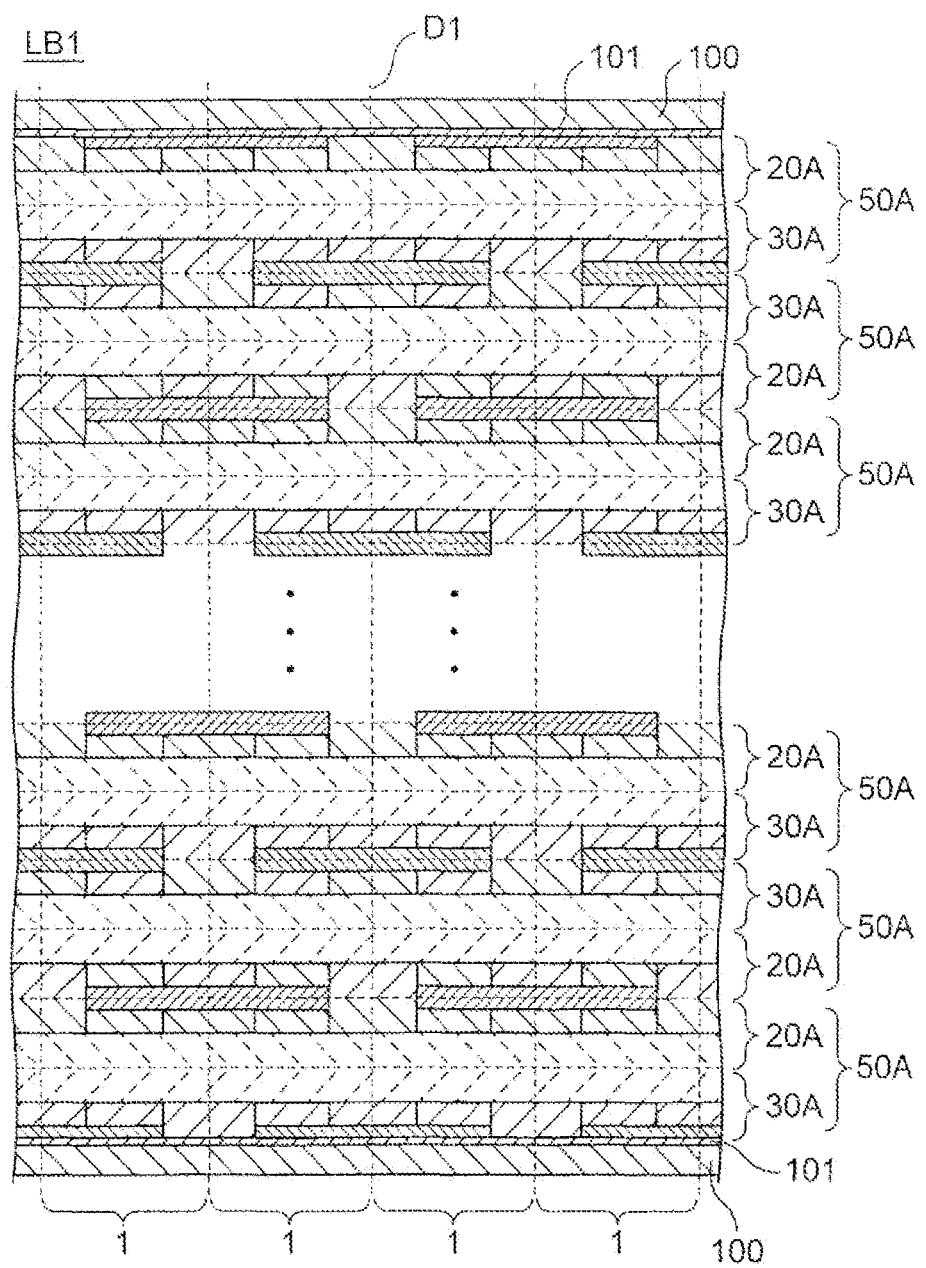
FIG. 7 is a sectional view of a laminated sheet LB1 for electrochemical element of Embodiment 1, where the cathode/anode integrated sheets 50A have been laminated.

Hereinafter, Steps MS1 and MS2 are repeated a required number of times, to produce a laminated sheet LB1 for electrochemical element where the cathode/anode integrated sheets 50A are laminated, as shown in FIG. 7.

In addition, in the case of producing the lamination block 1 for electrochemical element with the separator layers arranged in the outermost layers as shown in FIG. 8, a sheet for separator which is obtained by forming only a separator layer, the same one as used in the first lamination, is used and at the end of the lamination, the separator layer of the sheet for separator is opposed and bonded.

Further, in the lamination block 1 for electrochemical element which is produced by the above process steps, as shown in FIG. 7, the cathode collector electrode 21a and the anode collector electrode 31a as the outermost layers are each one layer, and hence thinner than the collector electrode on the inside which is formed by superimposition of two layers of the cathode collector electrodes 21a or the anode collector electrodes 31a, but in FIG. 8, all the cathode collector electrodes and the anode collector electrodes are drawn so as to have the same thickness due to constraints in drawing.

However, in the present invention, for example, thicknesses of the collector electrode and the active material layer may be made the same regardless of formation places, or those can be appropriately changed in accordance with the formation places or the manufacturing method.

<Step MS3>

Next, after peeling of the substrate films 100 arranged in the upper and lower outermost layers of the laminated sheet LB1 for electrochemical element, the laminated sheet LB1 for electrochemical element is cut along a cut line D1, to produce the lamination block 1 for electrochemical element.

It is to be noted that in this step, the substrate film 100 may be peeled after cutting of the laminated sheet LB1 for electrochemical element.

<Step MS4>

Then, as shown in FIG. 8, out of the cut surfaces of the cut lamination block 1 for electrochemical element, a cathode terminal electrode 21t is formed on the side surface where the cathode collector electrode 21a is exposed and an anode terminal electrode 31t is formed on the side surface where the anode collector electrode 31a is exposed.

Herein, the cathode terminal electrode 21t and the anode terminal electrode 31t can be formed by attaching Al to the side surfaces of the lamination block 1 for electrochemical element by sputtering, for example.

Other than by sputtering, the cathode terminal electrode 21t and the anode terminal electrode 31t may be produced by direct formation of a conductive film on the side surface of the lamination block 1 for electrochemical element by vapor deposition, ion-plating, thermal spraying, cold splaying, plating or the like.

Further, the cathode terminal electrode 21t and the anode terminal electrode 31t may be formed by directly applying a conductive adhesive agent to the side surface of the lamination block 1 for electrochemical element by dipping.

The lamination block 1 for electrochemical element with the cathode terminal electrode 21t and the anode terminal electrode 31t formed on the side surfaces thereof is housed into a package which is not shown and provided with a cathode package electrode and an anode package electrode, along with the electrolyte, to produce a power storage device.

At the time of housing the lamination block 1 for electrochemical element into the package, for example, a conductive adhesive agent containing gold as the conductive particles is applied onto the cathode terminal electrode 21t and the anode terminal electrode 31t by dipping, and the lamination block 1 for electrochemical element is arranged such that the conductive adhesive agents are respectively connected to the cathode package electrode and the anode package electrode.

Then, the package arranged with the lamination block 1 for electrochemical element is heated, for example, at 170° C. for 10 minutes to cure the conductive adhesive agent, so as to fix the lamination block 1 for electrochemical element to the package electrodes while electrically connecting the cathode terminal electrode 21t and the anode terminal electrode 31t respectively to the cathode package electrode and the anode package electrode.

As the conductive particles, carbon, silver, copper, aluminum or the like may be used other than gold, depending on applications.

The above manufacturing method of Embodiment 1 includes a process step of producing the cathode composite sheet 20A or the anode composite sheet 30A on the substrate film 100 and peeling the cathode composite sheet 20A or the anode composite sheet 30A from the substrate film 100.

It is thereby possible to integrally produce one continuous separator layer 11 with a plurality of patterned cathode collector electrodes 21a and cathode active material layers 21b.

Similarly, it is possible to integrally produce one continuous separator layer 11 with a plurality of patterned anode collector electrodes 31a and anode active material layers 31b.

Accordingly, in the manufacturing method of Embodiment 1, a large number of lamination blocks 1 for electrochemical element can be collectively produced, so as to improve the productivity as compared with the conventional method of individually producing and handling the lamination blocks 1 for electrochemical element one by one.

Furthermore, in the above manufacturing method of Embodiment 1, a plurality of patterned cathode collector electrodes 21a or anode collector electrodes 31a are integrated by one continuous separator layer 11, thereby to facilitate handling of the electrodes. Moreover, the cathode composite sheet 20A and the anode composite sheet 30A are supported by the substrate film 100 until laminated, thereby to further facilitate handling of the electrodes.

Accordingly, for example even when the cathode collector electrode 21a or the anode collector electrode 31a is made thinner, those electrodes are easy to handle. It is thus possible to produce a smaller-sized lamination block 1 for electrochemical element.

Furthermore, in the above manufacturing method of Embodiment 1, since the cathode 21 and the anode 31 which are adjacent to each other are bonded and fixed to the separator layer 11, it is possible to prevent positional displacement of the cathode 21 and the anode 31 in the manufacturing process and after completion of a product.

This can facilitate handling and multi-layering of the sheets in the manufacturing process, so as to suppress a characteristic change such as a capacity change after completion of the product.

Furthermore, in the above manufacturing method of Embodiment 1, the collectors with the active material layers formed on one surfaces thereof are arranged as the other surfaces thereof are opposed to each other, whereby it is possible to facilitate realization of a state where the active material layers are formed on both surfaces of the collector electrode, so as to produce a lamination block for electrochemical element which has a high volume-capacity ratio.

Moreover, according to the manufacturing method of Embodiment 1, the patterned plurality of cathode collector electrodes 21a and/or anode collector electrodes 31a and plurality of cathode active material layers 21b and/or anode active material layers 31b are integrated with the separator layers 11, thereby facilitating handling in the manufacturing process even when the lamination block 1 for electrochemical element is reduced in size, so as to allow production of a smaller lamination block 1 for electrochemical element.

Furthermore, according to the manufacturing method of Embodiment 1, the cathode/anode integrated sheets 50A where warpage is suppressed are laminated, thereby allowing suppression of warpage in the whole of the laminated lamination block 1 for electrochemical element.

It is to be noted that in the present embodiment, the separator layers 11 of the cathode composite sheet 20A and the anode composite sheet 30A have been bonded to each other to produce the cathode/anode integrated sheet 50A, and the cathode/anode integrated sheets 50A have been laminated to produce the laminated sheet LB1 for electrochemical element. However, the production method for the laminated sheet for electrochemical element is not restricted to this, and it may be produced as follows.

For example, the surfaces of the two cathode composite sheets 20A with the substrate films 100 having been peeled therefrom are bonded to each other as the cathode collector electrode 21a are opposed to each other, to produce a cathode/cathode integrated sheet. Similarly, the surfaces of the two anode composite sheets 30A with the substrate films 100 having been peeled therefrom are bonded to each other as the anode collector electrode 31a are opposed to each other, to produce an anode/anode integrated sheet. These cathode/cathode integrated sheet and anode/anode integrated sheet are bonded to each other as the respective separator layers 11 are opposed to each other, to produce a laminated sheet. The cathode/cathode integrated sheet side of the above laminated sheet is bonded with another anode/anode integrated sheet as the separator layers 11 are opposed to each other. This lamination step is repeated a required number of times, to produce a laminated sheet for electrochemical element.

Embodiment 2

In Embodiment 2, a lamination block for electrochemical element is produced by a different method from that of Embodiment 1, by use of the cathode composite sheet 20A and the anode composite sheet 30A produced in Embodiment 1.

1. Production of Cathode/Anode Integrated Sheet 50AB

Figure 9:
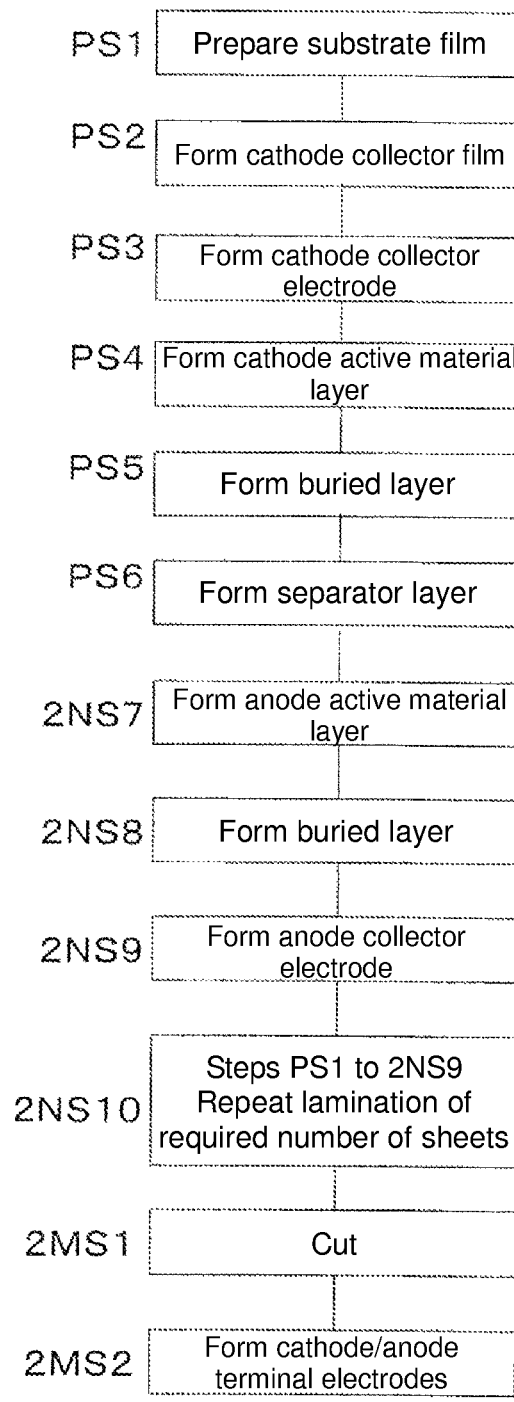
FIG. 9 is a process step flow diagram of a manufacturing method for a power storage device of Embodiment 2 according to the present invention.

First, as shown in FIG. 9, in similar process steps to Steps PS1 to PS6 of Embodiment 1, a cathode composite sheet 20A is produced on the substrate film 100.

<Step 2NS7>

Next, as shown in FIG. 10(1), an anode active material layer 32b is formed on the separator layer 11 of the cathode composite sheet 20A.

The anode active material layer 32b is formed so as to be opposed to the cathode active material layer 21b via the separator layer 11.

Further, the anode active material layer 32b is formed by, for example, drying after printing an anode active material pattern by, for example, screen printing.

<Step 2NS8>

Next, as shown in FIG. 10(2), a portion where the anode active material layer 32b is not formed and the separator layer 11 is exposed to the surface is formed with a buried layer 42 so as to fill a gap formed by formation of the anode active material layers 32b, and planarized.

<Step 2NS9>

Then, an anode collector electrode 32a is formed on the planarized surface.

As shown in FIG. 10(3), the anode collector electrode 32a is formed across the anode active material layers 32b formed above the cathode collector electrodes 21a adjacent to each other in the cathode composite sheet 20A.

Since the surface to be formed with the anode collector electrode 32a has been planarized by the buried layer 42 as thus described, it is possible to accurately and easily form a collector electrode with a flat surface and without a defect such as a hole.

A cathode/anode integrated sheet 50AB is produced by above Steps PS1 to 2NS9.

<Step 2NS10>

Hereinafter, Steps PS1 to 2NS9 are repeated, to produce a required number of cathode/anode integrated sheets 50AB.

In the case of producing a lamination block for electrochemical element where the separator layers are arranged in the upper and lower outermost layers, for example, a sheet for separator which is obtained by forming only a separator layer with a predetermined thickness (e.g. 6 μm) on a substrate film may be used, and the separator layers of the sheets for separator may be opposed and bonded to the top and bottom of the cathode/anode integrated sheet 50AB.

<Step 2MS1>

The cathode/anode integrated sheet 50AB with the substrate film having been peeled therefrom is cut along a cut line D2, to produce a lamination block 2 for electrochemical element.

It is to be noted that in this step, the substrate film may be peeled after cutting of the cathode/anode integrated sheet 50AB.

<Step 2MS2>

Then, out of the cut surfaces of the cut lamination block 2 for electrochemical element, the cathode terminal electrode 21t is formed on the side surface where the cathode collector electrode 21a is exposed and the anode terminal electrode 31t is formed on the side surface where the anode collector electrode 32a is exposed.

As thus described, the electrochemical element of Embodiment 2 which includes the one-layer separator layer 11 is produced.

Subsequently, a power storage device is produced in a similar manner to Embodiment 1.

In the above manufacturing method of above Embodiment 2, the cathode 22 and the anode 32 which are adjacent to each other are bonded and fixed to the separator layer 11, thereby preventing positional displacement of the cathode 22 and the anode 32 in the manufacturing process and after completion of a product.

This can facilitate handling of the sheet in the manufacturing process, so as to suppress a characteristic change such as a capacity change after completion of the product.

Further, the above manufacturing method of Embodiment 2 includes producing the cathode/anode integrated sheet 50AB, where the cathode and the anode are integrated with the separator layer 11, on the substrate film 100.

This can produce, on the one continuous separator layer 11, the patterned plurality of cathode collector electrodes 21a, cathode active material layers 21b, anode collector electrode 32a and anode active material layers 32b in an integrated manner, so as to collectively produce a large number of lamination blocks 2 for electrochemical element.

Accordingly, in the manufacturing method of Embodiment 2, the productivity can be improved as compared with the conventional method of individually producing and handling the lamination blocks 2 for electrochemical element one by one.

Further, in the manufacturing method of present Embodiment 2, before cutting of the cathode/anode integrated sheet 50AB, a cathode/anode integrated sheet 50BA shown in FIG. 10(5) may be produced for further multi-layering.

2. Production of Cathode/Anode Integrated Sheet 50BA

Figure 11:
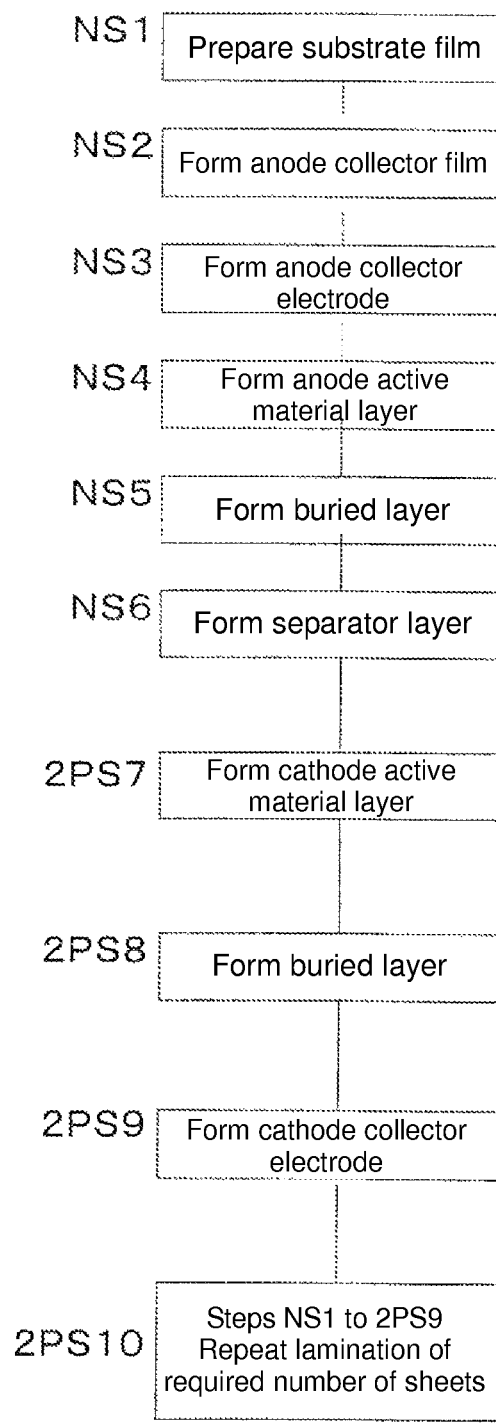
FIG. 11 is a process step flow diagram for producing the cathode/anode integrated sheet 50BA in the manufacturing method for a power storage device of Embodiment 2 according to the present invention.

The cathode/anode integrated sheet 50BA shown in FIG. 10(5) is produced in Steps 2PS7 to 2PS9 shown in FIG. 11 in a similar manner to the cathode/anode integrated sheet 50AB except that the cathode active material layer 22b and the cathode collector electrode 22a are formed in place of the anode active material layer 32b and the anode collector electrode 32a in Steps 2NS7 to 2NS9 of FIG. 9.

Hereinafter, in a similar manner to Embodiment 1, after bonding of the two cathode/anode integrated sheets 50AB to each other as the anode collector electrodes 32a are opposed to each other, an operation of peeling one substrate film 100 on the cathode side of one sheet and laminating the cathode/anode integrated sheet 50BA such that the cathode collector electrode 22a is bonded to the cathode collector electrode 21a, and an operation of peeling one substrate film 100 on the anode side of the cathode/anode integrated sheet 50BA and laminating the cathode/anode integrated sheet 50AB such that the anode collector electrode 32a is bonded to the anode collector electrode 31a, are alternately repeated, so as to produce a laminated sheet for electrochemical element.

It is to be noted that, for arrangement of the separator layers in the upper and lower outermost layers, by use of sheets for separator each obtained by forming only a separator layer with a predetermined thickness on the substrate film, the cathode/anode integrated sheet 50AB may be laminated on the separator layer of the sheet for separator in the first lamination, and the separator layer of the sheet for separator may be opposed and bonded at the end of lamination.

In production of this laminated sheet for electrochemical element, although the laminated body formed by bonding still has a small thickness on the stage of the number of lamination being small, the cathode/anode integrated sheets 50AB on both sides of the pasted surface have almost equal expansion/contraction characteristics with respect to heat, thereby to suppress warpage after bonding so as to facilitate handling in the following manufacturing process.

Further, since the collector electrodes with the active material layers formed on one surfaces thereof are arranged as the other surfaces thereof are opposed to each other, it is possible to facilitate realization of a state where the active material layers are formed on both surfaces of the collector electrode, so as to produce a lamination block for electrochemical element which has a high volume-capacity ratio.

Then, the laminated sheet for electrochemical element is cut to produce the lamination block for electrochemical element in a similar manner to Embodiment 1, and the cathode terminal electrode and the anode terminal electrode are formed in a similar manner to Embodiment 1.

The manufacturing method of Embodiment 2 as thus described has a similar function effect to Embodiment 1, and further, the separator layer can be made thinner since the separator layers are not bonded to each other.

Embodiment 3

In Embodiment 3, a lamination block for electrochemical element is produced by a different method from that of Embodiment 1, by use of the cathode composite sheet 20A and the anode composite sheet 30A produced in Embodiment 1.

FIG. 12 is a process step flow diagram showing a manufacturing process of Embodiment 3 according to the present invention. Hereinafter, each process step will be described in accordance with the process step flow diagram of FIG. 12.

1. Production of Cathode/Cathode Integrated Sheet 20D

After production of the cathode composite sheet 20A on the substrate film 100 in similar process steps to Steps PS1 to PS6 of Embodiment 1, Step 3PS7 to 3PS13 below are performed.

<Step 3PS7>

Figure 13:
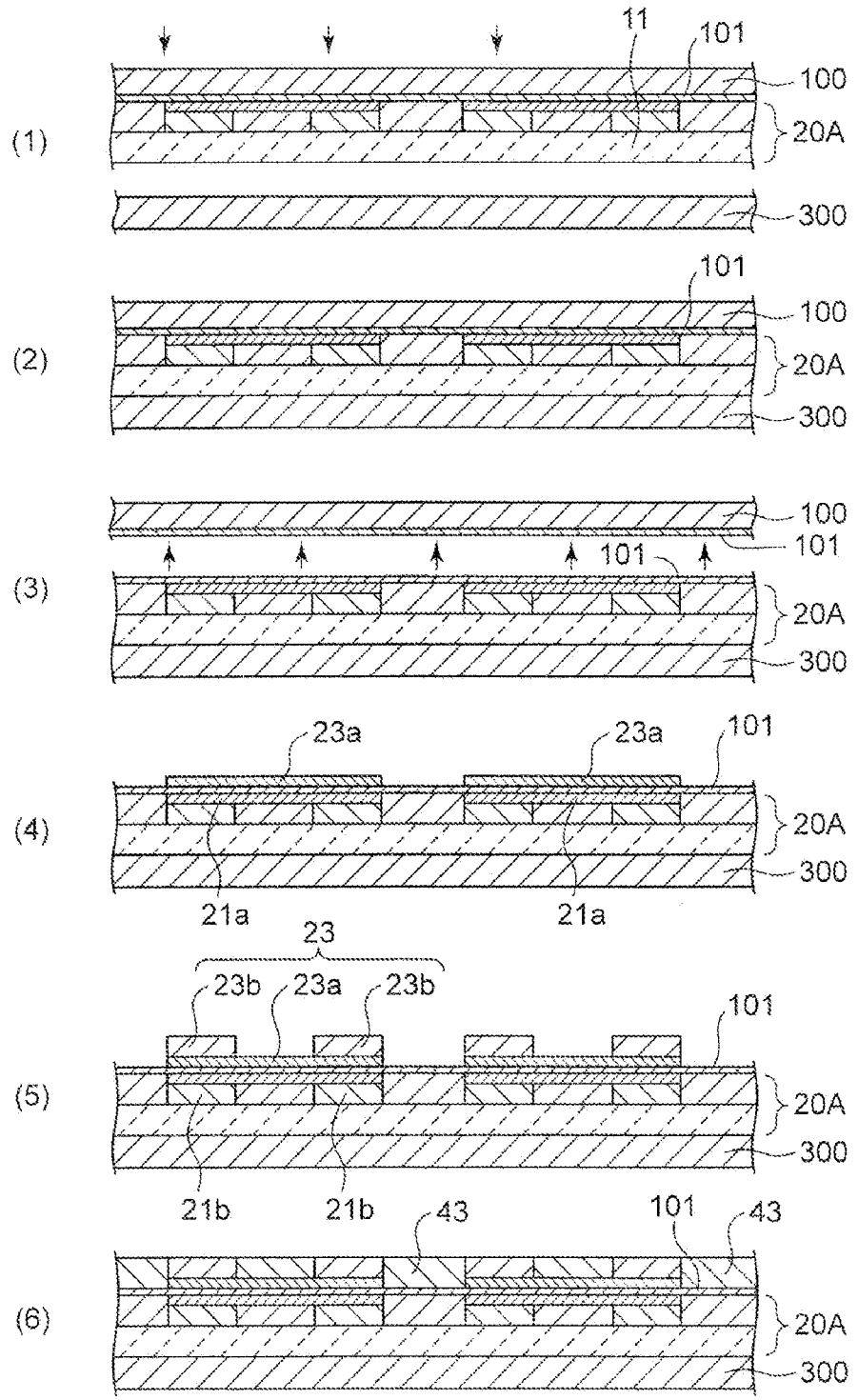
FIG. 13 shows a process step of producing a cathode/cathode integrated sheet 20D in the manufacturing method for a power storage device of Embodiment 3, in which (1) is a sectional view where a transfer film 300 is arranged so as to be opposed to the separator layer 11 of the cathode composite sheet 20A, (2) is a sectional view where the transfer film 300 has been bonded to the separator layer 11 of the cathode composite sheet 20A, (3) is a sectional view where the substrate film 100 of the cathode composite sheet 20A has been peeled, (4) is a sectional view where a cathode collector electrode 23a has been formed on the surface of the cathode composite sheet 20A, to which the substrate film 100 had been bonded, (5) is a sectional view where a cathode active material layer 23b has been formed on the cathode collector electrode 23a, and (6) is a sectional view where a buried layer 43 has been formed on a portion not formed with the cathode active material layer 23b, to planarize the surface.

First, as shown in FIG. 13(1), a transfer film 300 which is made of polyethylene terephthalate and formed with a mold releasing layer (not shown) on its surface is arranged so as to be opposed to the separator layer 11 of the cathode composite sheet 20A, and then pressurized, to bond the transfer film 300 to the cathode composite sheet 20A as shown in FIG. 13(2).

As the transfer film 300, there can be used a plastic film such as polypropylene, polyester, polycarbonate, polyamide, polyamide-imide, polyethylene, a fluorine resin or cellulose acetate, or some others such as cellophane or paper.

<Step 3PS8>

Next, as shown in FIG. 13(3), the substrate film 100 of the cathode composite sheet 20A is peeled.

<Step 3PS9>

Then, as shown in FIG. 13(4), on the surface of the cathode composite sheet 20A, to which the substrate film 100 has been bonded, the cathode collector electrode 23a is formed so as to be opposed to the cathode collector electrode 21a.

It is to be noted that in Step 3PS8, at the time of peeling the substrate film 100 of the cathode composite sheet 20A, the substrate film 100 can be peeled such that the mold releasing layer 101 does not remain on the cathode composite sheet 20A side, which leads to omission of formation of the cathode collector electrode 23a in Step 3PS9 so as to reduce the number of process steps.

<Step 3PS10>

Next, as shown in FIG. 13(5), the cathode active material layer 23b having the same size as that of the cathode active material layer 21b is formed on the cathode collector electrode 23a so as to be each opposed to the cathode active material layer 21b.

As thus described, even when the mold releasing layer 101 remains or an oxide film of the collector is formed on the surface of the cathode collector electrode 21a, to which the substrate film 100 has been bonded, by forming the cathode collector electrode 23a, electrical contact between the cathode active material layer 23b and the cathode collector electrode is ensured, so as to allow reduction in resistance of the power storage device.

<Step 3PS11>

Next, as shown in FIG. 13(6), a buried layer 43 is formed on a portion not formed with the cathode active material layer 23b and the surface formed with the cathode active material layer 23b is planarized.

<Step 3PS12>

Figure 14:
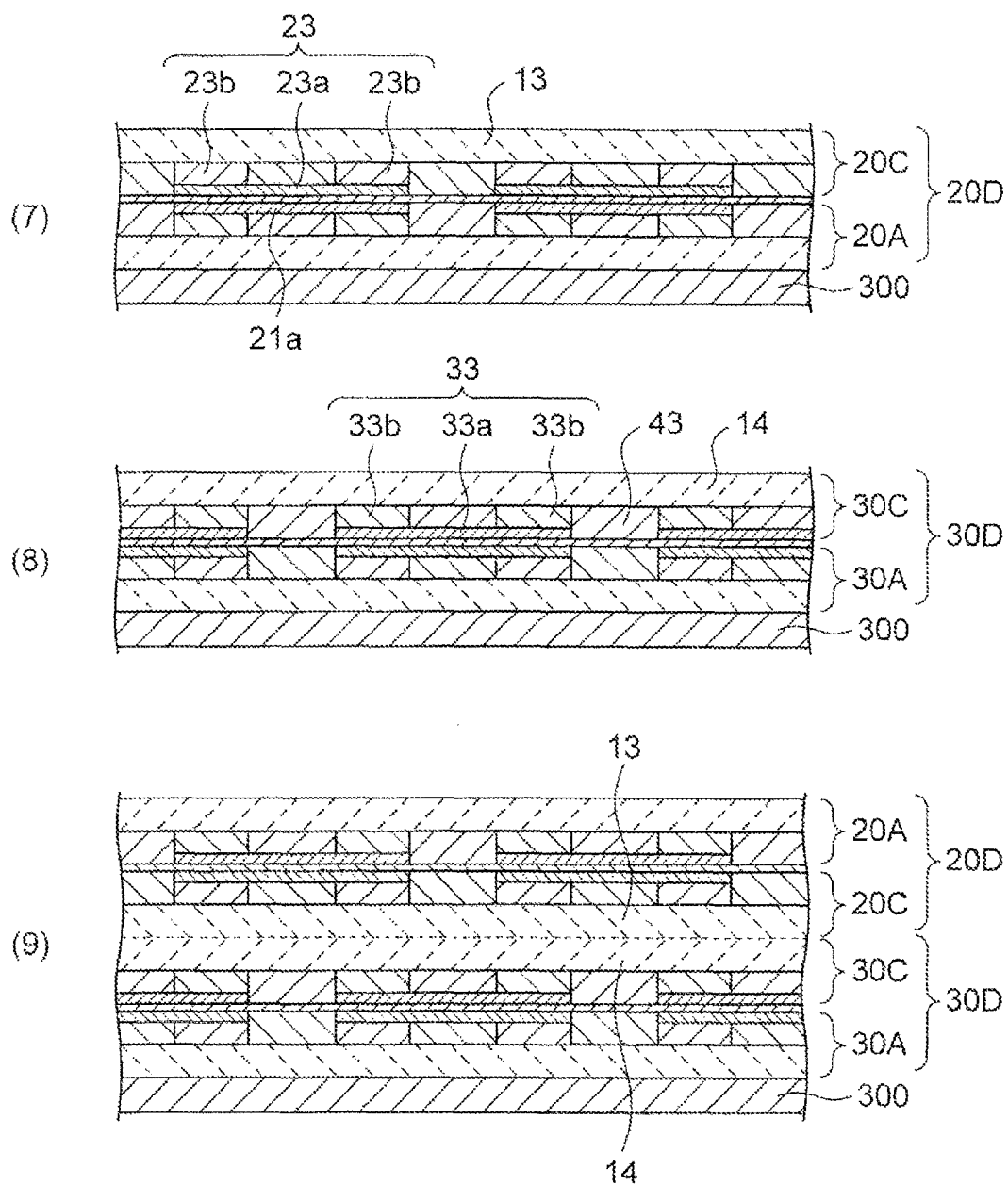
FIG. 14 shows a process step of laminating the cathode/cathode integrated sheet 20D and an anode/anode integrated sheet 30D in the manufacturing method for a power storage device of Embodiment 3, in which (7) is a sectional view of the cathode/cathode integrated sheet 20D formed on the transfer film 300, (8) is a sectional view of the anode/anode integrated sheet 30D formed on the transfer film 300, and (9) is a sectional view where the cathode/cathode integrated sheet 20D and the anode/anode integrated sheet 30D have been bonded to each other.

Next, as shown in FIG. 14(7), a separator layer 13 is formed on the planarized surface.

By above Steps 3PS7 to 3PS12, a cathode/cathode integrated sheet 20D is produced which is configured of the cathode composite sheet 20A and a cathode composite sheet 20C formed on the cathode composite sheet 20A.

It is to be noted that the cathode composite sheet 20A and the cathode composite sheet 20C are bonded to each other such that the cathode collector electrode 21a and the cathode collector electrode 23a are opposed to each other.

<Step 3PS13>

By repetition of Steps PS1 to 3PS12, a required number of cathode/cathode integrated sheets 20D are produced.

2. Production of Anode/Anode Integrated Sheet 30D

The anode/anode integrated sheet 30D is produced in accordance with Steps NS1 to 3NS13 of FIG. 12.

A required number of anode/anode integrated sheets 30D shown in FIG. 14(8) are produced in a similar manner to the cathode/cathode integrated sheet 20D except that an anode collector electrode 33a and an anode active material layer 33b are respectively formed in place of the cathode collector electrode 23a and the cathode active material layer 23b.

Herein, as shown in FIG. 14(9), the anode collector electrode 33a is formed across the cathode active material layers 23b formed on the adjacent cathode collector electrodes 23a on the cathode/cathode integrated sheet 20D.

This can facilitate realization of a state where the active material layers are formed on both surfaces of the collector electrode, so as to produce a lamination block for electrochemical element which has a high volume-capacity ratio.

That is, when the collector electrode is to be made thinner for size reduction, for example, forming the active material layers on both surfaces of the collector electrode such as collector foil is not easy, but it is easy in the method of present Embodiment 3.

3. Lamination

<Step 3MS1>

Next, as shown in FIG. 14(9), the cathode/cathode integrated sheet 20D and the anode/anode integrated sheet 30D are bonded to each other by pasting the separator layer 13 and a separator layer 14 to each other, and the transfer film 300 of the bonded cathode/cathode integrated sheet 20D is peeled.

By bonding the separator layer 13 and the separator layer 14 to each other in such a manner, since the cathode/cathode integrated sheet 20D and the anode/anode integrated sheet 30D on both sides of the pasted surface have almost equal expansion/contraction characteristics with respect to heat, it is possible to suppress warpage after bonding, so as to facilitate handling in the following manufacturing process.

Further, since the separator layers are double-layered, even when one separator layer unintentionally has a defect, insulating properties between the electrodes can be ensured in the other separator layer. Moreover, even when both separator layers have defects, the respective defective sites hardly overlap in the same position, and hence a short circuit between the cathode and the anode can be prevented.

<Step 3MS1>

The separator layer 14 side of the anode/anode integrated sheet 30D is bonded to the cathode/cathode integrated sheet 20D side with the transfer film 300 having been peeled therefrom, and the transfer film 300 is peeled.

<Step 3MS1>

The separator layer 13 side of the cathode/cathode integrated sheet 20D is bonded to the anode/anode integrated sheet 30D side with the transfer film 300 having been peeled therefrom, and the transfer film 300 is peeled.

<Step 3MS1>

Step 3MS1 is repeated a required number of times, to produce a laminated sheet LB3 for electrochemical element.

<Step 3MS2>

Figure 15:
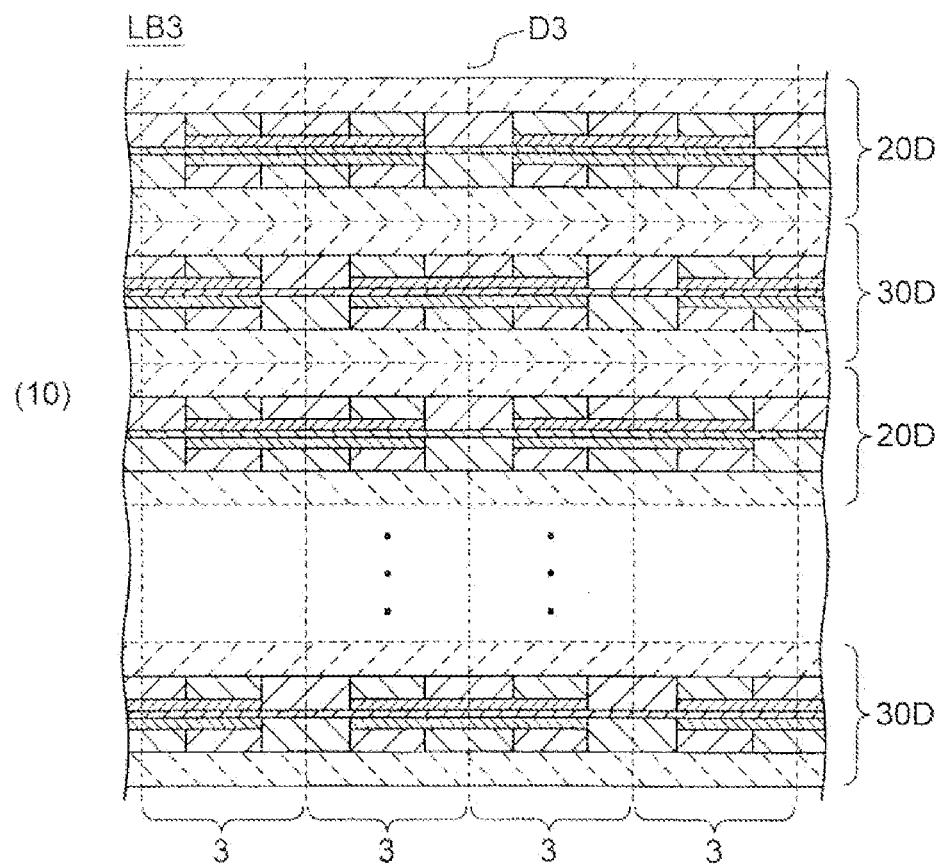
FIG. 15 is a sectional view of a laminated sheet LB3 for electrochemical element in Embodiment 3.

After peeling of the substrate film arranged in the bottom layer of the laminated sheet LB3 for electrochemical element, the laminated sheet LB3 for electrochemical element is cut along a cut line D3 shown in FIG. 15, to produce a lamination block 3 for electrochemical element.

It is to be noted that in this step, the substrate film may be peeled after cutting of the laminated sheet LB3 for electrochemical element.

<Step 3MS3>

Then, the cathode terminal electrode and the anode terminal electrode are formed in a similar manner to Embodiment 1.

Subsequently, a power storage device is produced in a similar manner to Embodiment 1.

In the manufacturing method of Embodiment 3 as thus described, for example, a sheet for separator which is obtained by forming only a separator layer with a predetermined thickness (e.g. 6 μm) on a substrate film may be prepared, and at the time of lamination producing a lamination block 3 for electrochemical element, such an operation as follows may be performed.

As the first lamination, the cathode composite sheet 20A with the substrate film 100 having been peeled therefrom, which is shown in FIG. 13(3), is laminated on the separator layer of the sheet for separator such that the cathode collector electrode 21a is bonded to the separator layer of the sheet for separator, and the transfer film 300 is peeled, and thereon, the anode/anode integrated sheet 30D and the cathode/cathode integrated sheet 20D are laminated.

As the final lamination, after lamination of the cathode composite sheet 20A as shown in FIG. 13(1) or the anode composite sheet 30A, the substrate film 100 is peeled, the separator layer of the sheet for separator is bonded to the peeled surface so as to be opposed thereto, and the substrate film of the sheet for separator is peeled.

This prevents formation of an active material layer not contributing much to the capacity in the upper and lower outermost layers of the lamination block 3 for electrochemical element, which is preferable.

The manufacturing method for a power storage device of Embodiment 3 as thus described has a similar function effect to Embodiment 1, and further, the transfer film 300 is bonded and the substrate film 100 is peeled, and hence it is possible to facilitate handling of the cathode composite sheet 20A and the anode composite sheet 30A after peeling the substrate film 100.

That is, in the above manufacturing method of Embodiment 3, a plurality of patterned cathode collector electrodes 21a or anode collector electrodes 31a are integrated by the continuous separator layer 11, a plurality of patterned cathode collector electrodes 23a are integrated by the separator layer 13, and a plurality of patterned anode collector electrodes 33a are integrated by the separator layer 14, thereby to facilitate handling of the electrodes, and the transfer film 300 is bonded, thereby to further facilitate handling of the electrodes even after peeling of the substrate film 100.

Furthermore, in the above manufacturing method of Embodiment 3, on the other surface of the collector electrode of the composite sheet obtained by integrating the collector electrodes by the separator layer, each collector being formed with the active material layer on its one surface, the active material layer is formed as opposed to the above active material layer, and hence it is possible to facilitate realization of a state where the active material layers are formed on both surfaces of the collector electrode, so as to produce a lamination block for electrochemical element which has a high volume-capacity ratio.

As opposed to this, in the conventional manufacturing method, forming the active material layers on both surfaces of the collector foil is not easy, but is difficult, in terms of handling.

Although formation of the buried layer and formation of the separator layer are performed in the different process steps in consideration of the difference between respective functions in above Embodiment 1 to 3, the buried layer and the separator layer can be simultaneously formed of the same material in the present invention.

Embodiment 4

Figure 16:
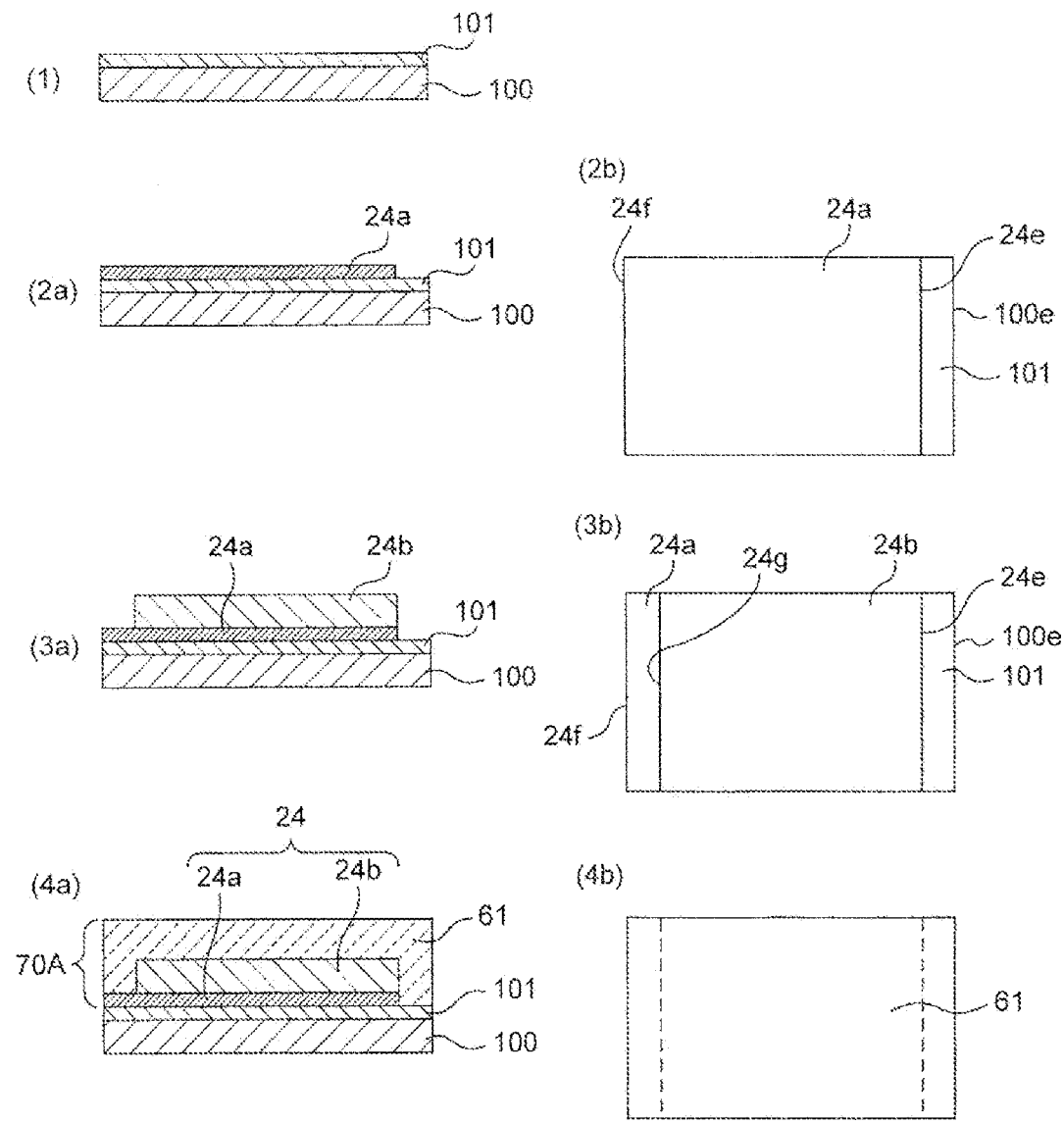
FIG. 16 shows a process step of producing a cathode composite sheet 70A in the manufacturing method for a power storage device of Embodiment 4 according to the present invention, in which (1) is a sectional view of the substrate film 100 provided with the mold releasing layer 101, (2a) is a sectional view where a cathode collector electrode 24a has been formed, (2b) is a plan view of (2a), (3a) is a sectional view where a cathode active material layer 24b has been formed on the cathode collector electrode 24a, (3b) is a plan view of (3a), (4a) is a sectional view where a separator layer

First, the rectangular substrate film 100 formed with the silicon-based mold releasing layer 101 on its surface, which is shown in FIG. 16(1), is prepared.

Next, as shown in FIGS. 16(2a) and (2b), a cathode collector electrode 24a is formed on the mold releasing layer 101 of the substrate film 100. As shown in FIG. 16(2b), this cathode collector electrode 24a is formed such that, out of its four sides, three sides have the outer edge agreeing with the outer edge of the substrate film 100, and one side 24e is inward apart from one side 100e of the substrate film 100.

Next, as shown in FIGS. 16(3a) and (3b), a cathode active material layer 24b is formed on the cathode collector electrode 24a. As shown in FIG. 16(3b), this cathode active material layer 24b is formed such that, out of its four sides, three sides have the outer edge agreeing with the outer edge of the cathode collector electrode 24a, and one side 24g is inward apart from one side 24f of the cathode collector electrode 24a.

Herein, the side 24e and the side 24f are opposite sides to each other in the cathode collector electrode 24a.

Then, a separator layer 61 is formed so as to cover a cathode 24 made up of the cathode collector electrode 24a and the cathode active material layer 24b.

As thus described, a cathode composite sheet 70A, obtained by integrating the separator layer 61 with the cathode 24 made up of the cathode collector electrode 24a and the cathode active material layer 24b, is produced.

In a similar manner, the rectangular substrate film 100 formed with the silicon-based mold releasing layer 101 on its surface, which is shown in FIG. 17(1), is prepared and an anode collector electrode 34a is formed on the mold releasing layer 101 of the substrate film 100 as shown FIGS. 17(2a) and (2b). As shown in FIG. 17(2b), this anode collector electrode 34a is formed such that only one side 34e agrees with the side 100e of the surface of the substrate film 100, and the other three sides are inward apart from the outer edge of the substrate film 100.

Next, as shown in FIGS. 17(3a) and (3b), the anode active material layer 34b is formed on the anode collector electrode 34a. This anode active material layer 34b is formed inward apart from one side 34e of the anode collector electrode 34a.

Then, a separator layer 62 is formed so as to cover an anode 34 made up of the anode collector electrode 34a and the anode active material layer 34b.

As thus described, an anode composite sheet 70B, obtained by integrating the separator layer 62 with the anode 34 made up of the anode collector electrode 34a and the anode active material layer 34b, is produced.

Next, as shown in FIG. 18(5), the cathode composite sheet 70A and the anode composite sheet 70B are arranged as the cathode composite sheet 70A is located on the downside and the separator surfaces are opposed to each other, and then bonded to each other by uniform pressurization of the whole surface, to produce a cathode/anode integrated sheet 70AB. Thereby, the cathode/anode integrated sheet 70AB, obtained by integrating the cathode 24 and the anode 34 by the separator layers 61, 62, is produced.

A required number of cathode/anode integrated sheets 70AB are produced.

In the cathode/anode integrated sheet 70AB produced by bonding between the separator layer 61 and the separator layer 62 to each other as thus described, the cathode composite sheet 70A and the anode composite sheet 70B on both sides of the pasted surface have almost equal expansion/contraction characteristics with respect to heat, thereby to suppress warpage after bonding so as to facilitate handling in the following manufacturing process.

Further, since the separator layers have a double-layered structure of the separator layer 61 and the separator layer 62, even when one separator layer unintentionally has a defect, insulating properties between the electrodes can be ensured in the other separator layer. Moreover, even when both separator layers have defects, the respective defective sites hardly overlap in the same position, and hence a short circuit between the cathode and the anode can be prevented.

As shown in FIG. 18(6), the anode side of the cathode/anode integrated sheet 70AB is brought into contact with a suction board 80, to be sucked and lifted, and thereafter, the substrate film 100 on the cathode side is peeled.

Next, below the cathode/anode integrated sheet 70AB sucked by the suction board 80, another cathode/anode integrated sheet 70AB is arranged such that the substrate film on the anode side is located on the downside, and after another substrate film on the cathode side is peeled, the sheets are brought into contact with each other, and then bonded by uniform pressurization of the whole surface, as shown in FIG. 18(7).

This can facilitate realization of a state where the active material layers are formed on both surfaces of the collector electrode, so as to produce a lamination block for electrochemical element which has a high volume-capacity ratio.

That is, when the collector electrode is to be made thinner for size reduction, forming the active material layers on both surfaces of the collector electrode is not easy, but it is easy in the method of present Embodiment 4.

Next, the substrate film 100 sucked by the suction board 80 is peeled from the cathode/anode integrated sheet 70AB as shown in FIG. 18(8), and to its peeled side, the anode side of another cathode/anode integrated sheet 70AB is bonded as shown in FIG. 19(9), followed by peeling of the substrate film 100.

The above process steps are repeated, to laminate a required number of cathode/anode integrated sheets 70AB.

In above Embodiment 4, the cathode collector electrode 24a and the anode collector electrode 34a are not formed in an assembled state but in an individual manner on one substrate film 100, and hence it is possible to reduce the buried-layer forming step and the cutting step, so as to reduce the number of process steps.

That is, in present Embodiment 4, an element corresponding to the buried layer of Embodiment 1 and the like is formed simultaneously with the separator layer.

Further, in the manufacturing methods of present Embodiments 1 to 4, addition of a bonding function to the separator layer is possible, namely impartation of the bonding function to a material itself which constitutes the separator layer, arrangement of a bonding material on the surface of the separator layer, and the like.

Moreover, as for bonding between the separator layers, an area contributing to the bonding can be made large and solid bonding can thus be obtained, as compared with bonding between the separator layer and the cathode collector electrode or the anode collector electrode, bonding between the cathode collector electrodes, or bonding between the anode collector electrodes.

It is to be noted that in the case of arranging the separator layer in the upper and lower outermost layers, one obtained by forming only a separator layer on a substrate PET film may be prepared, and this separator layer may be arranged in the upper and lower outermost layers.

Embodiment 5

First, in a manufacturing method for a power storage device of Embodiment 5, a required number of cathode composite sheets 20A shown in FIG. 20(1) are produced in a similar manner to Steps PS1 to PS7 of Embodiment 1. In addition, a cathode collector electrode 21a1 located on one end side on the right side of the figure is different in that the cathode active material layer 21b is formed only in one place thereon, from another cathode collector electrode 21a where the cathode active material layers 21b are formed in two places.

Further, a required number of anode composite sheets 30A shown in FIG. 20(2) are produced in a similar manner to Steps NS1 to NS7 of Embodiment 1. In addition, an anode collector electrode 31a1 located on the other end side on the left side of the figure is different in that the anode active material layer 31b is formed only in one place thereon, from another anode collector electrode 31a where the anode active material layers 31b are formed in two places.

Further, in the manufacturing method of present Embodiment 5, as shown in FIG. 20(3), a required number of sheets 60 for separator, each obtained by forming the separator layer 10 on the substrate film 100, are produced.

Then, in the manufacturing method of present Embodiment 5, the cathode composite sheet 20A, the anode composite sheet 30A and the sheet 60 for separator as thus produced are laminated as follows.

First, for example, the surface on the separator layer 11 side of the cathode composite sheet 20A is sucked and lifted, to peel the substrate film 100 of the cathode composite sheet 20A as shown in FIG. 20(4).

Next, as shown in FIG. 20(5), the cathode composite sheet 20A is arranged such that its surface with the substrate film 100 having been peeled therefrom is opposed to the separator layer 10 of the sheet 60 for separator, and the cathode composite sheet 20A is bonded onto the sheet 60 for separator.

Next, as shown in FIG. 20(6), the anode composite sheet 30A is bonded onto the cathode composite sheet 20A bonded to the sheet 60 for separator. Specifically, the substrate film 100 side of the anode composite sheet 30A, formed on the substrate film 100, is sucked by the suction board and lifted, and the anode composite sheet 30A is bonded onto the cathode composite sheet 20A as the separator layers are opposed to each other.

After bonding of the anode composite sheet 30A onto the cathode composite sheet 20A a as thus described, the substrate film 100 of the bonded anode composite sheet 30A is peeled, as shown in FIG. 21(7).

Next, for example, as shown in FIG. 21(8), the surface on the separator layer side of the anode composite sheet 30A is sucked and lifted, to peel the substrate film 100 of the anode composite sheet 30A, and as shown in FIG. 21(9), the peeled surface of the anode composite sheet 30A with the substrate film 100 having been peeled therefrom, is bonded to the surface of the anode composite sheet 30A with the substrate film 100 having been peeled therefrom, shown in FIG. 21(7). At the time of this bonding, bonding is performed such that the anode collector electrode 31a of one anode composite sheet 30A and the anode collector electrode 31a of the other anode composite sheet 30A are opposed to each other.

Subsequently, as shown in FIG. 22(10), the cathode composite sheet 20A is bonded onto the bonded anode composite sheets 30A. Specifically, the substrate film 100 side of the cathode composite sheet 20A, formed on the substrate film 100, is sucked by the suction board and lifted, and the cathode composite sheet 20A is bonded onto the anode composite sheet 30A as the separator layers are opposed to each other.

Further, as shown in FIG. 22(11), the substrate film 100 of the bonded cathode composite sheets 20A is peeled, and thereafter, a required number of sheets are repeatedly laminated in a similar manner as above in the order of the cathode composite sheet 20A, the anode composite sheet 30A, the anode composite sheet 30A, the cathode composite sheet 20A, the cathode composite sheet 20A, the anode composite sheet 30A, the anode composite sheet 30A . . . . Finally, the separator layer 10 side of the sheet 60 for separator is bonded to the surface of the cathode composite sheet 20A or the anode composite sheet 30A with the substrate film 100 having been peeled therefrom.

As thus described, the produced laminated sheet for electrochemical element is cut in a similar manner to Embodiment 1 and like, to produce an electrochemical element, and a power storage device is manufactured in a similar manner to Embodiment 1 and like.

The above power storage device of Embodiment 5 has a similar function effect to those of Embodiments 1 to 3.

Modified Example of Embodiment 5

In the manufacturing method for a power storage device of Embodiment 5 as thus described, as described with reference to FIGS. 20(4) and (5), the substrate film 100 of the cathode composite sheet 20A is peeled, and the surface with the substrate film 100 having been peeled therefrom is opposed to the separator layer 10 side of the sheet 60 for separator and bonded thereto, but in the present invention, such an operation as follows may be performed.

That is, as shown in FIG. 23(1), the transfer film 300 is bonded to the separator layer 11 side of the cathode composite sheet 20A in a state where the cathode composite sheet 20A is bonded to the substrate film 100, and thereafter, as shown in FIG. 23(2), the substrate film 100 is peeled from the cathode composite sheet 20A.

Then, as shown in FIG. 23(3), the separator layer 10 side of the sheet 60 for separator is bonded to the surface with the substrate film 100 having been peeled therefrom, and thereafter, as shown in FIG. 23(4), the transfer film is peeled.

With use of the transfer film in such a manner, the suction board or the like does not directly come into contact with the cathode composite sheet and the anode composite sheet, so as to allow prevention of a foreign matter from being mixed into the electrochemical element.

Further, this method for using the transfer film is also applicable at the time when in Embodiment 4, the surface on the separator layer 11 side of the cathode composite sheet 20A is sucked and lifted to peel the substrate film 100 of the cathode composite sheet 20A as shown in FIG. 20(4) and the sucked cathode composite sheet 20A is arranged such that the surface with the substrate film 100 having been peeled therefrom is opposed to the separator layer 10 of the sheet 60 for separator, to bond the cathode composite sheet 20A onto the sheet 60 for separator as shown in FIG. 20(5).

Moreover, this method is also applicable at the time when the surface on the separator layer 11 side of the anode composite sheet 30A is sucked and lifted to peel the substrate film 100 of the anode composite sheet 30A as shown in FIG. 21(8) and the peeled surface of the anode composite sheet 30A with the substrate film 100 having been peeled therefrom is bonded to the surface of the anode composite sheet 30A with the substrate film 100 peeled therefrom, as shown in FIG. 21(9).

As for process steps hereinafter, the process steps described with reference to FIG. 20(6) to FIG. 22(11) are performed, to manufacture a power storage device in a similar manner to Embodiment 5.

Although formation of the buried layer and formation of the separator layer are performed in the different process steps in consideration of the difference between respective functions in above Embodiment 5, the buried layer and the separator layer can be simultaneously formed of the same material in the present invention.

It is to be noted that, in the figures referenced for describing the manufacturing process, the separator layer, the cathode, the anode and the like having large thicknesses are drawn due to constraints in drawing, but those are not one precisely expanded or contracted from actual sizes.

Further, the other figures attached to the description are also shown with the sizes and positional relations appropriately transformed or emphasized due to constraints in drawing or for the sake of easy understanding.

Embodiment 6

(1) Power Storage Device

FIG. 30 is a perspective view showing the lamination block 1 for electrochemical element which is used for a power storage device according to Embodiment 6.

FIG. 31 is a sectional view of an electric double layer capacitor 80A shown as an example of a power storage device including the lamination block 1 for electrochemical element.

It is to be noted that, in FIG. 30, a sectional view of the front surface (surface shown by hatching) of the lamination block 1 for electrochemical element is shown for the purpose of understanding a schematic arrangement of the cathode 21 (cathode collector electrode 21a and cathode active material layer 21b) and the anode 31 (anode collector electrode 31a and anode active material layer 31b), but in practice, as shown in detail in a later-mentioned manufacturing method, it is covered by the separator layer 42 having adhesive properties and an electrolyte is supplied to a power storage unit inside the lamination block 1 for electrochemical element via a slit 25 (see FIG. 25(7b)) provided in this separator layer 42. That is, the slit 25 functions as an electrolyte guiding path capable of introducing the electrolyte into the lamination block 1 for electrochemical element.

Further, the rear surface (surface parallel to the front surface) of the lamination block 1 for electrochemical element is also covered by the separator layer 42, not shown, in a similar manner, and this separator layer 42 covering the rear surface may also be provided with the slit 25.

For the element provided with the same numeral as that in the other embodiment, the same material may be used as that in the other embodiment, so long as not specifically noted.

As described later, housing the lamination block 1 for electrochemical element into a package provided with a cathode package electrode and an anode package electrode along with the electrolyte can lead to formation of a power storage device such as an electric double layer capacitor, a lithium-ion secondary battery or a lithium-ion capacitor.

The lamination block 1 for electrochemical element is arranged between a pair of the cathode 21 (cathode collector electrode 21a and cathode active material layer 21b) and the anode 31 (anode collector electrode 31a and anode active material layer 31b) with the cathode active material layer 21b and the anode active material layer 31b being opposed to each other, and the block has a laminated body obtained by laminating a plurality of power storage units each having the separator layer 42 (illustration of its details is omitted in FIG. 30) which adheres to part of the surface of the cathode and to part of the surface of the anode.

The separator layer 42 forms the electrolyte guide path, capable of guiding the electrolyte to the inside, between the cathode active material layer 21b and the anode active material layer 31b.

Therefore, arranging the lamination block 1 for electrochemical element inside the package and supplying the electrolyte into the package can facilitate supply (infusion) of the electrolyte into the power storage unit.

This can result in prevention of the problem of alteration, volatilization and the like of the electrolyte due to the influence of heat and the like at the time of lamination of the power storage units.

Further, since the electrolyte can be infused after formation of the laminated body, there is no need for handling the power storage unit in the state of containing the electrolyte at the time of lamination of the power storage units, which simplifies the process steps and is thus effective.

Moreover, since the electrolyte reaches the inside of the power storage unit in shorter time, the device has an advantage of the electrolyte being easily infused.

It is to be noted that in manufacturing of the power storage device using the lamination block 1 for electrochemical element, infusion of the electrolyte into the lamination block 1 for electrochemical element is not restricted to the infusion after lamination of the power storage device. The infusion may be previously performed before lamination of the power storage units and/or during lamination of the power storage units, or may be additionally performed after lamination of the power storage unit.

As thus described, the separator layer 42 has adhesive properties so that it can adhere to part of the surface of the cathode or part of the surface of the anode, or the separator layers 42 can adhere to each other.

As the separator layer 42, there can be used a thermoplastic resin (copolymer of PVDF (polyvinylidene fluoride) and hexafluoropropylene, polyethylene oxide, etc.) and a thermosetting resin such as polyimide, polyamide imide and polyamide.

Among these, the thermoplastic resin is preferred since it gets softer by being heated up to a glass transition temperature or a melting point, and hence heating, or pressure-bonding while heating, of this resin leads to an increase in contact area with the cathode active material layer 21b, the anode active material layer 31b, the cathode collector electrode 21a, the anode collector electrode 31a, or the separator layer as a matter to be adhered, and strong adhesion strength (bonding strength) can thus be obtained.

Further, when PVDF is used as the thermoplastic resin, it has excellent thermal resistance and solution resistance. Meanwhile, the thermosetting resin has high thermal durability, strong bonding force and excellent chemical stability, and has high strength as compared with that of the thermoplastic resin, thus leading to improvement in strength of the laminated body.

Examples of the method for making the separator layer 42 adhere to the foregoing matter to be adhered include pressure-bonding or heating of each electrode provided with the separator layer 42, where the pressure-bonding or heating leads to adherence to the matter to be adhered (cathode, anode, etc.) for integration. Further, heating at the time of pressure-bonding can result in stronger adhesion.

When each electrode provided with the separator layer 42 is laminated to produce the laminated body, in the laminated body, temporary adhesion is performed by heating or the like to form a temporary laminated body at the time of sequential lamination of the electrodes, and the temporary laminated body is then subjected to actual adhesion by heating or the like.

This allows sequential lamination with accuracy in locations of the cathode and the anode at the time of lamination.

Further, the actual bonding may be performed on a laminated assembly obtained by collective temporary adhesion of a plurality of laminated bodies, or may be performed on each laminated body after dividing the temporarily bonded laminated assembly into individual units.

The separator layer 42 may include a particulate insulator. Inclusion of the particulate insulator in the separator layer 42 can improve the strength of the separator layer 42 to suppress breakage at the time of lamination, so as to prevent a short circuit between the electrodes.

The separator layer 42 preferably has an air permeability of not smaller than 1250 sec/100 cc in order to sufficiently ensure adhesive properties and firmly hold the shape of the lamination block 1 for electrochemical element.

It should be noted that the air permeability is a measure used for expressing the tendency of transmission of a gas, and can be measured on conditions of a cylinder pressure of 0.25 MPa, a measurement pressure of 0.05 MPa and a measurement internal diameter of 30 mm by use of a digital Oken-type air permeability and smoothness tester (e.g. "EG01-5-1MR" manufactured by ASAHI SEIKO CO., LTD.) in accordance with a method conforming to P 8117 of Japanese Industrial Standards (JIS).

A large air permeability value indicates the resistance to passage of air, and this simultaneously indicates the resistance to passage of a liquid such as an electrolyte.

Next, using FIG. 31, the electric double layer capacitor 80A including the lamination block 1 for electrochemical element will be described.

The lamination block 1 for electrochemical element is arranged inside a package made up of a package base section 11b and a package lid section 11a. The package base section 11b and the package lid section 11a can be formed, for example, of a heat-resistant resin such as a liquid crystal polymer.

In the package base section 11b, for example, a cathode package electrode 122b and an anode package electrode 132b made of a metal such as aluminum are separately arranged.

The cathode terminal electrode 21t of the lamination block 1 for electrochemical element, which is electrically connected with a plurality of cathode collector electrodes 21a, is electrically connected with the cathode package electrode 122b by a conductive adhesive agent 122a. Similarly, the anode terminal electrode 31t of the lamination block 1 for electrochemical element, which is electrically connected with a plurality of anode collector electrodes 31a, is electrically connected with the anode package electrode 132b by a conductive adhesive agent 132a.

An electrolyte is arranged inside the package made up of the package base section 11b and the package lid section 11a.

When this electrolyte is supplied after arrangement of the lamination block 1 for electrochemical element inside the package, the electrolyte reaches the inside of the power storage unit via the slit 25, as described above.

(2) Manufacturing Method

Next, a manufacturing method for the power storage device (lamination block 1 for electrochemical element) according to Embodiment 6 will be described.

FIG. 33 is a process step flow diagram of a manufacturing method for the power storage device (lamination block 1 for electrochemical element) of Embodiment 6 according to the present invention. Hereinafter, each process step will be described in accordance with the process step flow of FIG. 33.

i) Production of Cathode Composite Sheet 20A
<Step PS1>

First, as shown in FIG. 24(1), for example, the substrate film 100 is prepared which is made of polyethylene terephthalate and formed with the silicon-based mold releasing layer 101 on its surface.

A substrate film having mold releasing properties by itself can be used without being subjected to a treatment to add molding properties.

As for the substrate film not having mold releasing properties, it is preferable to be subjected to the treatment to add mold releasing properties such as formation of the mold releasing layer 101 so that the mold releasing properties can be more enhanced.

As the substrate film 100, there can be used a plastic film such as polypropylene, polyester, polycarbonate, polyamide, polyamide-imide, polyethylene, a fluorine resin or cellulose acetate, or some others such as cellophane or paper.

Examples of the treatment to add molding properties may include a method of coating the top of the substrate film with a silicon resin, wax, a surfactant, a metal oxide, a fluorine resin, or the like.

As the mold releasing layer 101, other than the above, there can be appropriately used those mainly composed of one or more than one of resins such as cellulose nitrate, rigid polyvinyl chloride, polyamide, polyester, a melamine resin, a urea resin, an epoxy resin, an urethane resin, and examples of the treatment to add molding properties to those may include formation by coating the top of the substrate film by, for example, a photogravure technique.

Further, an adhesive layer 121 is formed on the substrate film 100 (or the mold releasing layer 101).

As the adhesive layer 121, there can be used an urethane resin, a polyvinylidene fluoride (PVDF) resin, a polyamide-imide (PAI) resin, a polyimide resin, a polyamide resin, silicon, or the like.

<Step PS2>

Next, as shown in FIG. 24(2), the cathode collector film 102 is formed on the adhesive layer 121 by vapor deposition, for example.

In such a manner, forming the cathode collector film 102 on the adhesive layer 121 with a smooth surface renders high continuity, to facilitate formation of the cathode collector film 102 with low resistance, though having a small thickness, and this results in effective promotion of reduction in size and profile of the power storage device.

Further, as the formation method for the cathode collector film 102, other than vapor deposition, known techniques such as sputtering or application can be employed. In vapor deposition and sputtering, the resistance is low due to favorable film continuity, to facilitate formation of a collector film with a small film thickness, so as to facilitate reduction in size and profile of the power storage device.

<Step PS3>

As shown in FIG. 24(3), on the cathode collector film 102, a plurality of resist patterns R102 are printed at predetermined intervals and then dried. This resist pattern 8102 is, for example, arranged in a matrix form, and formed in a similar rectangular shape to that of the cathode collector electrode 21a.

Next, as shown in FIG. 24(4), the cathode collector film 102 is etched with the resist pattern R102 used as an etching mask, and as shown in FIG. 24(5), the resist pattern R102 is peeled. As thus described, the cathode collector electrode 21a in a rectangular shape is formed.

As the masking method, other than the method of printing a resist by screen printing, there may be used a method of printing a resist by photogravure printing, photolithography using an application-type resist, photolithography using a dry film resist, or some other methods. When emphasis is to be placed on low cost, screen printing and photogravure printing are preferred, and when emphasis is to be placed on accuracy, photolithography is preferred.

Further, as the formation method for the collector electrode, other than the method of etching the collector film, there may be employed a method of directly vapor-depositing the collector film on the substrate film formed with the mold releasing layer by use of a metal mask, a method of directly vapor-depositing the collector film by use of an oil mask to perform a plasma asking treatment, or some other methods.

Further, when the cathode collector electrode 21a is formed with an oxide film on its surface, it is preferable to include a process step of removing the oxide film of the cathode collector electrode 21a after formation of the cathode collector electrode 21a. As for removal of the oxide film of the cathode collector electrode 21a, for example, when the cathode collector electrode 21a is formed of aluminum (Al), an oxide film on the aluminum-surface can be removed by passage through mixed acid of hydrofluoric acid and sulfuric acid.

<Step PS4>

As shown in FIGS. 24(6a) and (6b), the cathode active material layers 21b are formed at two places on the cathode collector electrode 21a.

The cathode active material layers 21b can be formed, for example, by screen-printing active material slurry on the cathode collector electrode 21a, and are formed, for example, symmetrically with respect to a center line L1 orthogonal to a longitudinal direction of the cathode collector electrode 21a at predetermined intervals from the center line L1. In the cathode active material layers 21b, it is preferable to respectively form the side surfaces, excluding the inner side surfaces which are opposed to each other with the center line L1 placed therebetween, so as to agree with the outer edge of the cathode collector electrode 21a.

<Step PS5>

Next, as shown in FIGS. 25(7a) and (7b), the separator layer 42 is formed on the adhesive layer 121 and the cathode collector electrode 21a so as to surround the cathode active material layer 21b. At this time, as shown in (7b), the slit 25 is provided in the separator layer 42 so as to be in contact with the cathode active material layer 21b. The slit 25 penetrates the separator layer 42 in (7b).

As described above, the front surface (hatched surface in FIG. 30) of the lamination block 1 for electrochemical element is covered by the separator layer 42, though not shown in FIG. 30. Similarly, the rear surface (surface parallel to the front surface) of the lamination block 1 for electrochemical element is also covered by the separator layer 42.

When a plurality of power storage units longitudinally arranged in FIG. 7(b) of FIG. 25 (a set of the cathode (cathode collector electrode 21a and cathode active material layer 21b) and the anode (anode collector electrode 31a and anode active material layer 31b) with the cathode active material layer 21b and the anode active material layer 31b being opposed to each other, and the separator layer 42 arranged between the cathode and the anode and adhering to part of the cathode and part of the anode may be altogether referred to as the "power storage unit"), or intermediates for obtaining the power storage units, are longitudinally cut off one by one by later-mentioned Step MS3, for example, those are cut off at sites corresponding to lines C1, C2 and C3 of FIG. 25(7b), thereby allowing the front surface and the rear surface of the lamination block 1 for electrochemical element to be respectively covered by the separator layers 42.

The separator layers 42 covering the front surface and the rear surface of the lamination block 1 for electrochemical element each have the slit 25. Since the slit 25 functions as the electrolyte guiding path, the electrolyte can pass through the slit 25, to enter the lamination block 1 for electrochemical element.

Further, a gas generated in each power storage unit of the lamination block 1 for electrochemical element is allowed to pass through the electrolyte guiding path of each power storage unit, and it can thereby be discharged to the outside of the power storage unit (outside of the lamination block 1 for electrochemical element).

The cathode composite sheet 20A is produced through the above process steps of Steps PS1 to PS5.

<Step PS6>

In Step PS6, Steps PS1 to PS5 are repeated, to produce a required number of cathode composite sheets 20A.

ii) Production of Anode Composite Sheet 30A

As shown in FIG. 33, the anode composite sheet 30A is produced in accordance with Steps NS1 to NS6 which are similar to Steps PS1 to PS6 at the time of manufacturing the cathode composite sheet 20A.

In the anode composite sheet 30A, as shown in FIGS. 25(8a) and 26(8b), the anode collector electrode 31a is arranged such that the center line L2 orthogonal to its longitudinal direction is located at the center of the center line L1 of the cathode collector electrode 21a in the cathode composite sheet 20A, and the anode active material layers 31b are formed symmetrically with respect to the center line L2 and in such positions as to be superimposed on the cathode active material layers 21b.

Further, in Step NS2 to NS4, the anode collector film, the anode collector electrode 31a and the anode active material layer 31b are formed in place of the cathode collector film 102, the cathode collector electrode 21a and the cathode active material layer 21b in Steps PS2 to PS4, but at the time of producing an electric double layer capacitor as a power storage device, it is possible to use respectively similar ones for the cathode collector film 102 and the anode collector film, for the cathode collector electrode 21a and the anode collector electrode 31a, and for the cathode active material layer 21b and the anode active material layer 31b.

It is to be noted that shapes and areas of the cathode collector electrode 21a and the anode collector electrode 31a may be the same or may be different. Further, shapes and areas of the cathode active material layer 21b and the anode active material layer 31b may be the same or may be different. The area of either the cathode 21 or the anode 31 can be made larger in consideration of positional displacement of the cathode 21 or the anode 31, to hold an opposed area of the cathode 21 and the anode 31 unchanged even when the position of the cathode 21 or the anode 31 is displaced, so as to suppress changes in resistance and capacity of the electric double layer capacitor.

Further, in the present embodiment, at the time of describing a matter in common between the cathode and the anode without making a distinction therebetween, the cathode composite sheet 20A and the anode composite sheet 30A may be referred to as a composite sheet, the cathode collector electrode 21a and the anode collector electrode 31a may be simply referred to as a collector electrode, and the cathode active material layer 21b and the anode active material layer 31b may be simply referred to as an active material layer.

As shown in present Embodiment 6, when the top of the collector is to be coated with the active material layer, a binder in the active material layer is deposited in the vicinity of the interface between the active material layer and the collector electrode, so as to allow an increase in bonding force between the active material layer and the collector electrode.

Further, as shown in present Embodiment 6, when the top of the collector electrode having high continuity and reduced in thickness is to be coated with the active material layer, it is possible to further reduce the size and profile.

Moreover, when the collector electrode is to be formed on the active material layer, etching of the collector electrode and removal of the oxide film of the collector electrode are difficult, but in present Embodiment 6, since the active material layer is to be formed on the collector electrode, the active material layer can be formed after etching of the collector electrode and removal of the oxide film of the collector electrode, to facilitate etching and removal of the oxide film.

iii) Production and Lamination of Cathode/Anode Integrated Sheet

<Step MS1>

First, as shown in FIG. 26(10), the cathode composite sheet 20A and the anode composite sheet 30A are arranged such that the surfaces thereof which are formed with the separator layers 42 are opposed to each other, and the cathode composite sheet 20A and the anode composite sheet 30A are uniformly pressurized from both sides thereof for example by means of a pressure plate, not shown, for heating so that the separator layers 42 are bonded to each other, as shown in FIG. 26(11). As thus described, the cathode/anode integrated sheet 50A is produced.

At this time, for example, a temperature of the pressure plate is set to 150° C., pressure in pressurization to 20 MPa, and pressurization time to 30 seconds.

In the cathode/anode integrated sheet 50A produced by bonding the separator layers 42 to each other in such a manner, the cathode composite sheet 20A and the anode composite sheet 30A on both sides of the pasted surface have almost equal expansion/contraction characteristics with respect to heat, thereby to suppress warpage after bonding so as to facilitate handling in the following manufacturing process.

Further, since the cathode composite sheet 20A and the anode composite sheet 30A are bonded to each other and regarded as the cathode/anode integrated sheet 50A, even when the cathode composite sheet 20A and the anode composite sheet 30A are reduced in thickness, it is easier to handle the sheet while holding the regular arrangement and predetermined positions of the cathode composite sheet 20A and the anode composite sheet 30A without breakage, so as to allow further reduction in size and profile of the device.

A plurality of power storage units are transversely aligned and formed inside the cathode/anode integrated sheet 50A.

It should be noted that as shown in present Embodiment 6, in the cathode/anode integrated sheet 50A, a void formed between the cathode active material layer 21b and the anode active material layer 31b is preferably communicated with the outside of the cathode/anode integrated sheet 50A through the slit 25. Thereby, at the time of bonding the cathode composite sheet 20A and the anode composite sheet 30A to each other to produce the cathode/anode integrated sheet 50A, it is possible to prevent swelling and deformation of the cathode/anode integrated sheet 50A due to extra sealing of a gas (air, etc.) between the cathode composite sheet 20A and the anode composite sheet 30A.

After bonding the separator layers to each other, either the substrate film 100 on the anode composite sheet 30A side or that on the cathode composite sheet 20A side is peeled.

For example, at the time of peeling the substrate film 100 on the cathode side, as shown in FIG. 26(12), the anode side of the cathode/anode integrated sheet 50A is brought into contact with the suction board, not shown, for suction and the cathode/anode integrated sheet 50A is lifted, to peel the substrate film 100 on the cathode side.

When the substrate film 100 on the cathode side is to be peeled, stronger bonding force needs to be ensured between the cathode composite sheet 20A and the anode composite sheet 30A than bonding force between the substrate film 100 and the cathode composite sheet 20A, and the difference in bonding force therebetween can be relatively easily realized when the mold releasing layer is present between the substrate film 100 and the cathode composite sheet 20A.

On the other hand, when the mold releasing layer is not present between the substrate film 100 and the cathode composite sheet 20A (namely between the substrate film 100 and the adhesive layer 121), the above difference in bonding force can be realized by bonding the cathode composite sheet 20A and the anode composite sheet 30A to each other at high temperature and high pressure. However, in bonding at high temperature and high pressure, caution needs to be taken to prevent breakage of voids in the active material layer and the separator layer and prevent deformation of the shapes of the cathode composite sheet 20A and the anode composite sheet 30A.

Further, in the case of formation of the collector electrode on the adhesive layer 121 by vapor deposition or in some other case, bonding force with the substrate film becomes stronger due to thermal damage to the substrate film or sinkage of vapor deposition particles by kinetic energy, and peeling may become difficult without the mold releasing layer. Accordingly, in the present invention, it is preferable to previously form a mold releasing layer being thick enough to allow prevention of damage to the substrate film.

At the time of peeling the substrate film 100 on the anode side, the cathode side of the cathode/anode integrated sheet 50A is brought into contact with the suction board and sucked, and the cathode/anode integrated sheet 50A is lifted, to peel the substrate film 100 on the anode side.

In such a manner, a required number of cathode/anode integrated sheets 50A, with either the cathode composite sheet 20A side or the anode composite sheet 30A side bonded with the substrate film 100, are produced.

iv) Lamination of Cathode/Anode Integrated Sheets

<Step MS2>

For example, as shown in FIG. 27(13), in the first lamination, below the cathode/anode integrated sheet 50A with the anode side having been sucked by the suction board, the cathode/anode integrated sheet 50A with the substrate film 100 bonded to the anode composite sheet 30A side is arranged such that the substrate film 100 is located on the downside, and thereafter, as shown in FIG. 27(14), those two cathode/anode integrated sheets 50A are brought into contact with each other, and then bonded by uniform pressurization of the whole surface by means of a pressure plate, not shown.

At this time, for example, a temperature of the pressure plate is set to 150° C., pressure in pressurization to 20 MPa, and pressurization time to 30 seconds.

It is to be noted that in the case of producing the lamination block 1 for electrochemical element where the separator layers are arranged in the upper and lower outermost layers as shown in FIG. 30, for example, a sheet for separator layer which is obtained by forming only a separator layer with a predetermined thickness (e.g. 6 μm) on a substrate film is used, and in the first lamination, the cathode/anode integrated sheet 50A is laminated on the separator layer of that sheet for separator layer.

Next, as shown in FIG. 27(15), the substrate film 100 on the anode side of the cathode/anode integrated sheet 50A, which is sucked by the suction board, is peeled.

Then, on the cathode/anode integrated sheet 50A with the substrate film 100 on its anode side having been peeled therefrom, another cathode/anode integrated sheet 50A with the substrate film 100 on its anode side having been peeled therefrom is arranged such that the anode sides are opposed to each other as shown in FIG. 27(16), and the anode sides are bonded to each other as shown in FIG. 28(17).

Next, the substrate film 100 on the cathode side of laminated another cathode/anode integrated sheet 50A is peeled, and thereon, the cathode/anode integrated sheet 50A with the substrate film 100 on its anode side having been peeled therefrom is arranged such that the cathode sides are opposed to each other, and the cathode sides are then bonded to each other by making the respective adhesive layers 121 adhere to each other.

Hereinafter, Steps MS1 and MS2 are repeated a required number of times, to produce a laminated sheet LB1 for electrochemical element where the cathode/anode integrated sheets 50A are laminated, as shown in FIG. 29.

In addition, in the case of producing the lamination block 1 for electrochemical element with the separator layers arranged in the outermost layers as shown in FIG. 30, a sheet for separator which is obtained by forming only the separator layer, the same one as used in the first lamination, is used and at the end of the lamination, the separator layer of the sheet for separator layer is opposed and bonded.

Further, in the lamination block 1 for electrochemical element which is produced by the above process steps as shown in FIG. 29, the cathode collector electrode 21a and the anode collector electrode 31a as the outermost layers are each one layer, and hence thinner than the collector electrode on the inside which is formed by superimposition of two layers of the cathode collector electrodes 21a or the anode collector electrodes 31a, but in FIG. 30, all the cathode collector electrodes and the anode collector electrodes are drawn so as to have the same thickness due to constraints in drawing.

However, in the present invention, for example, thicknesses of the collector electrode and the active material layer may be made the same regardless of formation places, or those can be appropriately changed in accordance with the formation places or the manufacturing method.

It is to be noted that in present Embodiment 6, the adhesive layer 121 is formed on the mold releasing layer 101 formed on the surface of the substrate film 100, and the cathode collector electrode 21a and the anode collector electrode 31a are formed on this adhesive layer 121.

This can lead to more reliable bonding between the cathode collector electrodes and between the anode collector electrodes via the adhesive layers 121, so as to produce a power storage device with higher reliability.

<Step MS3>

Next, after peeling of the substrate films 100 arranged in the upper and lower outermost layers of the laminated sheet LB1 for electrochemical element, the laminated sheet LB1 for electrochemical element is cut along a cut line D1, to produce the lamination block 1 for electrochemical element.

That is, a plurality of longitudinally laminated power storage units in a transversely aligned state is cut into single laminated power storage units, thereby to produce the lamination block 1 for electrochemical element.

It is to be noted that in this step, the substrate film 100 may be peeled after cutting of the laminated sheet LB1 for electrochemical element.

<Step MS4>

Then, as shown in FIG. 30, out of the cut surfaces of the cut lamination block 1 for electrochemical element, a cathode terminal electrode 21t is formed on the side surface where the cathode collector electrode 21a is exposed and an anode terminal electrode 31t is formed on the side surface where the anode collector electrode 31a is exposed.

Herein, the cathode terminal electrode 21t and the anode terminal electrode 31t can be formed by attaching aluminum to the side surfaces of the lamination block 1 for electrochemical element by sputtering, for example.

Other than by sputtering, the cathode terminal electrode 21t and the anode terminal electrode 31t may be produced by direct formation of a conductive film on the side surface of the lamination block 1 for electrochemical element by vapor deposition, ion-plating, thermal spraying, cold splaying, plating or the like.

Further, the cathode terminal electrode 21t and the anode terminal electrode 31t may be formed by directly applying a conductive adhesive agent to the side surface of the lamination block 1 for electrochemical element by dipping.

It is preferable that the electrolyte guiding path be not exposed on the side surface of the lamination block 1 for electrochemical element, which is formed with the cathode terminal electrode 21t or the anode terminal electrode 31t. This is because, when the electrolyte guiding path is exposed, the cathode terminal electrode 21t or the anode terminal electrode 31t may get into the inside of the power storage unit, to cause a short circuit with the cathode or the anode.

As illustrated in FIG. 31, the lamination block 1 for electrochemical element, whose side surfaces are formed with the cathode terminal electrode 21t and the anode terminal electrode 31t, is housed inside the package provided with the cathode package electrode 122b and the anode package electrode 132b, along with the electrolyte, to produce a power storage device such as the electric double layer capacitor 80A.

At the time of housing the lamination block 1 for electrochemical element inside the package, for example, the conductive adhesive agents 122a, 132a which contain gold as a conductive particle are applied by dipping onto the cathode terminal electrode 21t and the anode terminal electrode 31t, and the lamination block 1 for electrochemical element is arranged such that the conductive adhesive agent 122a and the conductive adhesive agent 132a are respectively connected to the cathode package electrode 122b and the anode package electrode 132b.

Then, the package arranged with the lamination block 1 for electrochemical element is heated, for example, at 170° C. for 10 minutes, to cure the conductive adhesive agents 122a, 132a, so as to fix the lamination block 1 for electrochemical element to the package electrodes 122b, 132b, while electrically connecting the cathode terminal electrode 21t and the anode terminal electrode 31t respectively to the cathode package electrode 122b and the anode package electrode 132b.

As the conductive particles, carbon, silver, copper, aluminum or the like may be used other than gold, depending on applications.

Further, since the lamination block 1 for electrochemical element, put inside the package, has the slits 25 on the front surface and the rear surface as described above and an individual power storage unit has the electrolyte guiding path, the electrolyte is rapidly supplied to between the cathode active material layer 21b and the anode active material layer 31b inside the power storage unit.

The above manufacturing method for the lamination block 1 for electrochemical element according to Embodiment 6 includes the process step of producing the cathode composite sheet 20A or the anode composite sheet 30A on the substrate film 100 and peeling the substrate film 100 from the cathode composite sheet 20A or the anode composite sheet 30A.

It is thereby possible to integrally produce one continuous separator layer with a plurality of patterned cathode collector electrodes 21a and cathode active material layers 21b.

Similarly, it is possible to integrally produce one continuous separator layer with a plurality of patterned anode collector electrodes 31a and anode active material layers 31b.

Accordingly, in the manufacturing method of Embodiment 6, a large number of lamination blocks 1 for electrochemical element can be collectively produced, so as to improve the productivity as compared with the conventional method of individually producing and handling the electric double layer capacitors one by one.

Furthermore, in the above manufacturing method of above Embodiment 6, a plurality of patterned cathode collector electrodes 21a or anode collector electrodes 31a are integrated by one continuous separator layer 42, thereby to facilitate handling of the electrodes. Moreover, the cathode composite sheet 20A and the anode composite sheet 30A are supported by the substrate film 100 until laminated, thereby to further facilitate handling of the electrodes.

Accordingly, for example even when the cathode collector electrode 21a or the anode collector electrode 31a is made thinner, those electrodes are easy to handle. It is thus possible to produce a smaller-sized lamination block 1 for electrochemical element.

Moreover, according to the manufacturing method of Embodiment 6, the patterned plurality of cathode collector electrodes 21a and/or anode collector electrodes 31a and plurality of cathode active material layers 21b and/or anode active material layers 31b are integrated with the separator layers 42, thereby facilitating handling in the manufacturing process even when the lamination block 1 for electrochemical element is reduced in size, so as to allow production of a smaller lamination block 1 for electrochemical element.

Furthermore, in the above manufacturing method of Embodiment 6, since the cathode 21 and the anode 31 which are adjacent to each other are bonded and fixed to the separator layer 42, it is possible to prevent positional displacement of the cathode 21 and the anode 31 in the manufacturing process and after completion of a product.

This can facilitate handling and multi-layering of the sheets in the manufacturing process, so as to suppress a characteristic change such as a capacity change after completion of the product.

Further, in the manufacturing method of above Embodiment 6, the collector electrodes with the active material layers formed on one surfaces thereof are arranged as the other surfaces thereof are opposed to each other, whereby it is possible to facilitate realization of a state where the active material layers are formed on both surfaces of the collector electrode, so as to produce the lamination block 1 for electrochemical element which has a high volume-capacity ratio.

That is, in the conventional manufacturing method, forming the active material layers on both surfaces of the collector foil is not easy, but difficult, in terms of handling.

It is to be noted that in the present embodiment, the separator layers 42 of the cathode composite sheet 20A and the anode composite sheet 30A have been bonded to each other to produce the cathode/anode integrated sheet 50A, and the cathode/anode integrated sheets 50A have been laminated to produce the laminated sheet LB1 for electrochemical element. However, the production method for the laminated sheet for electrochemical element is not restricted to this, and it may be produced as follows.

For example, the surfaces of the two cathode composite sheets 20A with the substrate films 100 having been peeled therefrom are bonded to each other as the cathode collector electrode 21a are opposed to each other, to produce a cathode/cathode integrated sheet. Similarly, the surfaces of the two anode composite sheets 30A with the substrate films 100 having been peeled therefrom are bonded to each other as the anode collector electrode 31a are opposed to each other, to produce an anode/anode integrated sheet. These cathode/cathode integrated sheet and anode/anode integrated sheet are bonded to each other as the respective separator layers 42 are opposed to each other, to produce a laminated sheet. The cathode/cathode integrated sheet side of the above laminated sheet is bonded with another anode/anode integrated sheet as the separator layers 42 are opposed to each other. This lamination step is repeated a required number of times, to produce a laminated sheet for electrochemical element.

In addition, the lamination block 1 for electrochemical element and the electric double layer capacitor 80A in the present embodiment are not restricted to the configuration where the power storage units are laminated as shown in FIGS. 30 and 31. For example, the lamination block 1 for electrochemical element and the electric double layer capacitor 80A, which are not laminated with the power storage units, are also included in the present invention.

The lamination block 1 for electrochemical element and the electric double layer capacitor 80A as above can be obtained for example by using only one cathode/anode integrated sheet 50A without laminating the cathode/anode integrated sheets 50A.

It is to be noted that in the present embodiment, a porous insulating layer with a lower air permeability than that of the separator layer 42 can be formed on the cathode active material layer 21b and the anode active material layer 31b, and in this case, a leakage current can be more reliably suppressed.

EXAMPLES

Example 1

In Example 1, an electric double layer capacitor block was produced in accordance with the manufacturing method of Embodiment 1.

First, as the substrate film 100, a substrate PET film formed with the silicon-based mold releasing layer 101 on its surface was prepared.

As the cathode collector film 102, an Al film having a thickness of 500 nm was formed on the substrate PET film by a vacuum deposition method.

Conditions for this film formation were a vacuum degree of $3\times10^{-4}$ Pa, a current value of 800 mA, a film formation rate of 30 Å/s, and a substrate cooling temperature of $-10°$ C.

On this substrate PET film formed with the Al film, a resist pattern R102 where 20 mm×10 mm rectangular pattern was aligned in five columns and 10 rows with a distance between adjacent patterns of 5 mm was printed by screen printing, and dried in an air-heating furnace at 100° C. for 15 minutes.

The substrate PET film printed with the resist pattern R102 was immersed in a ferric chloride aqueous solution bath at 45° C. for 30 seconds to remove the Al film other than a portion masked by the resist by wet etching, so as to form a cathode collector Al electrode as the cathode collector electrode 21a. Thereafter, the ferric chloride aqueous solution that remained on the substrate surface was removed by a rinsing shower.

It is to be noted that, although low-cost ferric chloride was used in Example 1, other than this, hydrochloric acid, sulfuric acid, nitric acid or mixed acid of those can also be used, and a hydrofluoric acid salt-based neutral aqueous solution can also be used.

The substrate PET film formed with the cathode collector Al electrode was passed through a butyl acetate shower, to peel the resist. Subsequently, butyl acetate that remained on the substrate surface was evaporated in the air-heating furnace at 60° C.

For peeling the resist, propyleneglycol monomethylether acetate, 3-methoxybutyl acetate or an organic solvent such as an amine-based solvent can also be used other than butyl acetate.

After peeling of the resist, removal and surface fluorination of the oxide film on the surface of the cathode collector Al electrode were performed by means of mixed acid of hydrofluoric acid and sulfuric acid as a surface treatment of the cathode collector Al electrode. As the method for the surface treatment, other than this, there may be performed removal of the oxide film on the surface of the collector by another acid or alkaline treatment, surface fluoridation by a fluorine-based liquid, gas or plasma, surface roughening by chemical or mechanical polishing, surface coating by application of a conductive coating, or the like.

On each cathode collector Al electrode having a rectangular shape with a size of 20 mm×10 mm, two active material layer patterns each having a rectangular shape with a size of 6 mm×10 mm and having a thickness of 10 µm were printed by screen printing in the arrangement shown in FIG. 2(6a), which were thereafter dried in the air-heating furnace at 80° C. for 20 minutes, to form the cathode active material layers 21b.

A paste was printed by screen printing in a portion not formed with the cathode active material layer on the substrate PET film, the paste having been produced by mixing a PVDF binder solution (L#1120 manufactured by KUREHA CORPORATION, 280000-molar weight, 12 wt % solution) with one obtained by diffusing a silica particle in methyl ethyl keton as a solvent, which was then dried in the air-heating furnace at 120° C. for 30 minutes, to form as the buried layer 41 a grid-like silica layer having a thickness of 10 µm on the cathode collector Al electrode and a thickness of 10.5 µm in the other portion.

The grid-like silica layer serves to level a gap of the thickness of the active material layer on the sheet.

A paste was printed by screen printing on the surface with the gap having been leveled so as to cover an active material pattern group, the paste having been produced by mixing a PVDF binder solution (L#1120 manufactured by KUREHA CORPORATION, 280000-molar weight, 12 wt % solution) with one obtained by diffusing a silica particle in methyl ethyl keton as a solvent, which was then dried in the air-heating furnace at 120° C. for 30 minutes, to form a separator layer with a thickness of 6 µm and regard it as the separator layer 11.

Ten cathode composite sheets 20A, each produced as thus described, were prepared.

Similarly, 10 anode composite sheets 30A were produced and prepared.

Next, the cathode composite sheet and the anode composite sheet were arranged as the cathode composite sheet was located on the downside and the separator layers were opposed to each other, and then bonded to each other by uniform pressurization of the whole surface from both sides by the pressure plate. At this time, a temperature of the pressure plate was set to 150° C., pressure in pressurization to 0.05 MPa, and pressurization time to one minute.

As thus described, nine cathode/anode integrated sheets were further produced, and regarded as the cathode/anode integrated sheets 50A.

The cathode/anode integrated sheets 50A prepared as above were laminated while the substrate PET film was appropriately pealed as follows.

First, the anode side of one cathode/anode integrated sheet was brought into contact with the suction board, to be sucked, and the cathode/anode integrated sheet was lifted, whereafter the substrate PET film on the cathode side was peeled.

Below the cathode/anode integrated sheet with the substrate PET film on the cathode side having been sucked by the suction board and peeled, a sheet obtained by forming only a separator layer on a substrate PET film was arranged such that the substrate PET film side of the sheet was located on the downside, and then bonded.

Then, the substrate PET film on the anode side of the cathode/anode integrated sheet, sucked by the suction board, was peeled.

Next, the cathode side of another one cathode/anode integrated sheet was brought into contact with the suction board, to be sucked, and the cathode/anode integrated sheet was lifted, whereafter the substrate PET film on the anode side was peeled.

The cathode/anode integrated sheet bonded with the sheet obtained by forming only a separator layer on a substrate PET film was arranged below foregoing another cathode/anode integrated sheet with the substrate PET film on the anode side having been peeled therefrom, and was then bonded. After the bonding, the substrate PET film on the cathode side of foregoing another cathode/anode integrated sheet was peeled.

Onto foregoing another cathode/anode integrated sheet with the substrate PET film on the cathode side having been peeled therefrom, still another cathode/anode integrated sheet with the anode side having been sucked by the suction board and the substrate PET film on the cathode side having been peeled was bonded.

The above process step was repeated, to laminate 10 cathode/anode integrated sheets on the sheet obtained by forming only a separator layer on a substrate PET film, and the substrate PET film in the top layer of the lamination was peeled.

Finally, the substrate PET film side of a separately prepared sheet obtained by forming only a separator layer on a substrate PET film was brought into contact with the suction board and sucked, and the separator layer was bonded onto the cathode/anode integrated sheet with the substrate PET film in the top layer having been peeled therefrom, thereby to produce the laminated sheet for electrochemical element.

The above bonding was each performed by bringing the separator layer and the cathode/anode integrated sheet into contact with each other, or bringing two cathode/anode integrated sheets into contact with each other, and uniformly pressurizing the whole surface by the pressure plate. At this time, a temperature of the pressure plate was set to 150° C., pressure in pressurization to 0.05 MPa, and pressurization time to one minute.

The substrate PET films, adhering to the top and bottom of the laminated sheet for electrochemical element of Example 1 produced as above, were peeled and thereafter, the sheet was cut, to produce an electric double layer capacitor block.

A cathode terminal electrode and an anode terminal electrode were formed by Al sputtering on the side surfaces of the electric double layer capacitor block produced as above, and conductive adhesive agents containing gold as a conductive particle were respectively applied onto the cathode terminal electrode and the anode terminal electrode by dipping.

Then, the electric double layer capacitor block was arranged inside a separately prepared package such that the applied conductive adhesive agents were respectively connected to a cathode package electrode and an anode package electrode, which was then heated at 170° C. for 10 minutes.

After completion of fixing and electric connection to the inside of the package in such a manner as above, an electrolyte was poured thereinto, to seal the package.

An electric characteristic of the electric double layer capacitor of Example 1 produced as above was a direct current capacity of 112 mF.

Example 2

In Example 2, an electric double layer capacitor block was produced in accordance with the manufacturing method of Embodiment 2.

In Example 2, using the cathode composite sheet produced in a similar manner to Example 1, the anode active material pattern group was printed on the separator layer of the cathode composite sheet by screen printing, which was thereafter dried in the air-heating furnace at 80° C. for 20 minutes, to form the anode active material layer with a thickness of 10 μm and regard it as the anode active material layer 32b.

A paste was printed by screen printing in a portion where the anode active material layer was not formed and the surface of the separator layer was exposed, the paste having been produced by mixing a PVDF binder solution (L#1120 manufactured by KUREHA CORPORATION, 280000-molar weight, 12 wt % solution) with one obtained by diffusing a silica particle in methyl ethyl keton as a solvent, which was then dried in the air-heating furnace at 120° C. for 30 minutes, to form as the buried layer 42 a grid-like silica layer having a thickness of 10 μm so as to planarize the surface.

After arrangement of a metal mask for forming the anode collector Al electrode group on the planarized surface, an anode collector Al electrode with a thickness of 500 nm was formed by the vacuum deposition method and regarded as the anode collector electrode 32a. Conditions for the film formation were a vacuum degree of $3 \times 10^{-4}$ Pa, a current value of 800 mA, a film formation rate of 30 Å/s, and a substrate cooling temperature of −10° C. On this cathode side, five cathode/anode integrated sheets 50AB bonded with the substrate PET film were produced.

Similarly, using the anode composite sheets produced in a similar manner to Example 1, five cathode/anode integrated sheets 50BA, each bonded with the substrate PET film on its anode side, were produced.

The cathode/anode integrated sheets 50AB and the cathode/anode integrated sheets 50BA as thus produced were laminated as follows.

First, the anode side of one cathode/anode integrated sheet 50BA was brought into contact with the suction board and sucked, to lift the cathode/anode integrated sheet 50BA, and therebelow a sheet obtained by forming only a separator layer on a substrate PET film was arranged such that the substrate PET film side was located on the downside, and was then bonded. Then, the substrate PET film on the anode side of the cathode/anode integrated sheet 50BA, sucked by the suction board, was peeled.

Next, the cathode side of one cathode/anode integrated sheet 50AB was brought into contact with the suction board and sucked, to lift the cathode/anode integrated sheet 50AB, and therebelow the cathode/anode integrated sheet 50BA bonded with a sheet obtained by forming only a separator layer on a substrate PET film was arranged, and bonded thereto. After the bonding, the substrate PET film on the cathode side of the cathode/anode integrated sheet 50AB was peeled.

Thereafter, the cathode/anode integrated sheets 50BA and the cathode/anode integrated sheets 50AB were alternately bonded to each other in a similar manner, and on a sheet obtained by forming only a separator layer on a substrate PET film, a total of 10 cathode/anode integrated sheets 50BA and cathode/anode integrated sheets 50AB were alternately laminated, and the substrate PET film in the top layer of the lamination was peeled.

Finally, the substrate PET film side of the sheet obtained by forming only the separator layer on the substrate PET film was brought into contact with the suction board and sucked, and the separator layer was bonded onto the cathode/anode integrated sheet 50AB with the substrate PET film in the top layer having been peeled therefrom, thereby to produce the laminated sheet for electrochemical element.

The above bonding was each performed by bringing the separator layer and the cathode/anode integrated sheet into contact with each other, or bringing two cathode/anode integrated sheets with each other, and uniformly pressurizing the whole surface by the pressure plate. At this time, a temperature of the pressure plate was set to 150° C., pressure in pressurization to 0.05 MPa, and pressurization time to one minute.

The substrate PET films, adhering to the top and bottom of the laminated sheet for electrochemical element of Example 2 produced as above, were peeled and thereafter, the sheet was cut, to produce an electric double layer capacitor block.

Subsequently, in a similar manner to Example 1, an electric double layer capacitor of Example 2 was produced.

An electric characteristic of the electric double layer capacitor of Example 2 produced as above was a direct current capacity of 123 mF.

Example 3

In Example 3, a transfer film was arranged on the separator layer of the cathode composite sheet formed on the substrate PET film produced in Example 1, and then pressurized, to bond the transfer film to the cathode composite sheet. At this time, a temperature of the pressure plate was 150° C., pressure in pressurization was 0.05 MPa, and pressurization time was one minute. Subsequently, the substrate PET film of the cathode composite sheet was peeled.

After arrangement of a metal mask for forming the cathode collector electrode on the surface of the cathode composite sheet, to which the substrate PET film had been bonded, a cathode collector Al electrode with a thickness of 500 nm was formed by the vacuum deposition method and regarded as the cathode collector electrode 23a. Conditions for the film formation were a vacuum degree of $3\times10^{-4}$ Pa, a current value of 800 mA, a film formation rate of 30 Å/s, and a substrate cooling temperature of −10° C. Similarly to Example 1, the cathode collector Al electrode was formed in a rectangular pattern having a size of 20 mm×10 mm.

On the cathode collector Al electrode, two cathode active material layers each having a rectangular shape with a size of 6 mm×10 mm and having a thickness of 10 μm were printed by screen printing, which were thereafter dried in the air-heating furnace at 80° C. for 20 minutes, to respectively form cathode active material layers and regard them as the cathode active material layers 23b.

A paste was printed by screen printing in a portion not formed with the cathode active material layer, the paste having been produced by mixing a PVDF binder solution (L#1120 manufactured by KUREHA CORPORATION, 280000-molar weight, 12 wt % solution) with one obtained by diffusing a silica particle in methyl ethyl keton as a solvent, which was then dried in the air-heating furnace at 120° C. for 30 minutes, to form as the buried layer 43 a grid-like silica layer having a thickness of 10 μm in a thin portion on the cathode collector Al electrode and a thickness of 10.5 μm in the other thick portion. The grid-like silica layer serves to fill a space between thicknesses of the active material layers on the sheet to level the surface.

A paste was printed on the leveled surface by screen printing so as to cover an active material pattern group, the paste having been produced by mixing a PVDF binder solution (L#1120 manufactured by KUREHA CORPORATION, 280000-molar weight, 12 wt % solution) with one obtained by diffusing a silica particle in methyl ethyl keton as a solvent, which was then dried in the air-heating furnace at 120° C. for 30 minutes, to form a separator layer with a thickness of 6 μm and regard it as the separator layer 13. In such a manner, the cathode/cathode integrated sheet, whose front surface and rear surface were both cathodes, was produced and regarded as the cathode/cathode integrated sheet 20D.

Further three of such cathode/cathode integrated sheets were produced.

In a similar manner, five anode/anode integrated sheets 30D were produced.

Moreover, for example, two sheets for separator each formed with only the separator layer having a thickness of 6 μm were prepared on the substrate PET film, and further, two cathode composite sheets 20A were prepared in a similar manner to Example 1.

The cathode/cathode integrated sheets 20D, the anode/anode integrated sheets 30D, the sheet for separators and the cathode composite sheets 20A prepared as above were laminated as described below.

First, on the separator layer of the sheet for separator, the cathode composite sheet 20A, which had been bonded to the transfer film and from which the substrate film 100 had been peeled, was laminated such that the cathode collector electrode 21a was bonded to the separator layer of the sheet for separator, and the transfer film was peeled.

Next, the transfer film surface of one anode/anode integrated sheet was brought into contact with the suction board, to be sucked and the anode/anode integrated sheet was lifted.

Below the anode/anode integrated sheet sucked by the suction board, one was arranged which was obtained by laminating the cathode composite sheet 20A with the substrate film 100 having been peeled therefrom on the separator layer of the sheet for separator such that the cathode collector electrode 21a was bonded to the separator layer of the sheet for separator, and by peeling the transfer film, and the sucked anode/anode integrated sheet was brought into contact with the separator layer, and then bonded by uniform pressurization of the whole surface by the pressure plate. At this time, a temperature of the pressure plate was 150° C., pressure in pressurization was 0.05 MPa, and pressurization time was one minute. Subsequently, the transfer film was peeled.

Further, pressurization and bonding of the cathode/cathode integrated sheet, peeling of the transfer film, pressurization and bonding of the anode/anode integrated sheet, peeling of the transfer film were repeated.

Finally, after lamination of the cathode composite sheet 20A, the substrate film 100 was peeled, and the separator layer of the sheet for separator was bonded to the peeled surface so as to be opposed thereto, followed by peeling of the substrate PET film of the sheet for separator.

The laminated sheet LB3 for electrochemical element was produced in such a manner as above and the laminated sheet LB3 for electrochemical element was cut, thereby to produce an electric double layer capacitor block.

It is to be noted that the substrate film arranged in the bottom layer of the laminated sheet LB3 for electrochemical element was peeled before cutting.

Subsequently, in a similar manner to Example 1, an electric double layer capacitor of Example 3 was produced.

An electric characteristic of the electric double layer capacitor of Example 3 produced as above was a direct current capacity of 108 mF.

Example 4

In Example 4, an electric double layer capacitor block was produced in accordance with the manufacturing method of Embodiment 4.

First, as the substrate film 100, a substrate PET film formed with the silicon-based mold releasing layer 101 on its surface was prepared. It is to be noted that, the substrate PET film having a size of 50 mm×30 mm was used.

On the substrate PET film, a cathode collector Al electrode was produced as the cathode collector electrode 24a having a thickness of 500 nm by the vacuum deposition method. Conditions for this film formation were a vacuum degree of $3\times10^{-4}$ Pa, a current value of 800 mA, a film formation rate of 30 Å/s, and a substrate cooling temperature of −10° C.

Further, the cathode collector Al electrode had a size of 45 mm×30 mm, and was formed on the substrate PET film so as to be only 5 mm inward away from its one side.

The top of the cathode collector Al electrode was coated with an active material paste by screen printing, which was thereafter dried in the air-heating furnace at 80° C. for 20 minutes, to form the active material layer with a thickness of 10 μm and regard it as the cathode active material layer 24b. A size of the cathode active material layer was set to 40 mm×30 mm, and its arrangement on the substrate PET film was made to be the arrangement shown in FIGS. 16, 17.

Further, this was coated with a paste by means of screen printing, the paste having been produced by mixing a PVDF binder solution (L#1120 manufactured by KUREHA CORPORATION, 280000-molar weight, 12 wt % solution) with one obtained by diffusing a silica particle in methyl ethyl keton as a solvent, which was then dried in the air-heating furnace at 120° C. for 30 minutes, to form a separator layer with a thickness of 6 μm and regard it as the separator layer 61.

As thus described, the cathode composite sheet having the pattern shown in FIG. 16(4b) was produced and regarded as the cathode composite sheet 70A.

Similarly, the anode composite sheet having the pattern shown in FIG. 17(4b) was produced and regarded as the anode composite sheet 70B.

A size of the anode collector electrode 34a was set to 45 mm×20 mm.

A size of the anode active material layer 34b was set to 40 mm×20 mm.

The cathode composite sheet and the anode composite sheet produced as above were arranged as the cathode composite sheet was located on the downside and the separator surfaces were opposed to each other, and then bonded to each other by uniform pressurization of the whole surface from both sides, to produce the cathode/anode integrated sheet and regard it as the cathode/anode integrated sheet 70AB.

At this time, a temperature of the pressure plate was set to 150° C., pressure in pressurization to 0.05 MPa, and pressurization time to one minute.

Further nine of such cathode/anode integrated sheets were produced.

The anode side of one cathode/anode integrated sheet was brought into contact with the suction board, to be sucked, and the cathode/anode integrated sheet was lifted, whereafter the substrate PET film on the cathode side was peeled.

Below the cathode/anode integrated sheet sucked by the suction board, another cathode/anode integrated sheet was arranged such that the substrate PET film on the anode side was located on the downside, and the substrate PET film on the cathode side was peeled, whereafter the sheets were brought into contact with each other, and then bonded by uniform pressurization of the whole surface. At this time, a temperature of the pressure plate was 150° C., pressure in pressurization was 0.05 MPa, and pressurization time was one minute. Subsequently, the substrate PET film having been in contact with the suction board was peeled.

A similar operation was repeated, to laminate 10 cathode/anode integrated sheets, and finally, separator layers were arranged in the upper and lower outermost layers by use of separately prepared sheets each obtained by forming only a separator layer with a thickness of 6 μm on a substrate PET film, to produce a lamination block for electric double layer capacitor.

Subsequently, in a similar manner to Example 1, an electric double layer capacitor of Example 4 was produced.

An electric characteristic of the electric double layer capacitor of Example 4 produced as above was a direct current capacity of 1480 mF.

Example 5

In Example 5, an electric double layer capacitor block (lamination block 1 for electrochemical element) was produced in accordance with the manufacturing method of Embodiment 6.

First, as the substrate film 100, urethane was applied to the surface of the substrate PET film formed with the silicon-based mold releasing layer 101 on its surface, to form the adhesive layer 121 having a film thickness of 1 μm, and thereafter, an Al film with a film thickness of 500 nm was formed as the cathode collector film 102 by the vacuum deposition method.

Conditions for the film formation of the aluminum film were a vacuum degree of $3\times10^{-4}$ Pa, a current value of 800 mA, a film formation rate of 30 Å/s, and a substrate cooling temperature of −10° C.

On this substrate PET film 100 formed with an aluminum film 102 (via the adhesive layer 121), the resist pattern R102 where 20 mm×10 mm rectangular pattern was aligned in five columns and 10 rows with a distance between adjacent patterns of 8 mm was printed by screen printing, and dried in the air-heating furnace at 100° C. for 15 minutes.

The substrate PET film 100 printed with the resist pattern R102 was immersed in a ferric chloride aqueous solution bath at 45° C. for 30 seconds to remove the aluminum film in a portion other than a portion masked by the resist by wet etching, so as to form a cathode collector aluminum electrode as the cathode collector electrode 21a. Thereafter, the ferric chloride aqueous solution that remained on the substrate surface was removed by a rinsing shower.

It is to be noted that, although low-cost ferric chloride was used in Example 5, other than this, hydrochloric acid, sulfuric acid, nitric acid or mixed acid of those can also be used, and a hydrofluoric acid salt-based neutral aqueous solution can also be used.

The substrate PET film 100 formed with the cathode collector electrode 21a (aluminum electrode) was passed through a butyl acetate shower, to peel the resist. Subsequently, butyl acetate that remained on the substrate surface was evaporated in the air-heating furnace at 60° C.

For peeling the resist, propyleneglycol monomethylether acetate, 3-methoxybutyl acetate or an organic solvent such as an amine-based solvent can also be used other than butyl acetate.

Active Material Layer (i) 29.0 g of activated carbon (BET specific surface area of 1668 m$^2$/g, average pore diameter of 1.83 nm, average particle diameter D50=1.26 μm), (ii) 2.7 g of carbon black (TOKABLACK (registered trademark) #3855, manufactured by Tokai Carbon Co., Ltd., BET specific surface area of 90 m$^2$/g), (iii) 3.0 g of carboxymethylcellulose (CMC2260, manufactured by Daicel Corporation), (iv) 2.0 g of 38.8 wt % polyacrylate resin aqueous solution, and (v) 286 g of deionized water were weighed, and subjected to first-order dispersion and second-order diffusion on conditions shown in Table 1, to be mixed so as to produce an activated carbon paste.

TABLE 1

| | |
|---|---|
| First-order dispersion | Equipment: Despa Mill [MD-3, manufactured by ASADA IRON WORKS. CO., LTD.] Condition: Capacity - 1L, Number of revolutions - 6000 rpm, Dispersion time - 120 min. |
| Second-order dispersion | Equipment: Despa Mill [MD-3, manufactured by ASADA IRON WORKS. CO., LTD.] Condition: Capacity - 1L, Number of revolutions - 14000 rpm, Dispersion time - 10 min. |
| Application | Equipment: Screen printer Aimed thickness - 5 μm Drying temperature: 100° C. |

Using the produced activated carbon paste, two active material layer patterns each having a rectangular shape with a size of 6 mm×10 mm were printed onto the cathode collector electrode (aluminum electrode) each having a rectangular shape with a size of 20 mm×10 mm by screen printing in the arrangement shown in FIG. 24(6a), which were thereafter dried in the air-heating furnace at 80° C. for 20 minutes, to form the cathode active material layers 21b having a thickness of 4 μm.

Formation of Separator Layer i) Adjustment of Binder Solution

After addition of 160 g of PVDF-HFP (polyvinylidene fluoride-hexafluoropropylene copolymer) into a pot with a capacity of 1 L and further addition of 640 g of NMP (1-methyl-2-pyrolidone) solvent thereinto, the pot was put into a pot frame, to perform mixing. The mixing was performed at a rotational speed of 150 rpm for 24 hours, thereby to give a binder solution where 20 wt % PVDF-HFP was present in NMP.

ii) Creation of Paste for Separator Layer

Primary Blending

Next, after addition of 25 g of powdery alumina (D50=0.3 µm) into a pot with a capacity of 500 mL, 175 g of boulder (zirconia ball with φ5 mm) was added, and 25 g of NMP was further added as a solvent. The pot was then put into the pot frame to perform cracking (at a rotational speed of 150 rpm for 16 hours) for primary blending.

Secondary Blending

Then, 236 g of the above binder solution was further added to this, and mixed in the pot frame (rotational speed of 150 rpm for four hours), to give about 250 mL slurry for separator layer.

Using this slurry for separator layer, 50 cathode composite sheets 20A, shown in FIGS. 25(7a) and (7b), were produced. A thickness of the formed separator layer 42 (distance from the surface of the adhesive layer 121 to the surface of the separator layer 42) was 15 µm.

Similarly, 50 anode composite sheets 30A were produced and prepared.

Next, the cathode composite sheet 20A and the anode composite sheet 30A were arranged as the cathode composite sheet 20A was located on the downside and the separator layers 42 were opposed to each other, and then bonded to each other by uniform pressurization of the whole surface from both sides by the pressure plate. At this time, a temperature of the pressure plate was set to 150° C., pressure in pressurization to 20 MPa, and pressurization time to 30 seconds.

As thus described, 49 cathode/anode integrated sheets were further produced, and regarded as the cathode/anode integrated sheets 50A.

The cathode/anode integrated sheets 50A prepared as above were laminated while the substrate PET film 100 was appropriately peeled as described below.

First, the anode side of one cathode/anode integrated sheet 50A was brought into contact with the suction board, to be sucked, and the cathode/anode integrated sheet 50A was lifted, whereafter the substrate PET film 100 on the cathode side was peeled.

Below the cathode/anode integrated sheet 50A with the substrate PET film 100 on the cathode side having been sucked by the suction board and peeled, a sheet obtained by forming the separator layer 42 with a thickness of 8 µm on the substrate PET film 100 was arranged such that the substrate PET film 100 side of the sheet was located on the downside, and then bonded.

Then, the substrate PET film 100 on the anode side of the cathode/anode integrated sheet 50A, sucked by the suction board, was peeled.

Next, the cathode side of another one cathode/anode integrated sheet 50A was brought into contact with the suction board, to be sucked, and the cathode/anode integrated sheet was lifted, whereafter the substrate PET film 100 on the anode side was peeled.

The cathode/anode integrated sheet 50 bonded with the sheet obtained by forming only the separator layer 42 on the substrate PET film 100 was arranged below foregoing another cathode/anode integrated sheet 50A with the substrate PET film 100 on the anode side having been peeled therefrom, and the respective adhesive layers 121 were made to adhere and bonded to each other. After the bonding, the substrate PET film 100 on the cathode side of foregoing another cathode/anode integrated sheet 50A was peeled.

Onto foregoing another cathode/anode integrated sheet with the substrate PET film 100 on the cathode side having been peeled therefrom, still another cathode/anode integrated sheet 50A with the anode side having been sucked by the suction board and the substrate PET film 100 on the cathode side having been peeled was similarly bonded.

The above process step was repeated, to laminate 50 cathode/anode integrated sheets 50A on the sheet obtained by forming only the separator layer 42 on the substrate PET film 100, and the substrate PET film 100 in the top layer of the lamination was peeled.

Finally, the substrate PET film 100 side of a separately prepared sheet obtained by forming only the separator layer 42 on a substrate PET film 100 was brought into contact with the suction board and sucked, and the separator layer 42 was bonded onto the cathode/anode integrated sheet 50A with the substrate PET film 100 in the top layer having been peeled therefrom, thereby to produce the laminated sheet for electrochemical element.

The above bonding was each performed by bringing the separator layer 42 and the cathode/anode integrated sheet 50A into contact with each other, or bringing two cathode/anode integrated sheets 50A with each other, on the substrate PET film 100 and uniformly pressurizing the whole surface by the pressure plate. At this time, a temperature of the pressure plate was set to 150° C., pressure in pressurization to 20 MPa, and pressurization time to 30 seconds.

The substrate PET films 100, adhering to the top and bottom of the laminated sheet LB1 for electrochemical element produced as above, were peeled and thereafter, the sheet was cut, to produce the electric double layer capacitor block (lamination block for electrochemical element) 1.

Aluminum was added to the side surfaces of the cut electric double layer capacitor block 1, thereby to form the cathode terminal electrode 21t and the anode terminal electrode 31t.

As shown in FIG. 31, this was housed into a package made of a liquid crystal polymer, made up of the package lid section 11a and the package base section 11b provided with the cathode package electrode 122b and the anode package electrode 132b. At the time of housing inside the package, for example, the conductive adhesive agent 122a and the conductive adhesive agent 132a which contained gold as a conductive particle were applied by dipping onto the cathode terminal electrode 21t and the anode terminal electrode 31t, and the lamination block 1 for electrochemical element was arranged such that the conductive adhesive agent 122a and the conductive adhesive agent 132a were respectively connected to the cathode package electrode 122b and the anode package electrode 132b.

This was heated at 170° C. for 10 minutes, to cure the conductive adhesive agents, so as to fix the electric double layer capacitor block 1 to the package electrodes, while electrically connecting the terminal electrodes to the package electrodes.

After completion of fixing and electric connection to the inside of the package in such a manner as above, 90 µL of 1-ethyl-3-methylimidazolium tetrafluoroborate as an electrolyte was poured thereinto, to seal the package by laser welding.

Thereby, an electric double layer capacitor of Example 5 was obtained.

Capacity and Electric Resistance

A capacity (CAP) and electric resistance (ESR) of the obtained electric double layer capacitor were measured.

FIG. 32 (a) is a schematic view showing a measurement method for the capacity (CAP), and FIG. 32(b) is a schematic view showing a measurement method for the electric resistance (ESR).

The capacity (CAP) of the electric double layer capacitor was measured as follows.

The electric double layer capacitor was subjected to constant-current charge to 2.75 V at a charging current of 3 A, and held at 2.75 V for 10 seconds. Subsequently, constant-current discharge was performed at I=3 A. The relation between a voltage (V) and time (t) during this constant-current discharge was measured, and the relation with respect to the time of 30 to 60 milliseconds after the start of discharge was linearly approximated, and a gradient $\Delta V_1/\Delta t$ (being a negative value) of this approximate straight line was obtained. The capacity (CAP) was then calculated from Formula (1) below.

$$CAP = -I \cdot \Delta t / \Delta V_1 \quad (1)$$

The electric resistance (ESR) of the electric double layer capacitor was measured as described below.

The electric double layer capacitor was subjected to constant-current charge to 2.75 V at a charging current of 3 A, and held at 2.75 V for 10 seconds. Subsequently, constant-current discharge was performed at I=3 A. As shown in FIG. 32(b), immediately after the start of discharge, the voltage abruptly fell just by $\Delta V_2$ from 2.75 V due to the influence of the electric resistance (ESR).

This $\Delta V_2$ was obtained as follows.

The relation between a voltage (V) and time (t) during this constant-current discharge was measured, and the relation with respect to the time of 30 to 60 milliseconds after the start of discharge was obtained by linear approximation. By this linear approximation, a voltage Vt was obtained immediately after the start of discharge, namely t=0.

$\Delta V_2$ was then calculated from Formula (2) below.

$$\Delta V_2 = 2.75 - Vt \quad (2)$$

After $\Delta V_2$ was obtained in such a manner, ESR was obtained by Formula (3) below.

$$ESR = \Delta V_2 / I \quad (3)$$

The capacity of the electric double layer capacitor of Example 5 was 476 mF, and its electric resistance was 18 mΩ.

DESCRIPTION OF REFERENCE SYMBOLS 1, 2, 3 lamination block for electrochemical element
10, 11, 13, 14, 42, 61, 62 separator layer
20A, 70A cathode composite sheet (cathode separator/electrode composite sheet)
20D cathode/cathode integrated sheet
21a, 22a, 23a, 24a cathode collector electrode
21b, 22b, 23b, 24b cathode active material layer
21t cathode terminal electrode
30A, 70B anode composite sheet (anode separator/electrode composite sheet)
30D anode/anode integrated sheet
31a, 32a, 33a, 34a anode collector electrode
31b, 32b, 33b, 34b anode active material layer
31t anode terminal electrode
41 buried layer
50A, 70AB cathode/anode integrated sheet
50AB, 50BA cathode/anode integrated sheet
80 suction board
100 substrate film
101 mold releasing layer
102 cathode collector film
R102 resist pattern
121 adhesive layer
122a, 132a conductive adhesive agent
122b cathode package electrode
132b anode package electrode
LB1, LB2, LB3 laminated sheet for electrochemical element
D1, D2, D3 cut line
300 transfer film

The invention claimed is:

1. A power storage device, comprising:
a laminated body having a first electrode and a second electrode;
an electrolyte; and
a package which houses the laminated body and the electrolyte,
wherein at least one of the first electrode and the second electrode include at least two first electrode composite sheets, each of the at least two first electrode composite sheets including a first collector electrode, a first electrode active material layer on a first surface of the first collector electrode, and a first separator layer covering at least part of the first surface of the first collector electrode, and
wherein, of the at least two first electrode composite sheets, respective second surfaces of each of the first collector electrodes are opposed to, and electrically bonded to, each other, the second surfaces being opposite the first surfaces.

2. The power storage device according to claim 1, wherein the at least one of the first electrode and the second electrode further include a second electrode composite sheet comprising a second collector electrode, a second electrode active material layer on a second surface of the second collector electrode, and a second separator layer covering at least part of the second surface of the second collector electrode.

3. The power storage device according to claim 1, wherein the at least one of the first electrode and the second electrode further include at least two second electrode composite sheets each comprising a second collector electrode, a second electrode active material layer on a second surface of the second collector electrode, and a second separator layer covering at least part of the second surface of the second collector electrode, wherein
of the at least two second electrode composite sheets, the respective second surfaces of each of the second collector electrodes are opposed to, and bonded to, each other.

4. The power storage device according to claim 2, wherein one of the first separator layers of the two first electrode composite sheets and the second separator layer of the second electrode composite sheet are bonded to each other.

5. The power storage device according to claim 3, wherein the one of the first separator layers of the two first electrode composite sheets and one of the second separator layers of one of the two second electrode composite sheets are bonded to each other.

6. The power storage device according to claim 1, wherein the separator layer contains an inorganic filler.

* * * * *